US011743409B2

(12) United States Patent
Tokuchi

(10) Patent No.: US 11,743,409 B2
(45) Date of Patent: Aug. 29, 2023

(54) INFORMATION PROCESSING METHOD, PRINTING-FUNCTION-EQUIPPED STORAGE APPARATUS, NETWORK PRINT SYSTEM, AND NON-TRANSITORY COMPUTER READABLE MEDIUM

(71) Applicant: FUJIFILM Business Innovation Corp., Tokyo (JP)

(72) Inventor: Kengo Tokuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/320,655

(22) Filed: May 14, 2021

(65) Prior Publication Data

US 2022/0201152 A1    Jun. 23, 2022

(30) Foreign Application Priority Data

Dec. 22, 2020   (JP) ................. 2020-212547

(51) Int. Cl.
*H04N 1/00*   (2006.01)
*H04N 1/32*   (2006.01)

(52) U.S. Cl.
CPC ..... *H04N 1/32112* (2013.01); *H04N 1/00978* (2013.01)

(58) Field of Classification Search
CPC .......... H04N 1/32112; H04N 1/00978; G06K 15/4025; G06K 15/403; G06K 15/4035
USPC ....................................... 358/1.15
See application file for complete search history.

(56) References Cited

U.S. PATENT DOCUMENTS

| 8,559,036 | B1* | 10/2013 | Khafizova ............. | G06F 3/1263 |
| | | | | 358/1.15 |
| 10,866,774 | B1* | 12/2020 | Ormond ................ | G06F 3/1263 |
| 2010/0214585 | A1* | 8/2010 | Tanji ..................... | G06F 3/1279 |
| | | | | 358/1.14 |
| 2013/0068638 | A1* | 3/2013 | Ho .......................... | B65G 1/00 |
| | | | | 206/216 |
| 2017/0070642 | A1* | 3/2017 | Miyamoto .............. | B41J 29/38 |
| 2017/0073159 | A1* | 3/2017 | Lossov ................. | G06K 7/1417 |
| 2019/0031441 | A1* | 1/2019 | Jin ......................... | G07F 11/58 |
| 2019/0095154 | A1* | 3/2019 | Hayashi ................ | G06F 3/1253 |
| 2021/0397914 | A1* | 12/2021 | Hikichi ................ | G06K 15/002 |

FOREIGN PATENT DOCUMENTS

| JP | 2001-160179 A | 6/2001 |
| JP | 2001-160182 A | 6/2001 |
| JP | 3915353 B2 | 5/2007 |

* cited by examiner

*Primary Examiner* — Kent Yip
(74) *Attorney, Agent, or Firm* — Oliff PLC

(57) ABSTRACT

Provided is an information processing method executed by a server apparatus that communicates with one or more storage apparatuses over a network, the one or more storage apparatuses having a printer, plural storages for storing a printed material printed in accordance with a reservation, and a transport mechanism that transports a printed material to a corresponding storage. The information processing method includes offering a terminal the one or more storage apparatuses that are capable of printing and storing a printed material designated by the terminal as one or more candidates for a place to which the designated printed material is to be output; and transmitting a data file to the one or more storage apparatuses selected from among the one or more candidates.

20 Claims, 54 Drawing Sheets

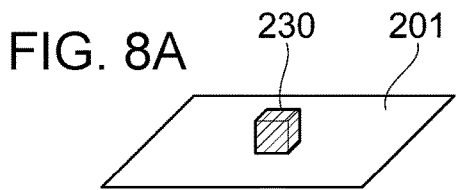
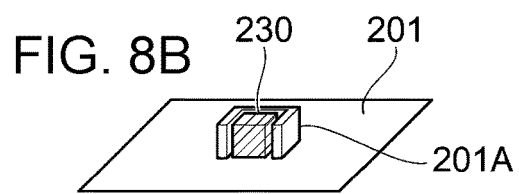
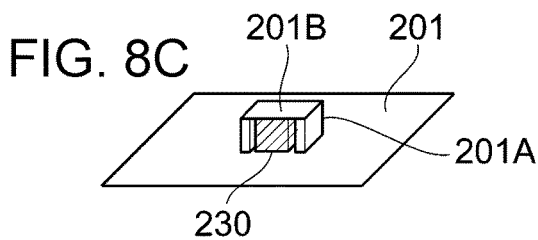
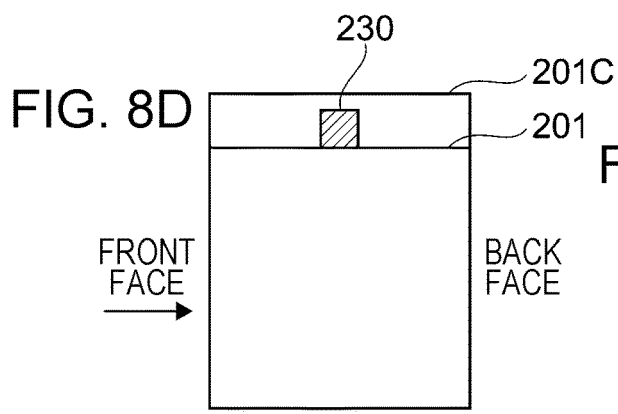
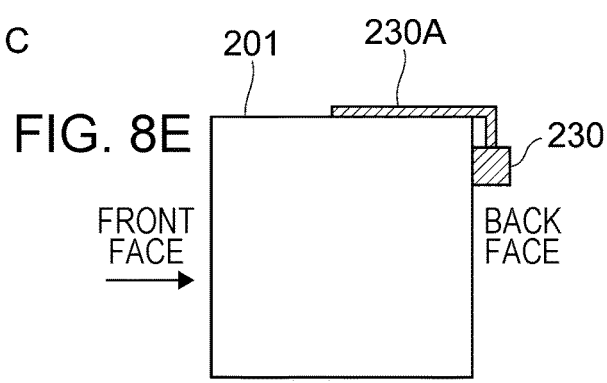
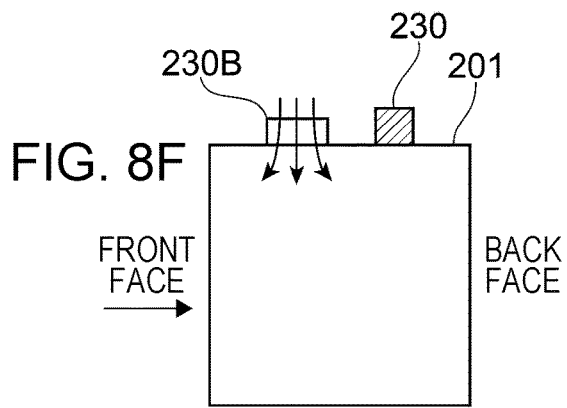
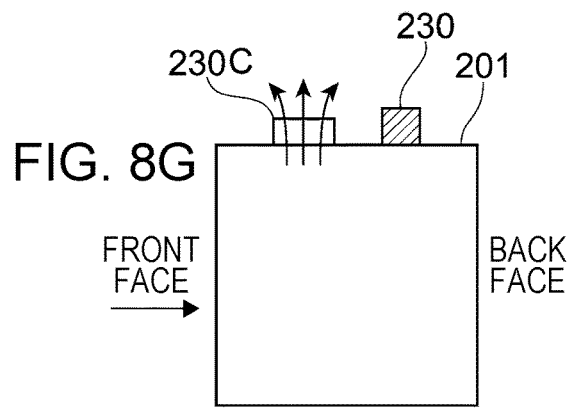
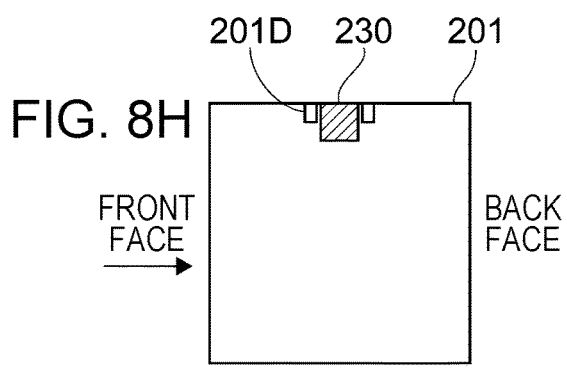
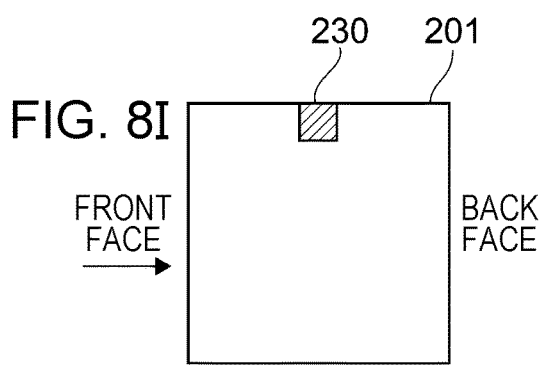

| MANAGEMENT ID | RESERVATION ID | START DATE AND TIME | END DATE AND TIME | PAPER | NUMBER OF SHEETS | ... |
|---|---|---|---|---|---|---|
| P10001 | 100011 | DECEMBER 30, 2020 15:00 | DECEMBER 30, 2020 15:07 | A4 | 20 | |
| ... | | | | | | |
| P10105 | 100012 | DECEMBER 31, 2020 7:30 | DECEMBER 31, 2020 7:37 | A4 | 2000 | |
| ... | | | | | | |
| P10107 | 100013 | DECEMBER 31, 2020 3:00 | DECEMBER 31, 2020 4:10 | A5 | 150 | |
| ... | | | | | | |

| MANAGEMENT ID | RESERVATION ID | BOX ID | USE | SCHEDULED PICKUP TIME | PICKUP TIME | AIR CONDITIONING | ... |
|---|---|---|---|---|---|---|---|
| A60000 | | A1_004 | O | DECEMBER 30, 2020 16:00 | | YES | |
| A60001 | | A1_005 | EMPTY | | | | |
| A60002 | | A1_006 | O | DECEMBER 29, 2020 10:24 | | NO | |
| A60003 | | A1_007 | EMPTY | | | | |
| A60004 | | A1_008 | O | NONE | | NO | |

| MANAGEMENT ID | NAME | REGISTRATION FORM | USER ACCOUNT | SPECIAL AGREEMENT | ... |
|---|---|---|---|---|---|
| ... | | | | | |
| 10001 | TARO | INDIVIDUAL | taro@mail | NO | |
| 10002 | HANAKO | INDIVIDUAL | hanako@mail | NO | |
| 10003 | JIRO | INDIVIDUAL | jiro@mail | NO | |
| ... | | | | | |
| 50001 | COMPANY AB | CORPORATION | @ab.com* | YES | |
| | | | | | |

FIG. 13B

| EMPLOYEE ID | NAME | USER ACCOUNT | DEPARTMENT | USE AUTHORITY | ... |
|---|---|---|---|---|---|
| ... | | | | | |
| AB30001 | SHIRO | shiro@ab.com | SALES | YES | |
| AB30002 | GORO | goro@ab.com | SALES | YES | |
| AB30003 | HANAKO | hanako@ab.oom | ACCOUNTING | NO | |
| ... | | | | | |
| | | | | | |
| | | | | | |

| AREA ID | MANAGEMENT ID | INSTALLATION PLACE | OPERATING HOURS | NUMBER OF BOXES | SIZE | PRINTING PERFORMANCE | AIR CONDITIONING | ... |
|---|---|---|---|---|---|---|---|---|
| A | A1 | | 10-23 | 9 | LARGE 2 MEDIUM 2 SMALL 5 | 10 SHEETS PER MINUTE BOTH-SIDED SPECIAL COLOR FOLDING | YES | |
| A | A2 | | 0-24 | 20 | LARGE 4 MEDIUM 10 SMALL 6 | 15 SHEETS PER MINUTE | NO | |
| A | A3 | | 0-24 | 12 | | | | |
| A | A4 | | 7-23 | 8 | | | | |
| B | B1 | | 0-24 | 20 | | | | |
| B | B2 | | 10-22 | 15 | | | | |
| B | B3 | | 9-17 | 16 | | | | |
| ... | ... | | | | | | | |

| MANAGEMENT ID | BOX ID | SIZE | STORED OBJECT | AIR-CONDITIONING MANAGEMENT | ... |
|---|---|---|---|---|---|
| A1 | A1_001 | LARGE | ONLY BAGGAGE | YES | |
| A1 | A1_002 | LARGE | ONLY BAGGAGE | YES | |
| A1 | A1_003 | MEDIUM | ONLY BAGGAGE | YES | |
| A1 | A1_004 | MEDIUM | ONLY PRINTED MATERIAL | YES | |
| A1 | A1_005 | SMALL | ONLY PRINTED MATERIAL | NO | |
| A1 | A1_006 | SMALL | ONLY PRINTED MATERIAL | NO | |
| A1 | A1_007 | SMALL | ONLY PRINTED MATERIAL | NO | |
| A1 | A1_008 | SMALL | ONLY PRINTED MATERIAL (EXCLUSIVE FOR FREE PAPER) | NO | |
| A1 | A1_009 | SMALL | — | NO | |
| ... | | | | | |
| A2 | A2_005 | MEDIUM | ONLY PRINTED MATERIAL | NO | |
| ... | | | | | |
| B1 | B1_001 | MEDIUM | ONLY PRINTED MATERIAL | NO | |
| ... | | | | | |
| C1 | C1_001 | SMALL | ONLY PRINTED MATERIAL | NO | |

| MANAGEMENT ID | RESERVATION ID | BOX ID | USE | SCHEDULED PICKUP TIME | PICKUP TIME | AIR CONDITIONING | ... |
|---|---|---|---|---|---|---|---|
| A60000 | | A1_004 | O | DECEMBER 30, 2020 16:00 | | YES | |
| A60001 | | A1_005 | EMPTY | | | | |
| A60002 | | A1_006 | O | DECEMBER 29, 2020 10:24 | | NO | |
| A60003 | | A1_007 | EMPTY | | | | |
| A60004 | | A1_008 | O | NONE | | NO | |
| A60006 | | A2_001 | O | DECEMBER 30, 2020 8:15 | | NO | |
| ... | | | | | | | |
| A60007 | | A3_001 | EMPTY | | | | |
| ... | | | | | | | |
| B70001 | | B1_001 | EMPTY | | | | |
| ... | | | | | | | |
| C 80001 | | C1_001 | EMPTY | | | | |

| RESERVATION ID | BOX ID | SCHEDULED PICKUP TIME | FILE NAME | NUMBER OF PRINTED SHEETS | FEE (INCLUDING TIME-SHIFT DISCOUNT, STORAGE FEE, ETC.) | SPECIAL AGREEMENT | ... |
|---|---|---|---|---|---|---|---|
| ... | | | | | | | |
| 100011 | A1_003 | DECEMBER 30, 2020 15:45 | ABC.doc | A4: 22 SHEETS ×10 COPIES | | STORED AT SHOP | |
| 100012 | A1_005 | DECEMBER 31, 2020 8:25 | xyz.pdf | A4: 200 SHEETS | | SHREDDER | |
| 100013 | A1_007 | DECEMBER 31, 2020 7:20 | | A4: 100 SHEETS ×20 COPIES | | TIME-SHIFT PRINT | |
| 100014 | A2_001 | DECEMBER 31, 2020 18:25 | | A4: 100 SHEETS ×20 COPIES | | STORED AT SHOP | |
| ... | | | | | | | |

| MANAGEMENT ID | EXTRA FEE HOURS | UNIT PRICE OF EXTRA FEE | DISCOUNTED HOURS | UNIT PRICE OF DISCOUNTED FEE | ... |
|---|---|---|---|---|---|
| A1 | 11:00-13:00 | | 23:00-06:00 | | |
| A2 | | | | | |
| ... | | | | | |

| MANAGEMENT ID | UNIT PRICE OF LATE FEE (CHARGED AFTER ELAPSE OF 10 MINUTES) |
|---|---|
| A1 | 10 YEN PER MINUTE |
| A2 | 500 YEN PER TIME |
| ... | |

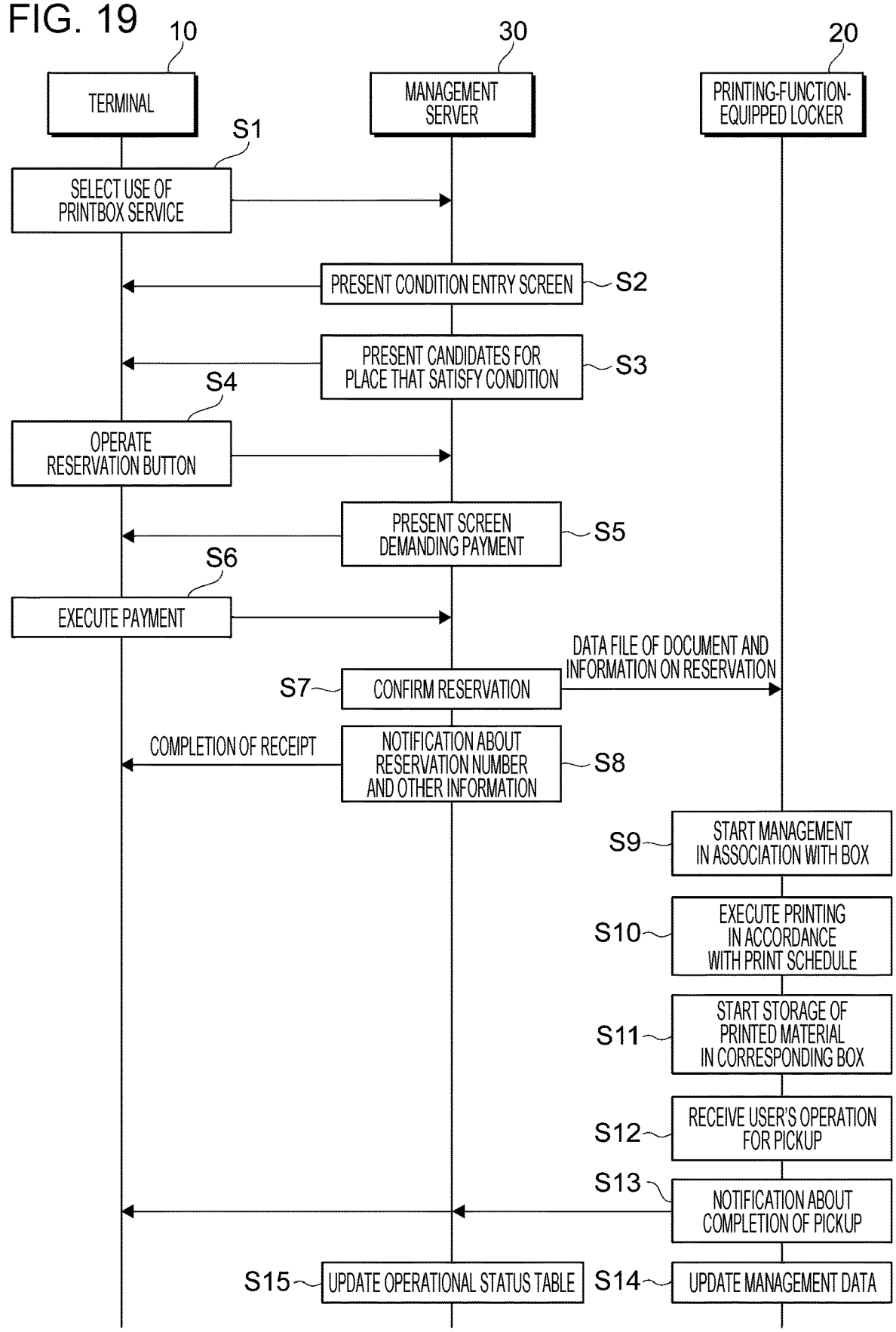

USER WHO IS OPERATING
MAIN PANEL

OPERATING
MAIN PANEL

USER WHO HAS
COME TO PICK UP
PRINTED MATERIAL

FIG. 36A
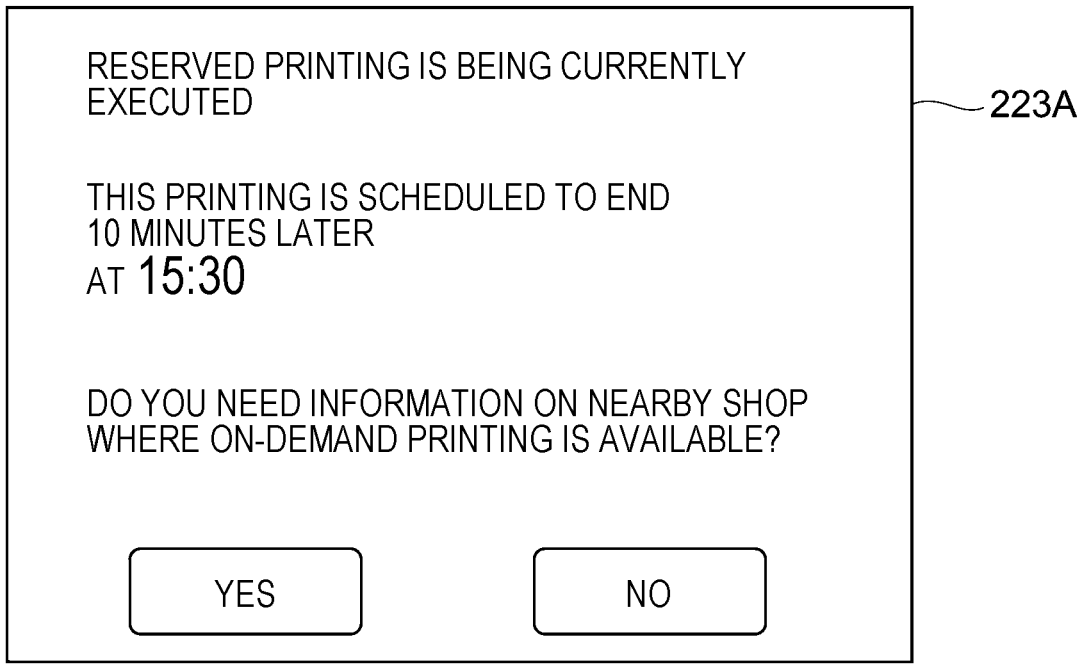
 SELECT "YES"
FIG. 36B
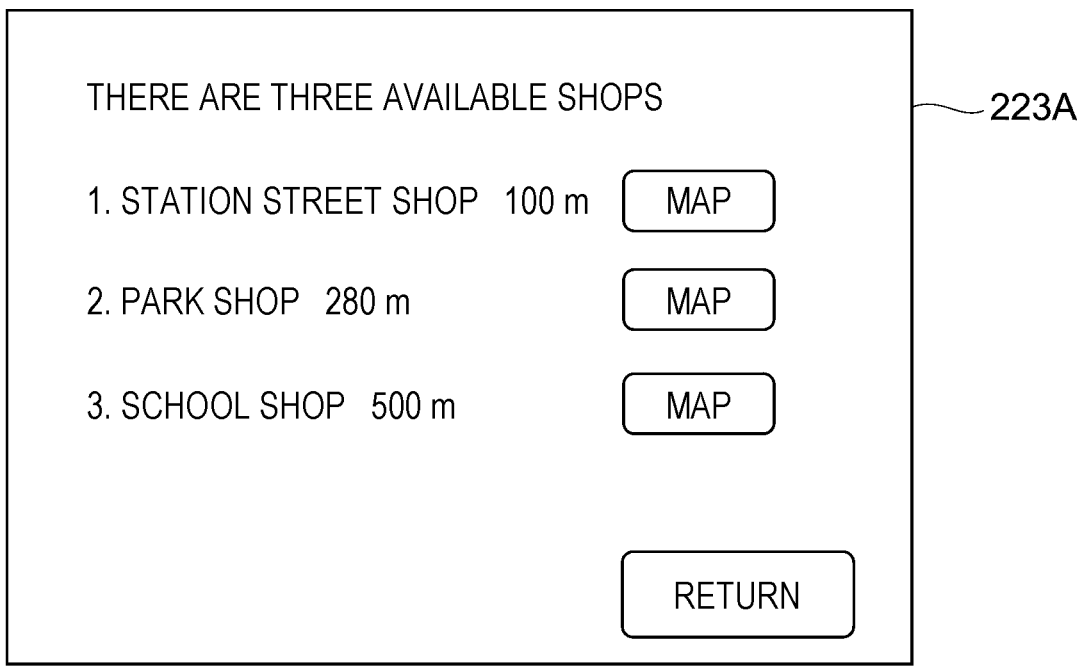

| MANAGEMENT ID | BOX ID | SIZE | STORED OBJECT | AIR-CONDITIONING MANAGEMENT | ... |
|---|---|---|---|---|---|
| A1 | A1_001 | LARGE | ONLY BAGGAGE | YES | |
| A1 | A1_002 | LARGE | PRINTED MATERIAL AND BAGGAGE | YES | |
| A1 | A1_003 | MEDIUM | PRINTED MATERIAL AND BAGGAGE | YES | |
| A1 | A1_004 | MEDIUM | PRINTED MATERIAL AND BAGGAGE | YES | |
| A1 | A1_005 | SMALL | PRINTED MATERIAL AND BAGGAGE | NO | |
| A1 | A1_006 | SMALL | PRINTED MATERIAL AND BAGGAGE | NO | |
| A1 | A1_007 | SMALL | PRINTED MATERIAL AND BAGGAGE | NO | |
| A1 | A1_008 | SMALL | ONLY PRINTED MATERIAL (FOR FREE PAPER) | NO | |
| ... | | | | | |
| A2 | A2_005 | MEDIUM | PRINTED MATERIAL AND BAGGAGE | NO | |
| ... | | | | | |
| B1 | B1_001 | MEDIUM | PRINTED MATERIAL AND BAGGAGE | NO | |
| ... | | | | | |
| C1 | C1_001 | SMALL | PRINTED MATERIAL AND BAGGAGE | NO | |

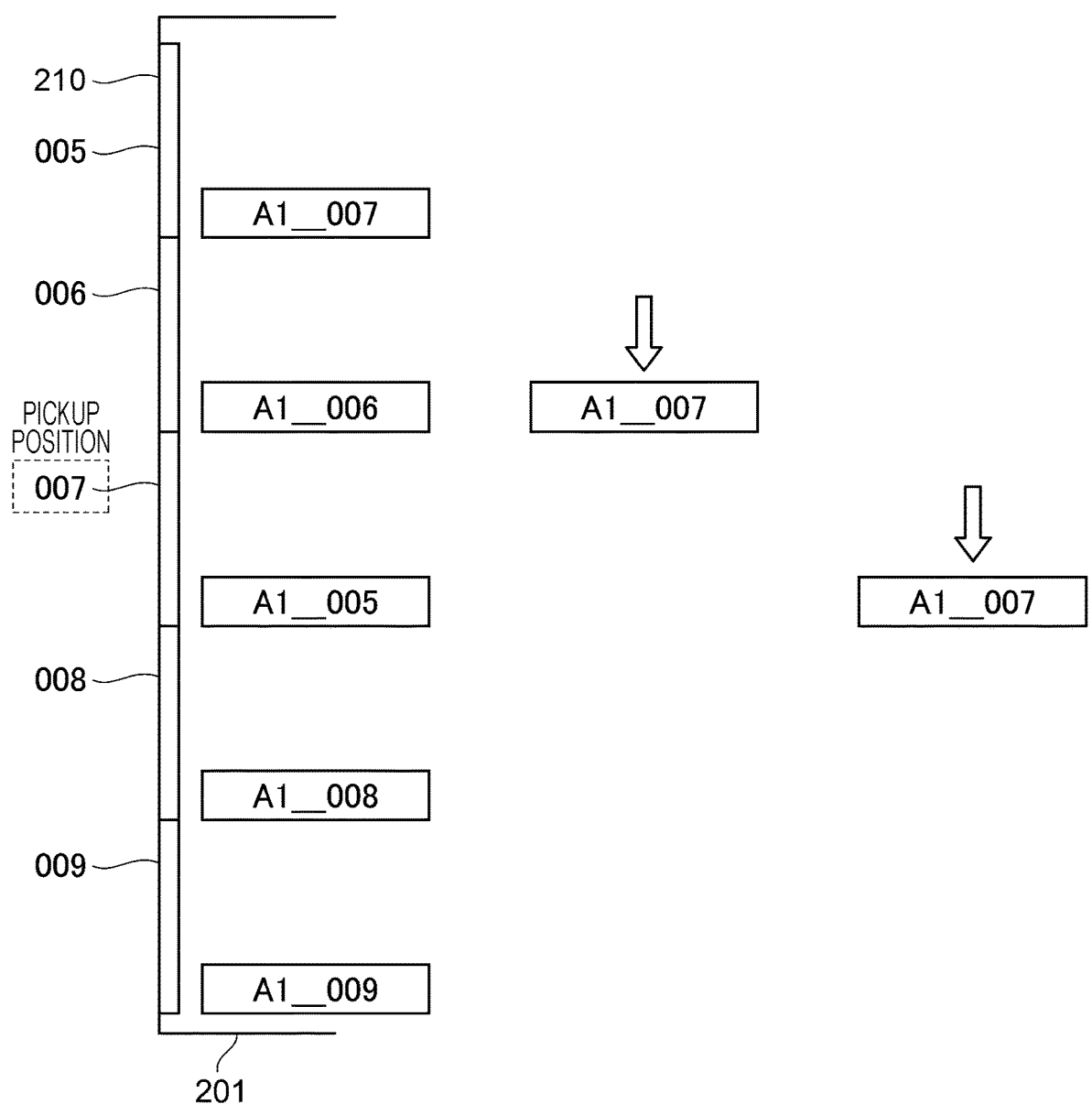

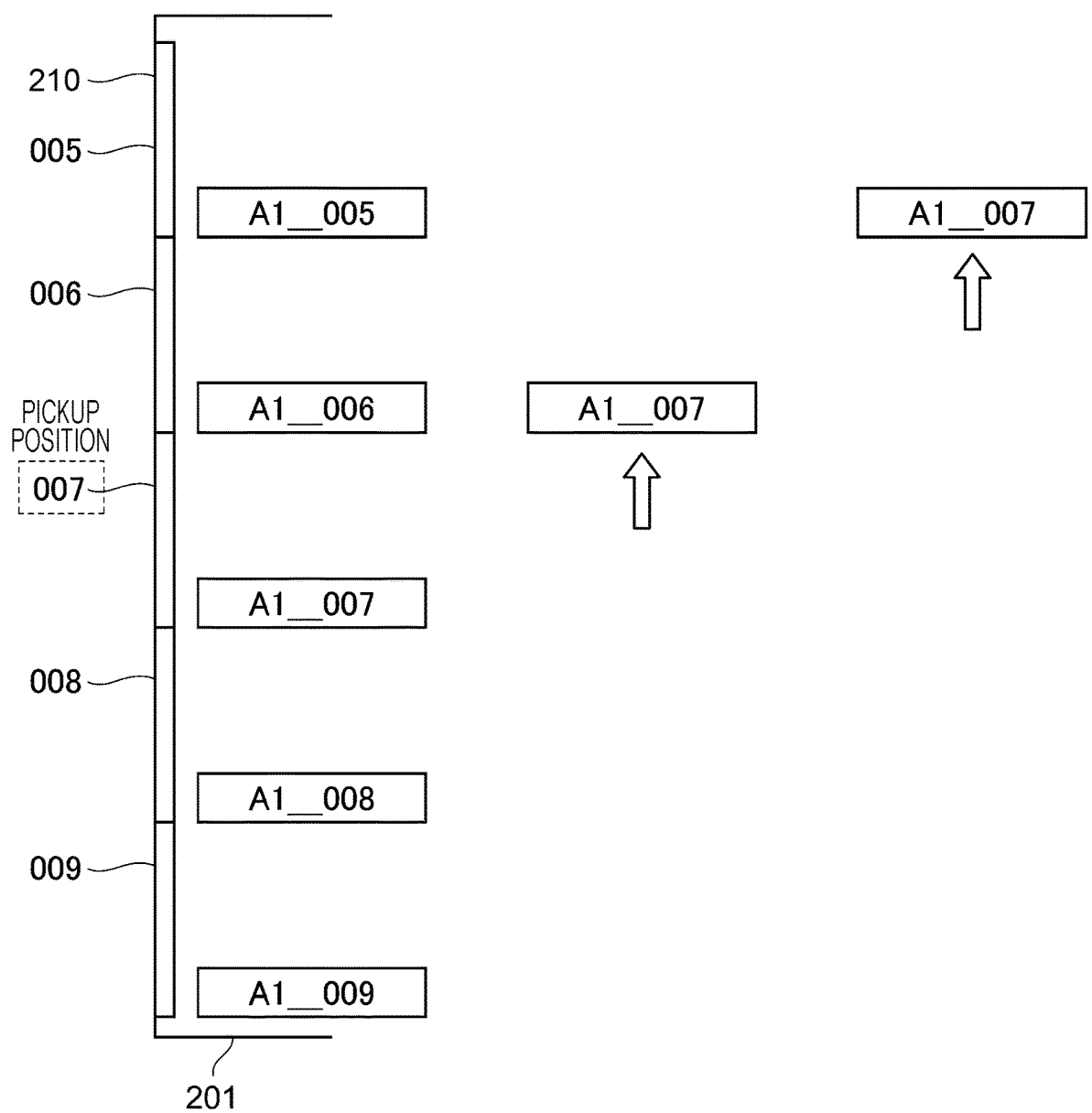

INFORMATION PROCESSING METHOD, PRINTING-FUNCTION-EQUIPPED STORAGE APPARATUS, NETWORK PRINT SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-212547 filed Dec. 22, 2020.

BACKGROUND

(i) Technical Field

The present disclosure relates to an information processing method, a printing-function-equipped storage apparatus, a network print system, and a non-transitory computer readable medium.

(ii) Related Art

Currently, services for transferring a document uploaded onto a server on the cloud to a printer somewhere outside and printing the document from the printer are available. Such services are also called "on-demand print services" or "network print services".

See, for example, Japanese Patent No. 3915353.

SUMMARY

According to the aforementioned print services, a user operates a printer from which the user wants to output a printed material, and thereby printing is started. Accordingly, in a case where the number of sheets to be output is large, other users are forced to wait for a long time. Furthermore, a user who cannot wait for the printing to end gives up printing his or her document from this printer. As a result, an owner misses an opportunity of earning.

One possible solution is to start printing beforehand by utilizing a spare time of a printer.

However, leaving a printed material in a place that can be accessed by anyone has problems from the perspectives of theft and privacy.

Such problems can be addressed by preparing a space for storage in a printer and storing a printed material until a user comes to pick up the printed material. However, users demand various sizes of printed materials, and it is unrealistic to provide spaces for separately storing various sizes of printed materials in a printer.

Aspects of non-limiting embodiments of the present disclosure relate to offering a service for storing, in accordance with a user's use form, a printed material printed in accordance with a reservation.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing method executed by a server apparatus that communicates with one or more storage apparatuses over a network, the one or more storage apparatuses having a printer, plural storages for storing a printed material printed in accordance with a reservation, and a transport mechanism that transports a printed material to a corresponding storage. The information processing method includes offering a terminal the one or more storage apparatuses that are capable of printing and storing a printed material designated by the terminal as one or more candidates for a place to which the designated printed material is to be output; and transmitting a data file to the one or more storage apparatuses selected from among the one or more candidates.

BRIEF DESCRIPTION OF THE DRAWINGS

Exemplary embodiments of the present disclosure will be described in detail based on the following figures, wherein:

FIG. 4A illustrates a front face, a flat face, and a right side face, FIG. 4B is a left side view, FIG. 4C is a bottom view, and FIG. 4D is a back view;

FIGS. 8A to 8I are views for explaining various examples of a way in which a fire extinguisher is attached;

FIG. 10 illustrates a data example of a print schedule;

FIG. 11 illustrates a data example of an operational status table;

FIGS. 13A and 13B illustrate a data example of a user table, FIG. 13A illustrates an example of a table in which both individuals and business operators are managed, and FIG. 13B illustrates an example of a table unique to business operators;

FIG. 14 illustrates an example of the equipment table in which lockers registered in a printbox service are recorded;

FIG. 15 illustrates a data example of the equipment table in which individual lockers are targets of management;

FIG. 16 illustrates a data example of the operational status table;

FIG. 17 illustrates a data example of a reservation table of a printbox service;

FIGS. 18A and 18B illustrate a data example of a fee table and a late fee table, respectively, FIG. 18A illustrates a data example of the fee table, and FIG. 18B illustrates a data example of the late fee table;

FIG. 19 is a view for explaining an example of processing operation that proceeds in the network print system used in the first exemplary embodiment;

FIG. 27A illustrates an example of an operation for displaying a printed material pickup screen, and FIG. 27B illustrates an example of an operation for unlocking a door by entering a reservation number;

FIG. 28A illustrates an example of a reservation number entry screen, and FIG. 28B illustrates an example of a screen displayed in a case where a user has been authenticated;

FIG. 29A illustrates an example of an operation for unlocking a door by NFC entry, and FIG. 29B is a view illustrating a user placing a terminal over an NFC communication unit;

FIG. 30A illustrates an example of a door having a RQ code reading unit, and FIG. 30B is a view for explaining how a QR code is read;

FIG. 31A illustrates another user who is operating the front panel, and FIG. 31B illustrates how a user takes out a printed material.

FIG. 33A illustrates an example of an operation screen presented to Mr. B who has come to pick up the printed material, and FIG. 33B illustrates an example of an operation screen presented to Mr. A who requested pickup;

FIG. 35A illustrates an example in which a stock of free paper is larger than a standard, FIG. 35B illustrates an example in which a stock of free paper is smaller than the standard, and FIG. 35C illustrates an example in which a stock of free paper becomes larger than the standard as a result of additional printing;

FIGS. 36A and 36B are views for explaining an example of a screen presented in a case where a user who desires on-demand printing is guided to a nearby shop, FIG. 36A illustrates an example of a screen displayed in a case where on-demand printing is received during execution of reserved printing, and FIG. 36B illustrates an example of a screen for introducing a nearby shop;

FIG. 38 illustrates a data example of an equipment table used in the second exemplary embodiment;

FIG. 42A illustrates an example of the box used in the third exemplary embodiment, and FIG. 42B illustrates directions in which the box is moved;

FIG. 43A is a view of the box viewed from a side face side, FIG. 43B is a view of the box viewed from above, and FIG. 43C illustrates directions in which the box is moved;

FIGS. 45A to 45C are views for explaining how a box moves in a body in a case where the current time approaches the scheduled pickup time;

FIGS. 47A to 47C are views for explaining how a box moves in a body in a case where an elapsed time from the scheduled pickup time becomes longer;

FIG. 48A illustrates display in a case where the elapsed time is within 30 minutes, FIG. 48B illustrates display in a case where 1 hour has elapsed from the scheduled pickup time, and FIG. 48C illustrates display in a case where two hours or longer have elapsed from the scheduled pickup time;

FIG. 49A illustrates the door before execution of scan, and FIG. 49B illustrates a change of the door during scan;

FIG. 51A illustrates a front face, a flat face, and a right side face, FIG. 51B is a left side view, FIG. 51C is a bottom view, and FIG. 51D is a back view;

FIG. 53A illustrates a front face, a flat face, and a right side face, FIG. 53B is a left side view, FIG. 53C is a bottom view, and FIG. 53D is a back view; FIG. 54A illustrates a front face, a flat face, and a right side face, FIG. 54B is a left side view, FIG. 54C is a bottom view, and FIG. 54D is a back view.

DETAILED DESCRIPTION

Exemplary embodiments of the present disclosure are described below with reference to the drawings.

First Exemplary Embodiment

Overall Configuration of System

Figure 1:
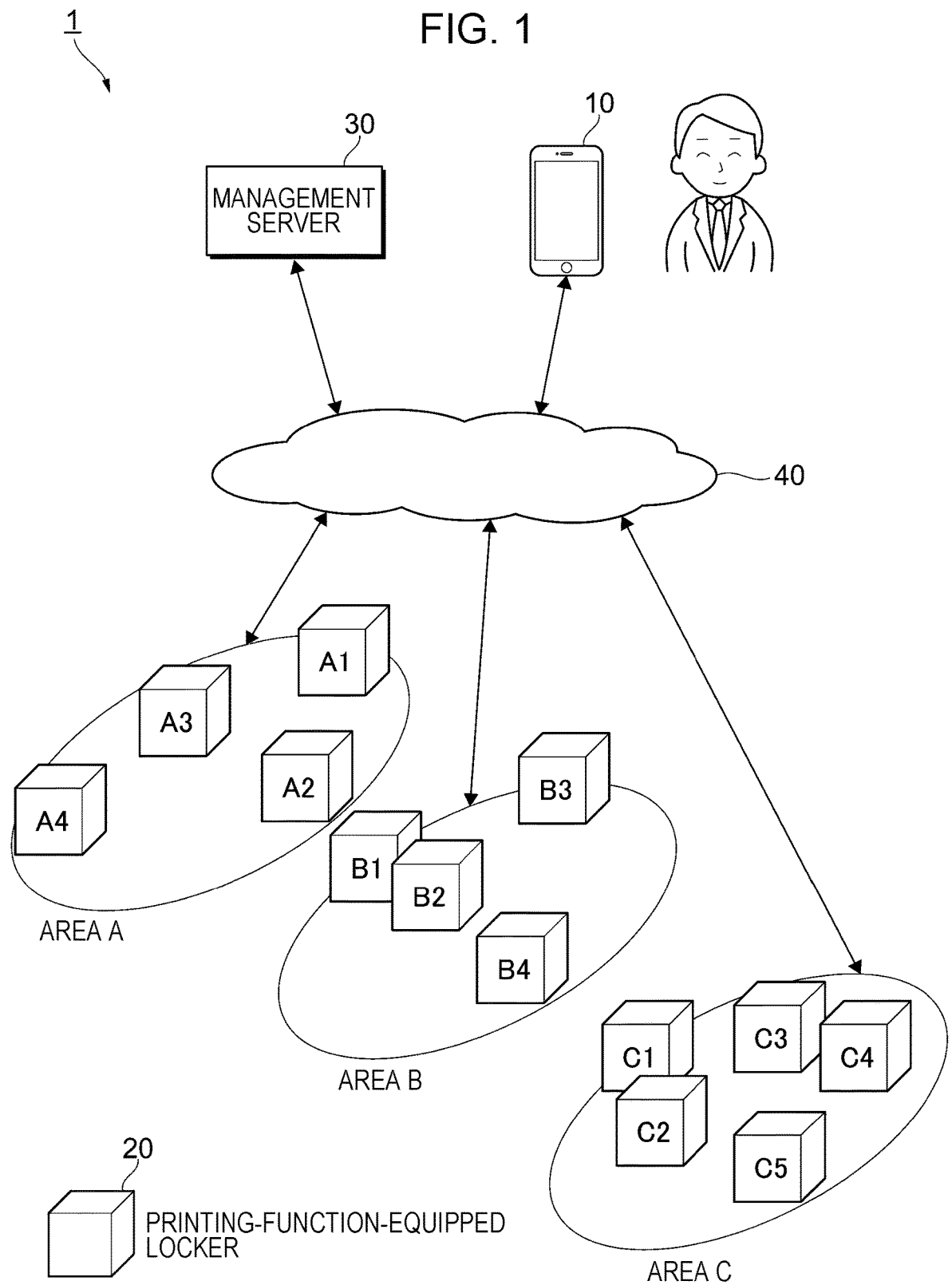
FIG. 1 is a view for explaining a use example of a network print system assumed in the first exemplary embodiment.

FIG. 1 is a view for explaining a use example of a network print system 1 assumed in the first exemplary embodiment.

The network print system 1 illustrated in FIG. 1 includes a terminal 10 operated by a user who uses a service, a locker (hereinafter referred to as a "printing-function-equipped locker") 20 having a function of printing a document and a function of storing a printed material in a box, a server (hereinafter referred to as a "management server") 30 that manages a reservation of printing of a document uploaded from the terminal 10 and storage of a printed material, and a communication network 40.

In the present exemplary embodiment, examples of a document include a text, a drawing, a figure, an image, a photo, an e-mail, and a facsimile. Examples of an image include an image created by using a computer, an image read by a scanner, and a medical image. Examples of a medical image include a plain X-ray image, a Computed Tomography (CT) image, a Magnetic Resonance Image (MRI), an ultrasound tomography image, and an angiographic image.

The network print system 1 according to the present exemplary embodiment offers a service of completing printing of a printed material by a pickup time and storing the printed material in a locked box. The box is an example of a storage used to store a printed material.

In the present exemplary embodiment, this service is referred to as a "printbox service". The printing-function-equipped locker 20 is referred to as a "printbox". The printbox service is offered as a cloud service.

According to the printbox service, printing of a printed material is completed by a reserved pickup time. This allows a user to spend his or her time profitably as compared with a case where the user gives an instruction to start printing after arriving at the printing-function-equipped locker 20.

In particular, in a case where the number of printed sheets is large, the user is spared from wasting his or her time since the user can take out a printed material as soon as he or she arrives at the printing-function-equipped locker 20.

In addition, in a case where a user starts printing after arriving at the printing-function-equipped locker 20, other users need to wait for the printing to end if the number of printed sheets is large. Meanwhile, according to the printbox service, a time for which other users need to wait is shortened.

As a result, a turnover of the printing-function-equipped locker 20 improves, and it is also expected that an owner of the printing-function-equipped locker 20 get more opportunities of earning.

A place where a user picks up a printed material may be any place where the printing-function-equipped locker 20 proposed in the present exemplary embodiment is installed, and examples of such a place include not only bases of a business operator to which the user belongs (hereinafter also referred to as a "user's organization"), but also bases of business partners and customers, convenience stores, drugstores, supermarkets, parking lots, public facilities, stations, and commercial facilities.

The terminal 10 is, for example, a desktop computer, a notebook computer, a tablet computer, a smartphone, or a wearable terminal.

FIG. 1 illustrates a case where the terminal 10 is a smartphone. The terminal 10 is provided with a device that presents information necessary for reservation of cloud printing and storage to a user and receives user's selection and a communication module for communication with the management server 30.

In a case where the terminal 10 is a smartphone, a touch panel is used as the device. A device that is compliant with WiFi (Registered Trademark), Bluetooth (Registered Trademark), Ethernet (Registered Trademark), 4G or 5G mobile communications system, and/or the like is used as the communication device.

Examples of a wearable terminal include wristwatch-type and wristband-type terminals (hereinafter also referred to as a "smartwatch") and eyeglass-type terminals (hereinafter also referred to as "xR glasses").

A smartwatch has a touch panel used to display time and other information and receive an operation, a belt or the like for attaching a body to the wrist, and a communication module.

The xR glasses are a device mounted on a user's head. Wearing xR glasses enables a user to experience a world in which virtual information that does not exist in a real space and the real space are mixed.

The virtual information that does not exist in a real space is information that is not viewed by a user who is not wearing xR glasses. Examples of the virtual information include a screen and an object digitally disposed within a field of view of the user.

Such an xR device is provided with a communication module for communication with the management server 30 and a device that allows a user to view virtual information.

Examples of the device that allows a user to view virtual information include a type in which a half mirror is disposed in front of eyes of a user, a type in which a volume hologram is disposed in front of eyes of a user, and a type in which a blazed diffraction grating is disposed in front of eyes of a user. These types enable a user to view virtual information by synthesizing, as light incident on user's eyes, the virtual information with light from a real space.

Another example of the device that allows a user to view virtual information is a type in which a small-sized display is displayed in front of user's eyes and an image synthesizing an image taken by a camera and digitally-generated information is displayed on the display.

According to the type in which a synthesized image is displayed on a display, a display on which a light transmissive film having a large number of fine pinholes is attached is used, and an image processed by a dedicated algorithm is displayed on the display.

The type in which a synthesized image is displayed on a display enables a user to view a clear image without wearing glasses for visual correction by a combination of image processing using a dedicated algorithm and light adjustment. Therefore, this type has been already put into practical use as a technique for visual correction. Furthermore, some vendors are planning to employ this type for xR glasses.

The terminal 10 according to the present exemplary embodiment is an example of a "mobile terminal".

The printing-function-equipped locker 20 is locker-type equipment having plural boxes equipped with doors and has a printer and a transport mechanism that transports a printed material in a body thereof. The printing-function-equipped locker 20 has a communication module for communication with the terminal 10 and the management server 30.

In addition, the printing-function-equipped locker 20 according to the present exemplary embodiment may have a scanner that optically reads an image of a document.

The printer is an apparatus that forms an image such as a character, a drawing, or a photo on a medium such as paper and is also called an image forming apparatus.

Examples of a medium such as paper include not only copy paper, but also glossy paper used for printing of a photo, a light-transmitting sheet, a seal, a magnet sheet, a holder or a sheet made of plastic, and an envelope.

There are plural sizes of paper. Examples of a paper size include A-series and B-series paper defined by "ISO216", C-series paper for an envelope, and a letter size.

Examples of a recording material used to record an image include ink of the same color and different concentrations and ink and toner that support special colors such as gold and silver.

A printed material output from the printer is transported to a box reserved as a storage place through a transport mechanism.

The printing-function-equipped locker 20 according to the present exemplary embodiment may be installed indoors or may be installed outdoors.

In the printing-function-equipped locker 20 according to the present exemplary embodiment, not only a boxed exclusive for storage of a printed material, but also a box exclusive for storage of baggage are prepared.

In FIG. 1, 13 printing-function-equipped lockers 20 in total are installed in three areas. For example, in an area A, four printing-function-equipped lockers 20 are installed, which are expressed as "A1", "A2", "A3", and "A4", respectively. Furthermore, in an area B, four printing-function-equipped lockers 20 are installed, which are expressed as "B1", "B2", "B3", and "B4", respectively. Furthermore, in an area C, five printing-function-equipped lockers 20 are installed, which are expressed as "C1", "C2", "C3", "C4", and "C5", respectively.

Although the printing-function-equipped lockers 20 are installed in the three areas in FIG. 1, the number of areas may be one, may be two, or may be four or more.

Although an administrative area is assumed as an area in the present exemplary embodiment, a base of a user's organization may be assumed as an area. In this case, it is assumed that the individual printing-function-equipped lockers 20 are installed at plural points on premises or in buildings of bases. The plural points may be points on different levels or may be points in different buildings.

The printing-function-equipped locker 20 according to the present exemplary embodiment may be used without reservation of storage.

For example, printing of a document that has been uploaded onto the management server 30 may be started when a user operates the printing-function-equipped locker 20.

Alternatively, for example, a user may attach a mobile memory onto the printing-function-equipped locker 20 and print an image read from the memory.

Alternatively, for example, a user may optically read a document which the user brought by using a scanner and store a read image in a mobile memory or the like or print the read image.

The printing-function-equipped locker 20 according to the present exemplary embodiment is an example of a "printing-function-equipped storage apparatus" or a "storage apparatus".

The management server 30 is a server that offers a function of managing a reservation of printing and storage received from the terminal 10 and a function of managing a fee charged for use of the service.

In the present exemplary embodiment, it is assumed that the management server 30 is a cloud server run by a business operator who offers the printbox service.

The business operator is not limited to an organization to which a user using the service belongs.

The management server 30 is not limited to a cloud server. For example, in a case where the network print system 1 is realized as a private system, the management server 30 may be installed in a facility of a specific business operator.

The management server 30 according to the present exemplary embodiment is an example of a server apparatus. Processing performed by the management server 30 is an example of an information processing method.

The communication network 40 is, for example, the Internet, local area network (LAN), or a mobile communication system. The mobile communication system is, for example, 4G or 5G.

Appearance of Printing-Function-Equipped Locker

Appearance of the printing-function-equipped locker 20 is described with reference to FIGS. 2 through 4.

Figure 2:
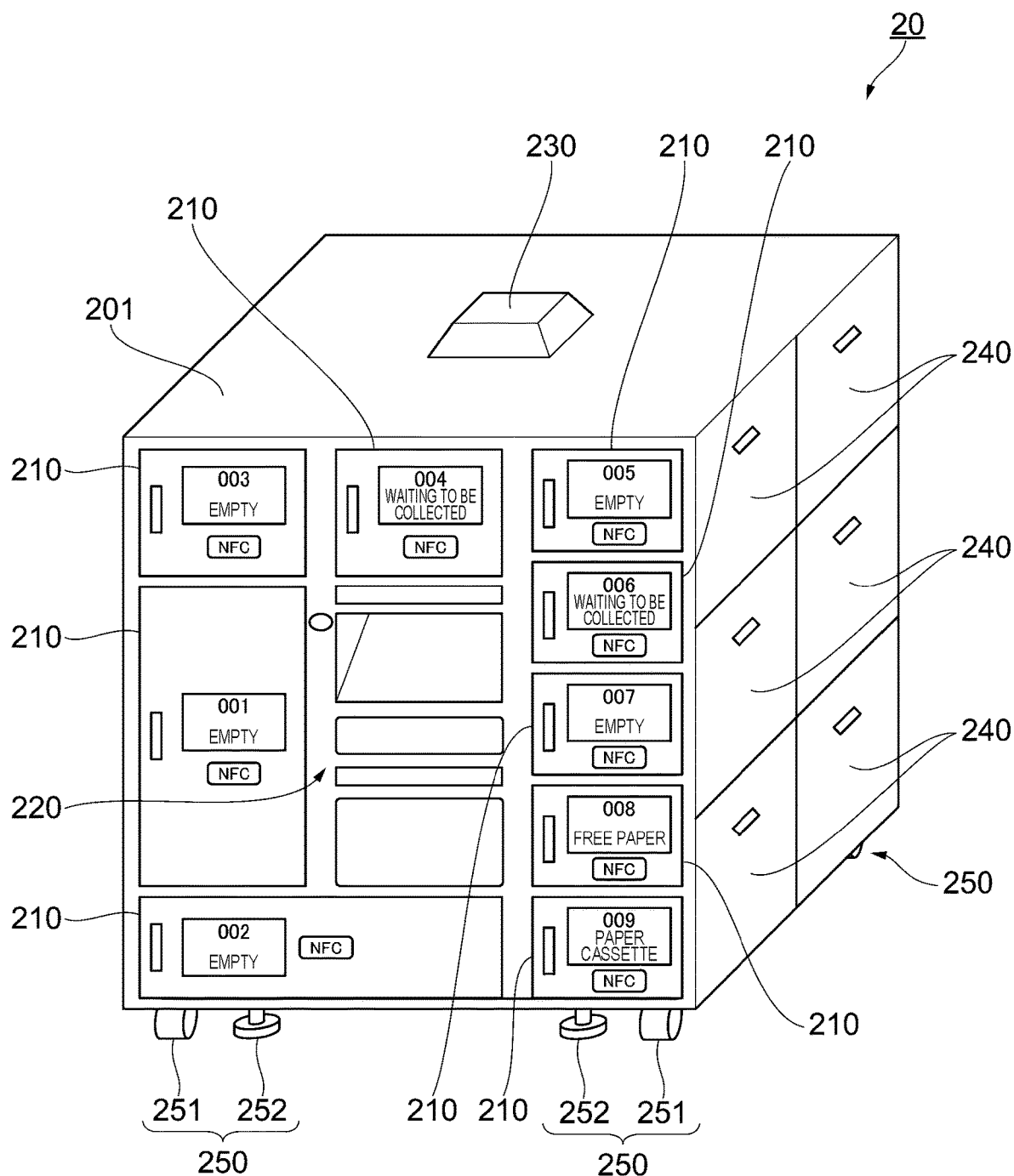
FIG. 2 is a view for explaining an example of appearance of a printing-function-equipped locker used in the first exemplary embodiment.

FIG. 2 is a view for explaining an example of appearance of the printing-function-equipped locker 20 used in the first exemplary embodiment.

Figure 3:
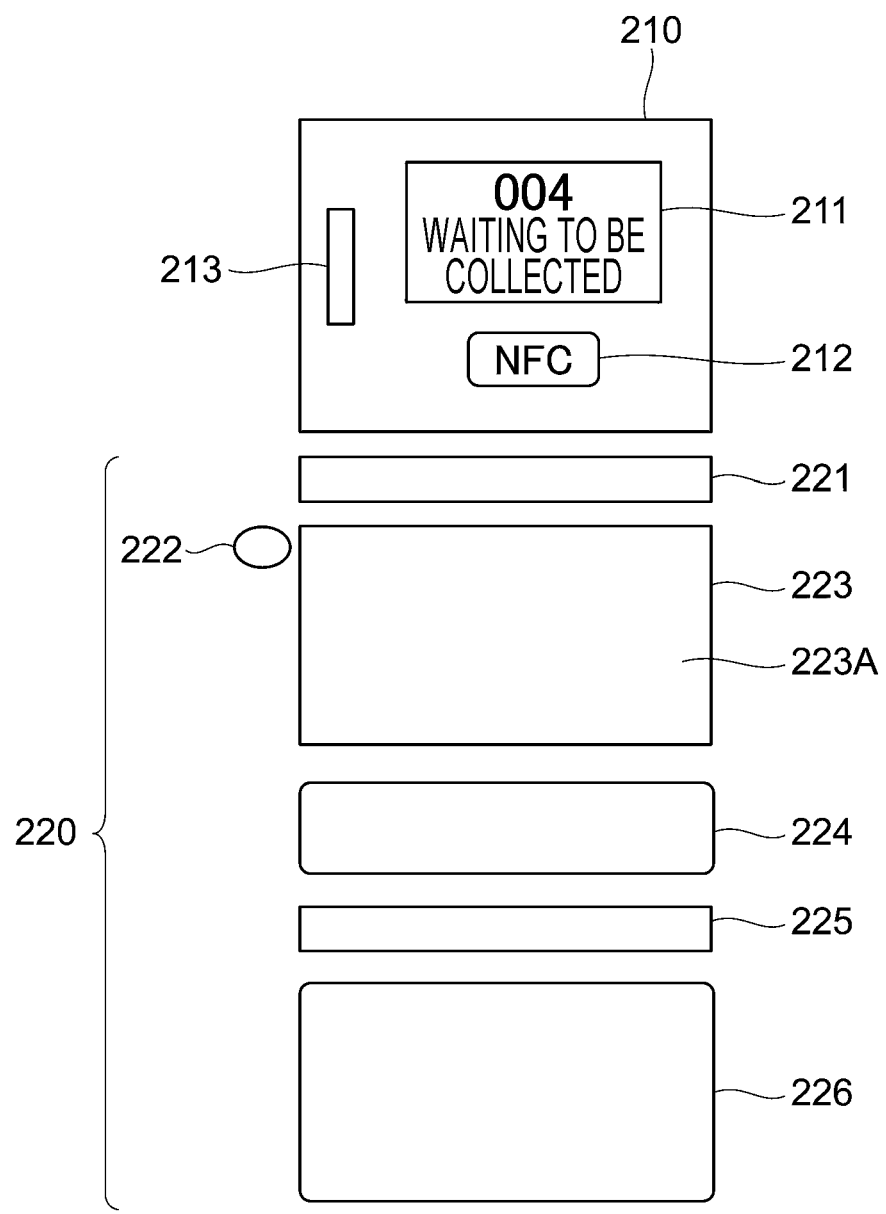
FIG. 3 is a view for explaining an example of appearance of a central column on a front face of the printing-function-equipped locker used in the first exemplary embodiment.

FIG. 3 is a view for explaining an example of appearance of a central portion of a front face of the printing-function-equipped locker 20 used in the first exemplary embodiment.

Figure 4A:
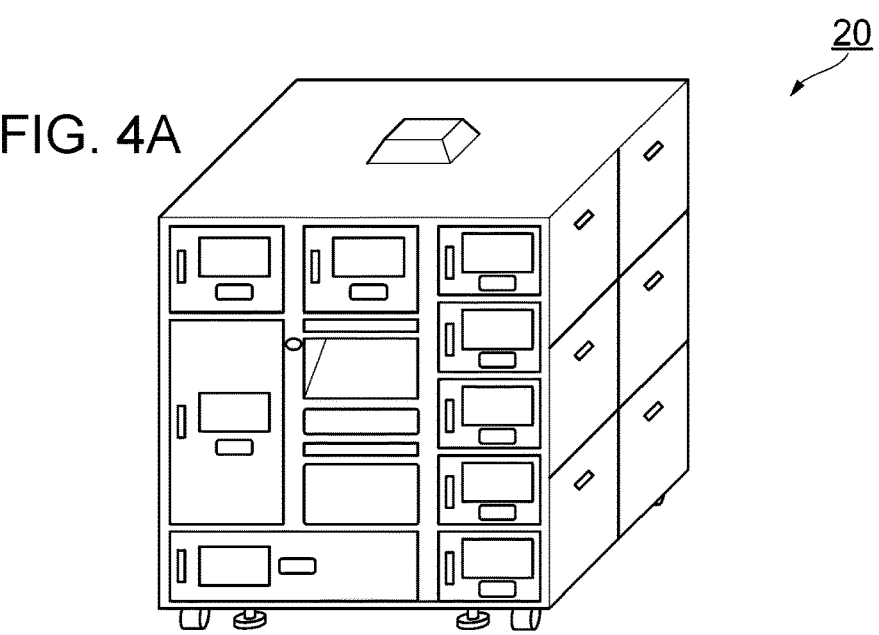
FIGS. 4A to 4D are views for explaining an example of a hexagonal structure of the printing-function-equipped locker used in the first exemplary embodiment.
Figure 4B:
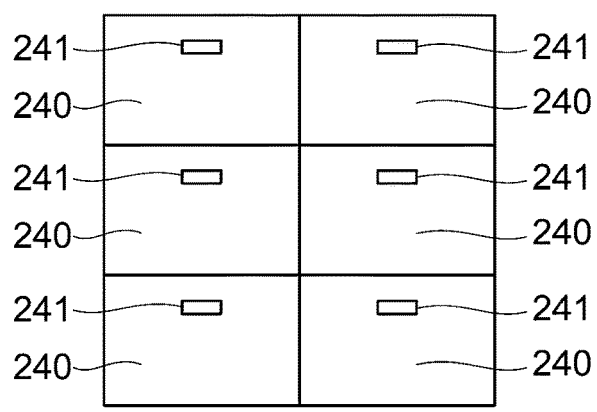
Figure 4C:
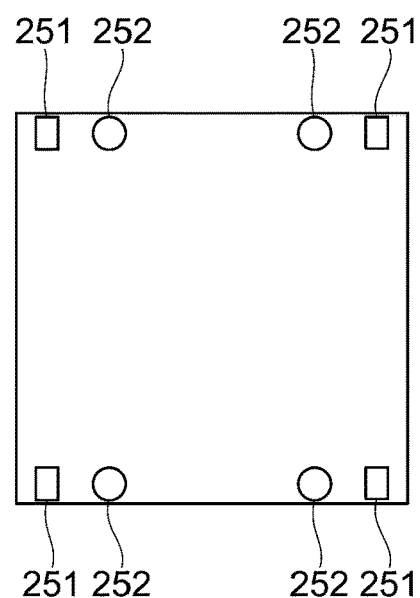
Figure 4D:
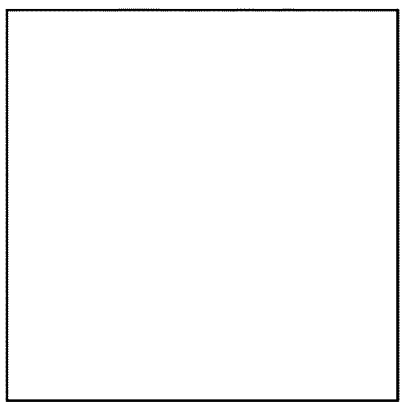

FIGS. 4A through 4D are views for explaining an example of a hexagonal structure of the printing-function-equipped locker 20 used in the first exemplary embodiment. FIG. 4A is a view illustrating a front face, a flat face, and a right side face, FIG. 4B is a left side view, FIG. 4C is a bottom view, and FIG. 4D is a back view. Note that FIG. 4A is cabinet projection drawn at an oblique angle of 45 degrees.

As illustrated in FIG. 2, the printing-function-equipped locker 20 has a substantially rectangular parallelepiped body 201, and has nine doors 210 used to take a printed material or baggage in and out and a front panel 220 on a front face thereof. When the nine doors 210 are opened, respective boxes are exposed.

Large-sized doors 210 are disposed in a central portion of a left column and in a lower stage. In FIG. 2, these doors 210 correspond to numbers "001" and "002" allocated to boxes.

Medium-sized doors 210 are disposed in an upper stage of the left column and in an upper stage of a central column. In FIG. 2, these doors 210 correspond to numbers "003" and "004" allocated to boxes.

Small-sized doors 210 are disposed on a right column. In FIG. 2, these doors 210 correspond to numbers "005" through "009" allocated to boxes.

As illustrated in FIG. 3, each of the doors 210 is provided with a display 211 used to display, for example, a status of use of a corresponding box, an NFC communication unit 212 that is compliant with a Near Field Communication (NFC) standard, and a gripped part 213.

Information on a status of use of a corresponding box and stored contents are displayed on the display 211 in addition to a number allocated to a corresponding door 210 or box.

In FIG. 3, "004", which is a number allocated to a corresponding box, and "WAITING TO BE COLLECTED" are displayed on the display 211. Note that "EMPTY" is displayed on the door 210 corresponding to a box in which no printed material or baggage is stored.

In the present exemplary embodiment, the term "pick up" is also used in the same meaning as "collect".

Furthermore, characters "FREE PAPER" and "PAPER CASSETTE" are displayed on some doors 210.

In FIG. 2, free paper is stored in a box with the second door 210 from the bottom on the right column to which "008" is allocated.

The door 210 to which "008" is allocated is not locked. Therefore, anyone can freely open and close the door 210 and take out stored free paper.

The door 210 of the box in which free paper is stored may be removed from the body 201.

Examples of the free paper include free magazines such as community newspapers, free newspapers, flyers, and coupon tickets. A magazine is, for example, a printed material that has undergone folding processing, staple processing, or binding processing with no staple.

Note that the information on a number allocated to a corresponding door 210 or box, a status of use, or the like need not always be displayed, and an advertisement may be displayed instead.

Furthermore, when a time of collection of a printed material or baggage comes, a user's name, a reservation number, or the like may be displayed on the display 211 of a target door 210 in order to direct user's attention to this door 210. Furthermore, a displayed color of the display 211 may be changed, luminance of the display 211 may be increased, or the display 211 may be caused to blink on and off so that a user does not operate a wrong door 210.

Furthermore, a paper size of a stored printed material or a size of baggage that can be stored may be displayed on the display 211.

In FIG. 2, the box with the bottommost door 210 on the right column to which "009" is allocated is used only to supply paper used for printing into the body 201. Therefore, in FIG. 2, "PAPER CASSETTE" is displayed on the display 211.

A structure of a box used as a paper cassette may be different from a structure of other boxes used for storage of a printed material and baggage. For example, a mechanism for transporting a bundle of supplied paper to a deeper portion of the body 201 or a mechanism for drawing out and transporting paper one by one may be disposed.

Paper supplied to the paper cassette is transported, for example, to a storage place provided, for example, on a back face side of the body 201. Different storage places are prepared for respective kinds and sizes of paper. By providing the paper cassette on a front face side of the body 201, paper can be easily supplied.

It is also possible to employ a mechanism in which paper is supplied by detaching a side face panel 240 as described later.

Although the door 210 given the number "009" is used exclusively for paper supply in the present exemplary embodiment, the door 210 given the number "009" may be reserved by an administrator only in a case where paper is supplied or maintenance is done, and the door 210 given the number "009" may be used for storage of a printed material or baggage in other time windows.

The door 210 occupied for supply of paper or maintenance for a reserved time window is not limited to "009". For example, any empty door 210 can be used, for example, for paper supply, provided that paper transported from a corresponding box can be transported to a storage place.

The door 210 secured for supply of paper or maintenance and a corresponding box are an example of a dedicated box exclusive for a specific purpose.

Another example of a dedicated box exclusive for a specific purpose is a box secured exclusively for discharging a scanned document.

Although the door 210 for paper supply has the same design as the other small-sized doors 210, the display 211 may be removed from the door 210 for paper supply since only staff in charge of maintenance operates the door 210 for paper supply.

Although an example in which characters "NFC" are printed on the NFC communication unit 212 is illustrated in FIG. 3, characters such as "TOUCH" may be printed or a drawing illustrating a smartphone or the like being held may be printed.

The gripped part 213 is a structure provided with a knob or a handle which a user grips when opening and closing the door 210 or a recess in which a user gets his or her finger caught when opening and closing the door 210. In the present exemplary embodiment, the door 210 is a hinged door that opens outward whose side on which the gripped part 213 is provided is a free side. Hinges are attached on a side opposite to the gripped part 213.

On the front panel 220 illustrated in FIG. 3, an insertion opening 221 into which a document to be scanned is inserted, a camera 222, a touch panel 223A used for an operation at the place where the printing-function-equipped locker 20 is installed and displaying information, a button unit 224 on which physical buttons and switches are disposed, a discharge opening 225 from which a printed material or the like printed in response to a print instruction given at the place is discharged, and a covering part 226 detached to replace or supply a recording material such as ink or toner are provided.

In the insertion opening 221, a tray that can be taken out from the body 201 and put into the body 201 may be prepared, and a document to be scanned may be placed on the tray that has been drawn out. Alternatively, a built-in tray may be disposed in an inner portion of the insertion opening 221. In the present exemplary embodiment, a printed material that can be transported one by one is assumed as the document. Note that the tray may be a tray having multiple stages corresponding to respective paper sizes.

In the present exemplary embodiment, the camera 222 is used for face authentication of a user and monitoring of surroundings of the body 201. The camera 222 may also be used as a substitute for a scanner 262.

The touch panel 223A is attached so as to be inclined with respect to the opening 223 in a depth direction. By thus inclining the touch panel 223A, viewability of a user operating the touch panel 223A is increased. The touch panel 223A may be attached without being inclined.

Although softkeys displayed on the screen can be operated since the touch panel 223A is used in FIG. 3, a display that is capable of only displaying information may be disposed instead of the touch panel 223A.

On the button unit 224, buttons such as a power button, a start button, and a stop button are disposed. A keyboard may also be disposed on the button unit 224.

The discharge opening 225 has a size that allows a user to take out a printed material discharged onto a tray disposed on a deeper side of the body 201 by inserting his or her hand. The tray disposed on a deeper side in the discharge opening 225 may be manually drawable or may be mechanically drawn out from and inserted into the body 201.

The covering part 226 is provided with a physical key or an electronic key that can be unlocked only by staff who replaces ink or toner. To unlock the electronic key, entry of an encryption key on a screen for maintenance displayed on the touch panel 223A or authentication using NFC may be used.

As illustrated in FIG. 2, a fire extinguisher 230 is attached to a central portion of the upper face of the body 201 according to the present exemplary embodiment. This is because the printing-function-equipped locker 20 contains therein machinery that consumes large electric power and stores therein an inflammable material such as paper, unlike a locker exclusive for storage of baggage.

The fire extinguisher 230 used in the present exemplary embodiment has a fuse that melts upon detection of a rise in temperature, a nozzle for ejecting chemical, and a container in which the chemical is hermetically contained.

For example, a metal that melts at 72° C. is used for the fuse. A neutral solution, which has small influence on human bodies and an environment, is used as the chemical.

Note, however, that a powder-type fire extinguishant may be used or a gas-type fire extinguishant such as carbon dioxide or "halon 1301" may be used. Alternatively, a foam-type fire extinguishant may be used.

Note that fire extinguishing equipment is not necessarily needed in the printing-function-equipped locker 20. The printing-function-equipped locker 20 may be configured not to have fire extinguishing equipment as appropriate. This is because there is a possibility that fire extinguishing equipment is built in a place where the printing-function-equipped locker 20 is installed. Specifically, in some cases, fire extinguishing equipment such as a sprinkler is provided on a ceiling of the place where the printing-function-equipped locker 20 is installed, and a fire occurring around the printing-function-equipped locker 20 can be dealt with this fire extinguishing equipment.

In a case where fire extinguishing equipment built in the place where the printing-function-equipped locker 20 is installed is used, fire extinguishing operation may be controlled in cooperation with the fire extinguishing equipment through communication with the fire extinguishing equipment.

In a case where the printing-function-equipped locker 20 has no fire extinguishing equipment, an effect of improving ease of installing the printing-function-equipped locker 20 is produced since such a printing-function-equipped locker 20 has flat appearance.

Figure 54A:
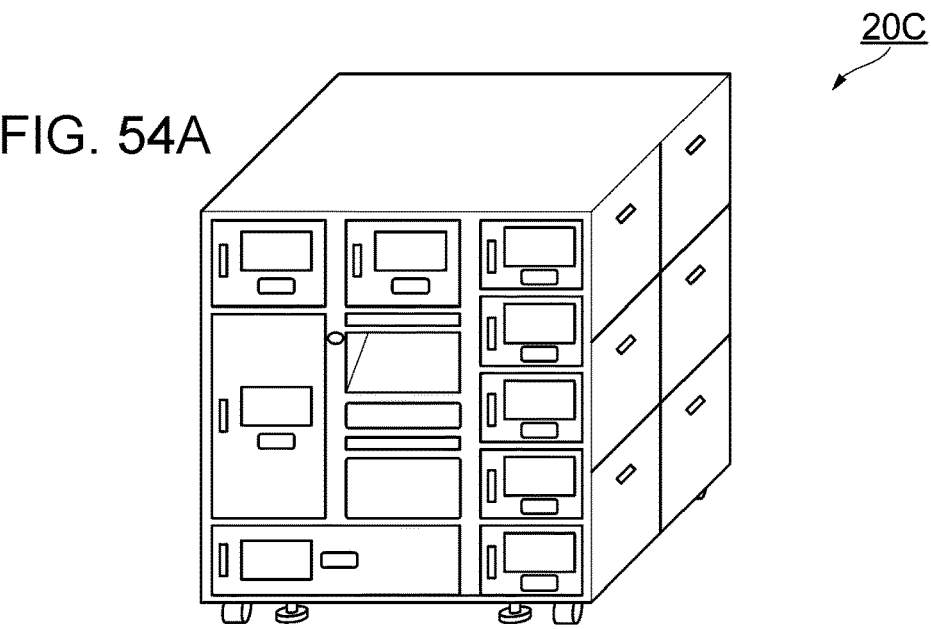
FIGS. 54A to 54D are views for explaining an example of a hexagonal structure of a printing-function-equipped locker that does not have fire extinguishing equipment.
Figure 54B:
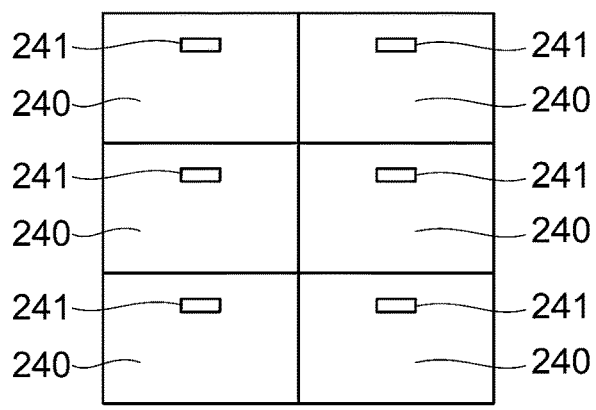
Figure 54C:
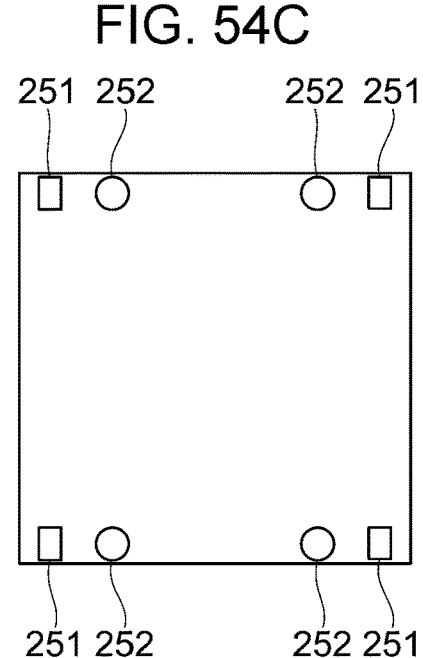
Figure 54D:
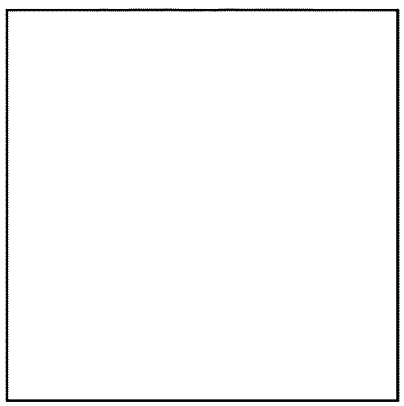

FIGS. 54A through 54D are views for explaining an example of a hexagonal structure of the printing-function-equipped locker 20C having no fire extinguishing equipment. FIG. 54 is a view illustrating a front face, a flat face, and a right side face, FIG. 54B is a left side view, FIG. 54C is a bottom view, and FIG. 54D is a back view. FIG. 54A is cabinet projection drawn at an oblique angle of 45 degrees. In FIGS. 54A through 54D, parts corresponding to those in FIGS. 4A through 4D are given corresponding reference signs.

As illustrated in FIGS. 2 and 4A through 4D, six side face panels 240 detached when an inside of the body 201 is accessed are disposed on a left side face and a right side face of the body 201 according to the present exemplary embodiment. That is, 12 side face panels 240 are disposed on both sides. Note that the number of side face panels 240 is an example.

In FIGS. 4A through 4D, each of the side face panels 240 is provided with a gripped part 241 for drawing out the side face panel 240. The side face panels 240 are drawn out or detached when a paper jam occurs or maintenance or repair of the printer or the transport mechanism is carried out.

The side face panels 240 may be drawable or may be detachable from the body 201.

It is necessary that only staff in charge of maintenance can detach the side face panels 240. Accordingly, each of the side face panels 240 is provided with a physical key or an electronic key. To unlock the electronic key, entry of an encryption key on a screen for maintenance displayed on the touch panel 223A or authentication using NFC may be used.

The side face panels 240 may be detached, for example, when a medium such as paper and a recording medium used for printing are supplied.

A caster 251 and an adjuster are disposed on each of four corners of the bottom of the body 201.

The caster 251 having a structure in which a wheel is attached to a fork with a shaft is used to move the body 201. The caster 251 used in the present exemplary embodiment may be provided with a stopper that fixes rotation of the wheel.

The adjuster 252 is used for height adjustment and horizontal adjustment of the body 201. The adjuster 252 has a member for grounding called a base and a bolt. There are various kinds of bases such as a base having a non-skid grounding surface, a base processed to protect a floor surface, and a base processed to prevent vibration.

Although the caster 251 and the adjuster 252 are provided at the four corners in the present exemplary embodiment, positions where the caster 251 and the adjuster 252 are provided are not limited to the four corners. Furthermore, the number of casters 251 and adjusters 252 are not limited to four and may be five or more. Although both of the caster 251 and the adjuster 252 are provided at the four corners of the bottom face in the present exemplary embodiment, only one of the caster 251 and the adjuster 252 may be provided at each position.

Furthermore, a metal fitting for fixing the adjuster 252 onto the floor surface may be attached to the bottom face of the body 201. For example, there are an anchor method and an anchorless method as a fixation method. According to the anchor method, the body 201 is fixed to the floor surface by screwing an anchor bolt into the floor surface. According to the anchorless method, the body 201 is fixed to the floor surface by fixing an adjuster to a mat fixed to the floor surface with use of highly-adhesive gel. Hardware Configuration of Printing-function-equipped Locker A hardware configuration of the printing-function-equipped locker 20 is described with reference to FIGS. 5 through 11.

Figure 5:
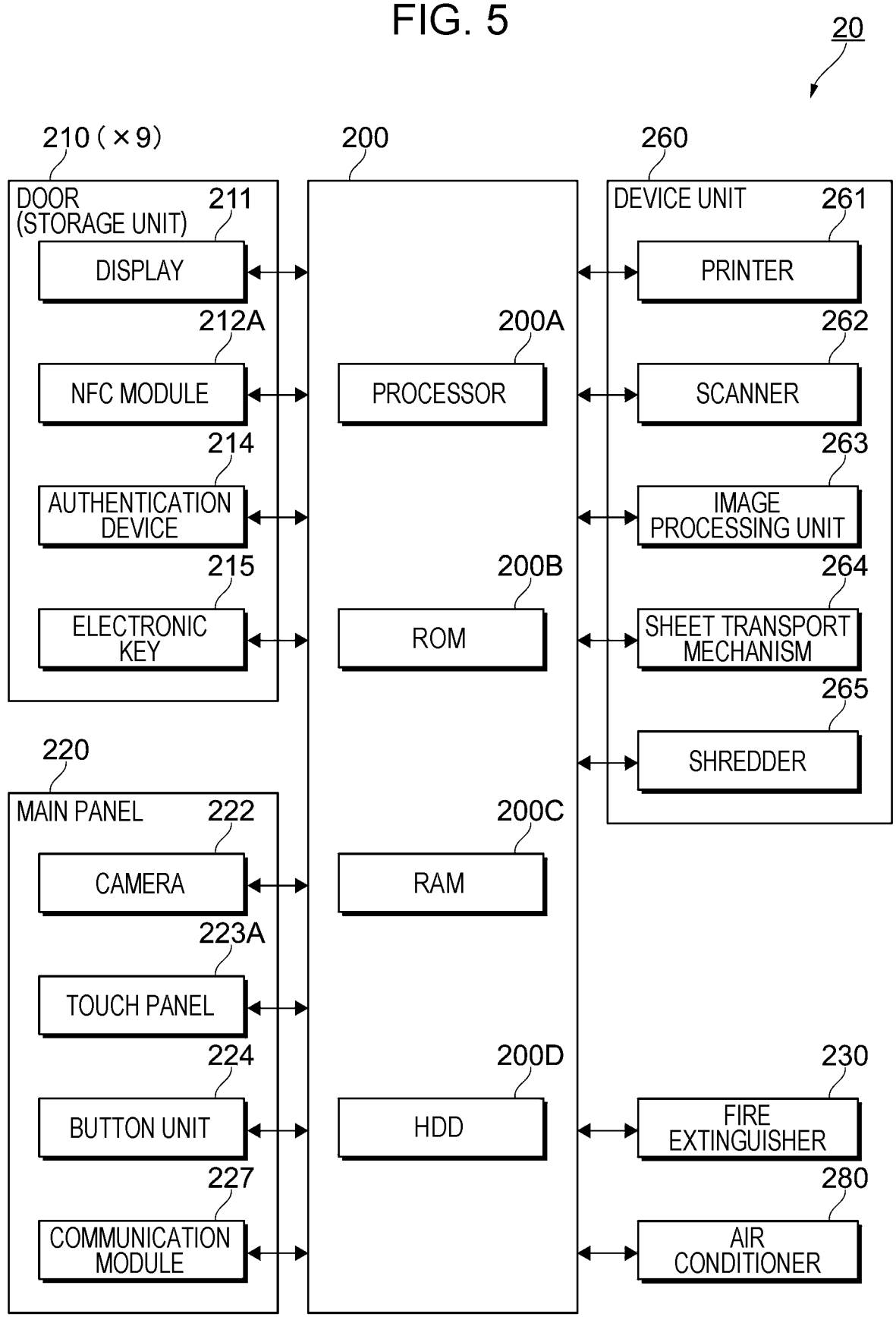
FIG. 5 is a view for explaining an example of a hardware configuration of the printing-function-equipped locker used in the first exemplary embodiment.

FIG. 5 is a view for explaining an example of a hardware configuration of the printing-function-equipped locker 20 used in the first exemplary embodiment.

The printing-function-equipped locker 20 illustrated in FIG. 5 includes a controller 200 that controls operation of the whole apparatus, the nine doors 210, the front panel 220, the fire extinguisher 230, a device unit 260, and an air conditioner 280.

The controller 200 has a processor 200A, a read only memory (ROM) 200B in which Basic Input Output System (BIOS) and others are stored, a Random Access Memory (RAM) 200C used as a work area, and a Hard Disk Drive (HDD) 200D in which not only basic software and application programs, but also image data obtained by the scanner 262, a data file of a document received from the management server 30 (see FIG. 1), and the like are stored. The controller 200 functions as a computer.

The HDD 200D is an auxiliary storage device using a magnetic disc as a recording medium. Although the HDD 200D is used as an auxiliary storage device in the present exemplary embodiment, a non-volatile rewritable semiconductor memory may be used.

On the front panel 220, devices related to a user's operation are gathered. In the present exemplary embodiment, the front panel 220 is provided with the camera 222 that takes an image of surroundings of the body 201 or am image of a face of a user who is operating the front panel 220, the touch panel 223A operated by a user using the printing-function-equipped locker 20, the button unit 224 on which physical button are disposed, and the communication module 227 used for communication with the management server 30 (see FIG. 1).

The touch panel 223A has a light-transmitting film-shaped capacitive sensor and a display. The display is a liquid crystal display or an organic Electro Luminescence (EL) display.

In the present exemplary embodiment, the devices that constitute the front panel 220 are observable from an outside except for the communication module 227. The communication module 227 is a device that is compliant with Bluetooth (Registered Trademark) or NFC.

The front panel 220 may be provided with a slot or the like for attachment of a portable semiconductor memory carried by a user such as a Universal Serial Bus (USB) memory or an SD card.

The device unit 260 is provided in an empty space of the body 201 (see FIG. 1). In the present exemplary embodiment, the device unit 260 includes a printer 261 that prints a document on paper, the scanner 262 that optically reads a document, an image processing unit 263 that performs color correction, gradation correction, and the like on image data, a sheet transport mechanism 264 that transports paper before or after printing to a target place, and a shredder 265 that shreds paper.

The printer 261 uses toner or ink as a recording material. Which recording medium is used varies depending on a product.

The scanner 262 according to the present exemplary embodiment includes a mechanism that optically reads a document.

Examples of a document reading method include a Contact Image Sensor (CIS) method and a Charge Coupled Device method. Documents that have been read may be returned to the insertion opening 221 after completion of all of the documents, may be discharged one by one from the discharge opening 225 (see FIG. 3), or may be discharged to an empty box.

Image data obtained by the scanner 262 is used, for example, for printing on paper, writing into the HDD 200D or a mobile recording medium, and transmission or upload to an external device.

Although an image of a document is read by using the scanner 262 in the present exemplary embodiment, an image of a document may be read by using the camera 222 (see FIG. 5) provided on the front panel 220. An instruction to take an image of a document by using the camera 222 is given, for example, on the touch panel 223A.

A certain box may be used as a place where a document is placed. However, this function is available only in a case where a document in the box can be transported to the scanner 262 by the sheet transport mechanism 264.

A document that has been read by the scanner 262 may be returned to the same box or may be discharged to a different box. Alternatively, a document that has been scanned may be discharged from the discharge opening 225 (see FIG. 3).

A document that has been scanned may be shredded by the shredder 265. For example, in a case where a purpose is to computerize a document and it is unnecessary to keep the original document, shredding by the shredder 265 is selected. The shredder 265 is an example of a shredding unit.

Both in a case where a document that has been scanned is discharged to any of the boxes and a case where a document that has been scanned is shredded, a user is notified about completion of scanning through display on the touch panel 223A. Alternatively, a user may be notified about completion of scanning through voice or alarm sound.

The image processing unit 263 is a dedicated processor or processing circuit for processing image data.

The sheet transport mechanism 264 is used not only to transport paper in the body 201 but also to change a direction of paper. A direction of transport is not limited to a horizontal direction, an up-down direction, and a front-rear direction. The sheet transport mechanism 264 includes rollers and a belt.

Figure 6:
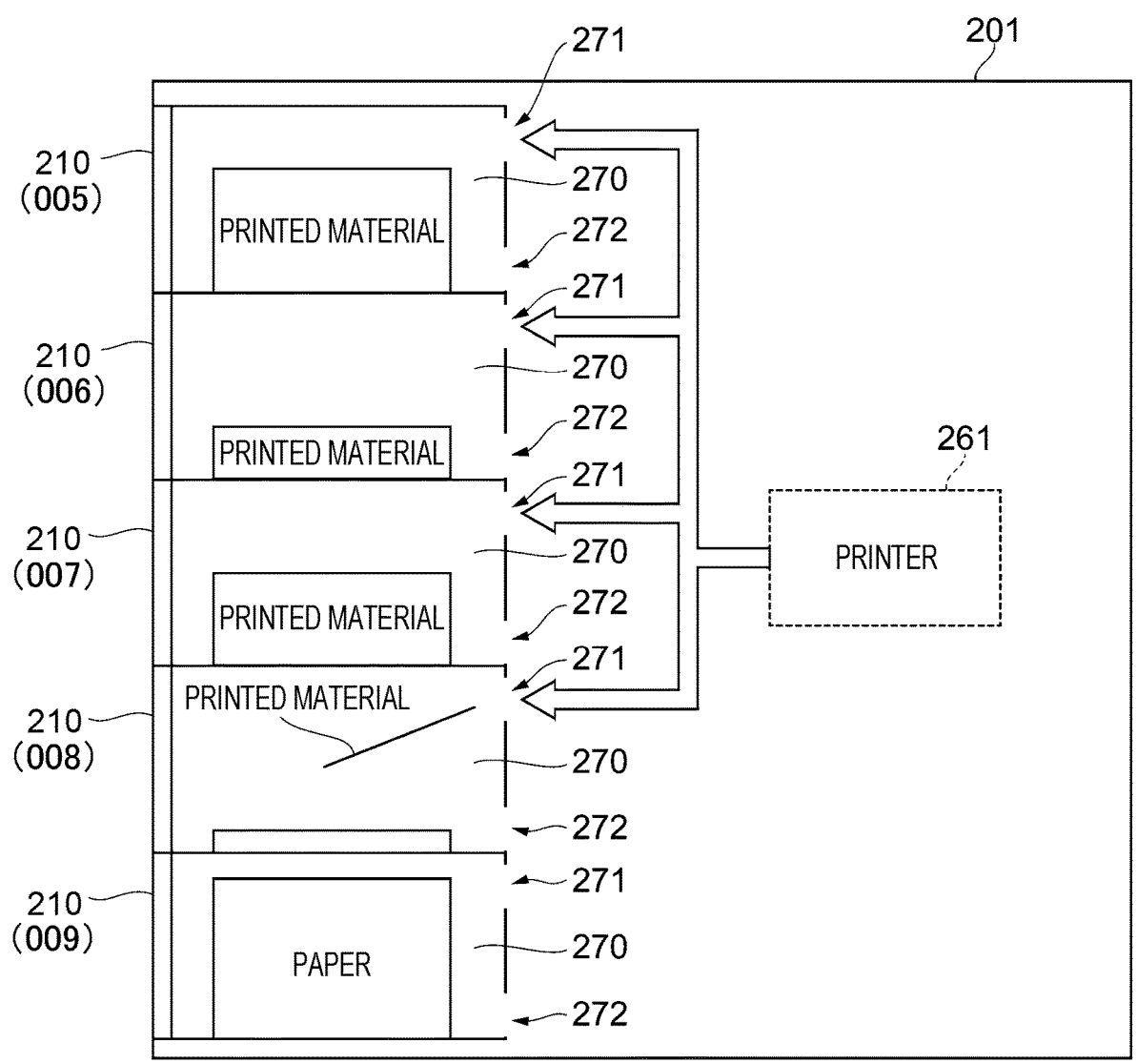
FIG. 6 is a view for explaining transport of a printed material by a sheet transport mechanism.

FIG. 6 is a view for explaining transport of a printed material by the sheet transport mechanism 264 (see FIG. 5). FIG. 6 illustrates an inside of the body 201 that is seen through from a right side face side.

The arrows in FIG. 6 indicate paths through which a printed material output by the printer 261 is transported.

Five doors 210 illustrated in FIG. 6 correspond to "005" to "009" of the boxes 270, respectively.

The position of the printer 261 in FIG. 6 is only provisional, and therefore the printer 261 is indicated by the broken line.

Two slits 271 and 272 are provided on a far side of each of the boxes 270. The slit 271 is provided in an upper portion on the far side of each of the boxes 270 and is used to insert a printed material into the box 270.

The slit 272 is provided in a lower portion on the far side of each of the boxes 270 and is used to discharge a printed material from the box 270.

In the present exemplary embodiment, the box 270 given "009" is used exclusively for supply of paper and is therefore not included in destinations of a printed material output from the printer 261.

Figure 7:
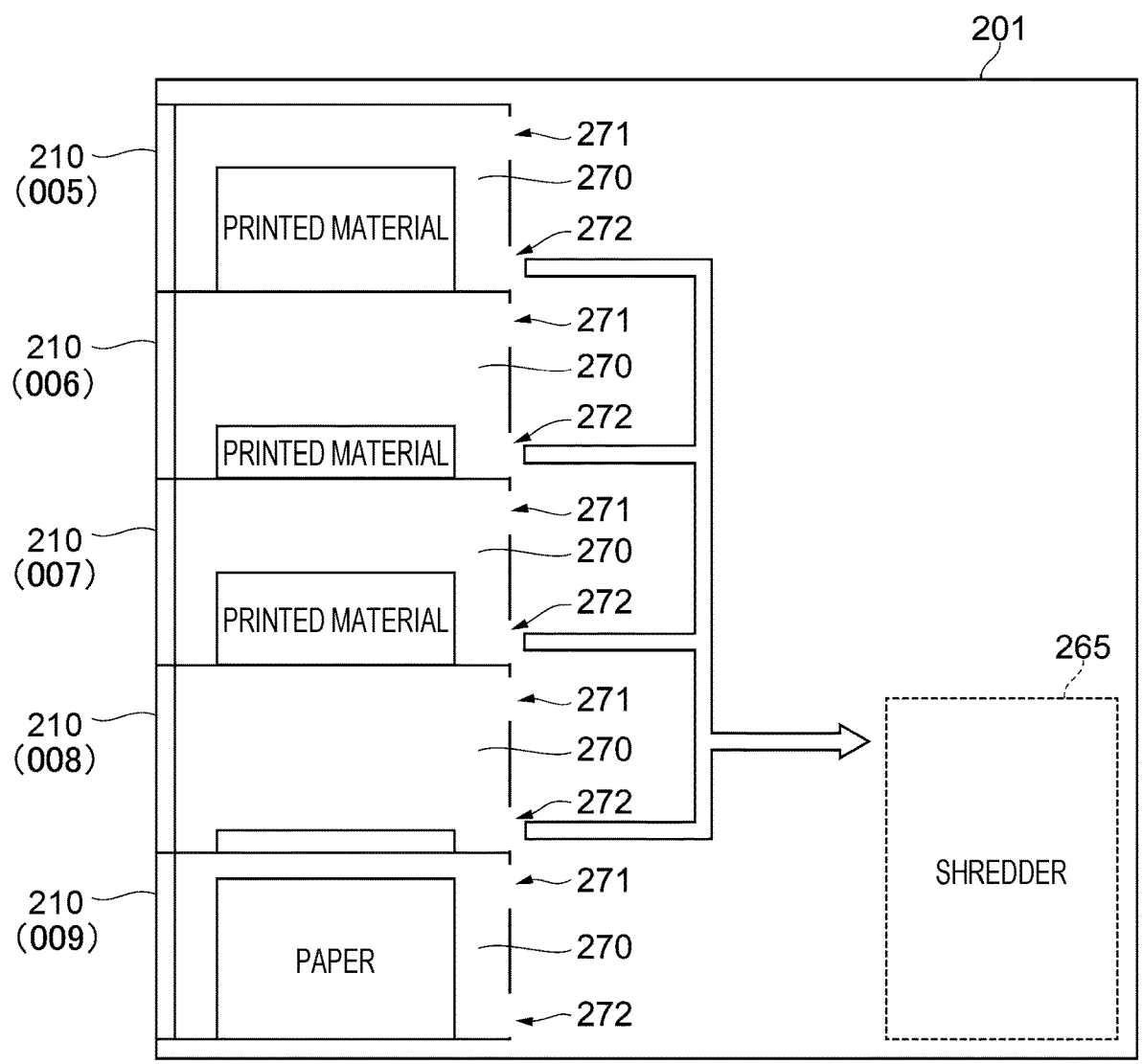
FIG. 7 is a view for explaining discard of a printed material by the sheet transport mechanism.

FIG. 7 is a view for explaining how a printed material is discarded by the sheet transport mechanism 264 (see FIG. 5). In FIG. 7, parts corresponding to those in FIG. 6 are given corresponding reference signs.

FIG. 7 also illustrates the inside of the body 201 seen through from the right side face side.

The slit 272 is used to discard a printed material. In the present exemplary embodiment, a transport mechanism such as rollers and a belt is provided on a bottom face of each of the boxes 270, and a printed material that is stored for more than a predetermined storage period is transported to the shredder 265 through the slit 272. Alternatively, the whole box 270 may be moved to a position where the shredder 265 is provided, and then stored paper may be shredded by the shredder 265.

As described above, the sheet transport mechanism 264 is also used for transport of a document.

Furthermore, the sheet transport mechanism 264 is also used for transport of paper before printing.

See FIG. 5 again.

Each of the doors 210 is provided with a display 211, an NFC module 212A, an authentication device 214, and an electronic key 215.

The display 211 is a liquid crystal display or an organic EL display and displays, for example, a number allocated to a corresponding door 210 or box 270 and a status of use as described above.

The NFC module 212A is a device that reads out, for example, information for identifying a user from the mobile terminal 10 such as a smartphone brought close to and placed over the NFC communication unit 212. The NFC module 212A according to the present exemplary embodiment is used to read out information such as a number issued upon reservation and a name.

In a case where each of the doors 210 is provided with buttons for entering numerals and symbols in addition to the display 211, information such as a number issued upon reservation and a name may be entered by operating these buttons. In a case where such buttons are provided, a user can take out a printed material or baggage without carrying the mobile terminal 10 such as a smartphone.

In a case where a touch panel is used instead of the display 211, information such as a number and a name may be entered on the touch panel. Alternatively, to identify a user, biological information registered in advance such as a fingerprint, an iris, veins, a face image, or voice may be used.

Note that a user can open a target door 210 and take out a printed material or baggage by entering information on the touch panel 223A of the front panel 220 without entering a number or the like on the target door 210. In this sense, the door 210 need not be provided with the NFC communication unit 212 (see FIG. 3).

The authentication device 214 of each door 210 determines whether or not the electronic key 215 of the door 210 can be unlocked by comparing information read from the user's terminal 10 or entered information with management data supplied from the management server 30 (see FIG. 1). The electronic key 215 is an example of a locking mechanism.

In a case where the read information matches information on a user associated with the door 210, the authentication device 214 gives an instruction to unlock the electronic key 215. Meanwhile, in a case where the read information is different from information on a user associated with the door 210, the authentication device 214 does not give an instruction to unlock the electronic key 215.

In a case where information is entered by a user on the front panel 220, the information is transferred from the front panel 220 to the authentication device 214 of a corresponding door 210.

The function of the authentication device 214 may be executed on the controller 200 side. Note that the function of the authentication device 214 is realized through execution of an application program.

In a case where the electronic key 215 is locked, the door 210 cannot be opened mechanically and electrically. In a case where the electronic key 215 is unlocked, the door 210 can be opened and closed freely.

The fire extinguisher 230 is attached onto the upper face of the body 201 (see FIG. 1). A way in which the fire extinguisher 230 is attached is not limited to that illustrated in FIG. 1.

FIGS. 8A through 8I are views for explaining an example of attachment of the fire extinguisher 230. FIGS. 8A through 8I illustrate various examples of attachment of the fire extinguisher 230.

FIG. 8A illustrates an example in which the fire extinguisher 230 is mounted as it is on the upper face of the body 201.

FIG. 8B illustrates an example in which the fire extinguisher 230 is disposed on an inner side of a U-shaped position determining member 201A on the upper face of the body 201. A C-shaped, D-shaped, or O-shaped member may be used instead of the U-shaped position determining member 201A. In FIG. 8B, a height of the position determining member 201A is substantially same as a height of the fire extinguisher 230 but need not be the same. That is, the height of the position determining member 201A may be higher than the height of the fire extinguisher 230 or the height of the position determining member 201A may be lower than the height of the fire extinguisher 230.

FIG. 8C illustrates an example in which the fire extinguisher 230 is disposed on an inner side of the U-shaped position determining member 201A on the upper face of the body 201 and an upper face of the fire extinguisher 230 is further covered with a lid 201B.

FIG. 8D illustrates an example in which the whole upper face of the body 201 is covered with a covering part 201C. By covering the whole upper face of the body 201 with the covering part 201C, appearance becomes simple since no bulging part is present on the upper face.

FIG. 8E illustrates an example in which the fire extinguisher 230 is disposed on the back face side of the body 201 and a pipe 230A is guided to a center on the upper face of the body 201. Note that the fire extinguisher 230 may be disposed on a right side face of the body 201 or may be disposed on a left side face of the body 201. Alternatively, the fire extinguisher 230 may be disposed in a gap on the bottom face of the body 201. The pipe 230A is guided to the center on the upper face of the body 201 in order to diffuse a fire extinguishant evenly in the body.

FIG. 8F illustrates an example in which the fire extinguisher 230 and an air blower 230B are disposed on the upper face of the body 201. The air blower 230B is used for the purpose of forming a flow of air in the body 201 and assisting diffusion of a fire extinguishant ejected from the fire extinguisher 230. Although the air blower 230B is disposed on the upper face of the body 201 on which the fire extinguisher 230 is disposed in FIG. 8F, the air blower 230B may be disposed on the back face or may be disposed on a side face.

FIG. 8G illustrates an example in which the fire extinguisher 230 and a ventilation fan 230C are disposed on the upper face of the body 201. The ventilation fan 230C is used for the purpose of discharging smoke from the body 201. Although the ventilation fan 230C is disposed on the upper face of the body 201 on which the fire extinguisher 230 is disposed in FIG. 8G, the ventilation fan 230C may be disposed on the back face or may be disposed on a side face.

FIG. 8H illustrates an example in which the fire extinguisher 230 is fixed onto a ceiling of the body 201 with use of an attachment fitting 201D. The number of attachment fittings 201D may be one or may be more than one, and the attachment fitting 201D fixes the fire extinguisher 230 so that the fire extinguisher 230 does not fall off from the ceiling. FIG. 8H illustrates an example in which the fire extinguisher 230 is provided in an inner space of the body 201 unlike the other examples described above. In this example, it is unnecessary to form, in the ceiling, a hole or an opening for guiding a fire extinguishant ejected from the fire extinguisher 230 provided on the upper face of the body 201.

FIG. 8I illustrates an example in which the fire extinguisher 230 is attached integrally with the ceiling of the body 201, for example, by welding.

See FIG. 5 again.

The air conditioner 280 is an apparatus that adjusts temperature, humidity, cleanliness, and the like of air in the body 201 and in the individual boxes 270 (see FIG. 6). The air conditioner 280 may be built in the body 201 or may be externally attached to the body 201. Adjustment of air includes chilled storage and frozen storage.

A box 270 used as a refrigerator or a freezer is excluded from boxes for storing a printed material.

In a case where the printing-function-equipped locker 20 is disposed outdoors or in a case where the printing-function-equipped locker 20 is disposed in a place such as an underground passage where humidity and cold air tend to accumulate, ink dries at a slower speed. This increases a risk of decline in quality such as blur and sticking together of paper.

Similarly, in a high-humidity environment such as a rainy season, a stored printed material or paper may deform due to humidity.

Meanwhile, in a case where the printing-function-equipped locker 20 is installed in a place exposed to summer sunshine, a temperature in the body 201, which is a closed space, becomes high. This may cause malfunction of machinery.

In view of this, in the present exemplary embodiment, air temperature, humidity, and the like in the body 201 and in the individual boxes 270 are adjusted by using the air conditioner 280. For example, drying of ink can be promoted and thereby print quality can be increased by lowering the humidity in the boxes and the body 201. Furthermore, for example, malfunction of machinery can be made less likely to occur by adjusting the air temperature in the body 201 within a predetermined range. In the present exemplary embodiment, for example, a box managed to be in a temperature range of 15° C. to 25° C. is used for storage of a printed material. Note that the air temperature or temperature range is an example, and the upper limit value and the lower limit value are rough standards.

Not all of the boxes 270 need be air-conditioned by the air conditioner 280, and only one or some of the boxes 270 may be air-conditioned by the air conditioner 280.

Air conditioning using the air conditioner 280 may be fixed to temperature, humidity, and the like preset by a service provider or an owner or may be changed to temperature, humidity, and the like desired by a user. The user designates the desired temperature, humidity, and the like when making a reservation for the service.

Example of Management Data

Figure 9:
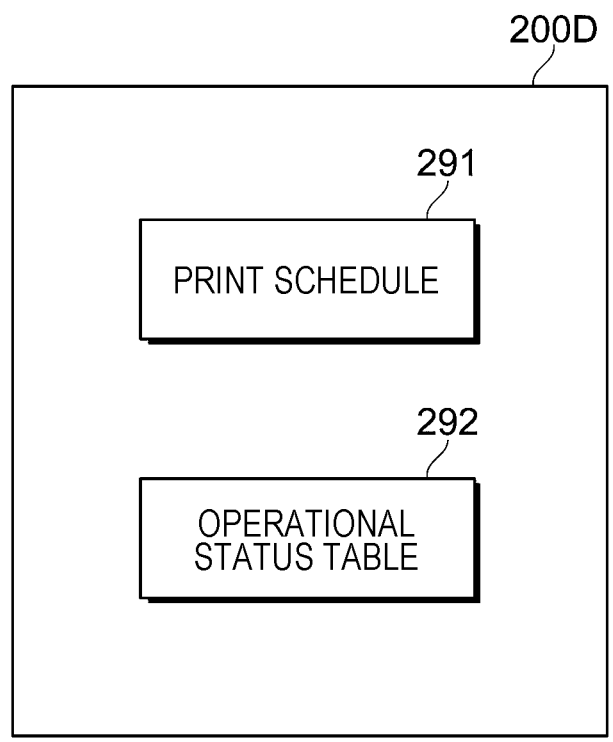
FIG. 9 is a view for explaining an example of management data stored in an HDD of a controller.

FIG. 9 is a view for explaining an example of management data stored in the HDD 200D of the controller 200 (see FIG. 9).

The HDD 200D according to the present exemplary embodiment stores therein, as management data, a print schedule 291 and an operational status table 292.

FIG. 10 illustrates a data example of the print schedule 291. The print schedule 291 illustrated in FIG. 10 includes a management ID, a reservation ID, start data and time, end date and time, paper, and the number of sheets. Note that the data example illustrated in FIG. 10 is an example, and the print schedule 291 may include information such as special settings concerning document printing.

The management ID is a number prepared for management in the printing-function-equipped locker 20.

The print schedule 291 is information for managing an operation schedule of the printer 261 (see FIG. 5). Accordingly, a management ID that has been already used can be used again unless the same number is used during the same period. A management ID is issued by an application program that manages the print schedule 291.

Meanwhile, a reservation ID is a number uniquely allocated in the whole printbox service managed by the management server 30 (see FIG. 1). A reservation ID is issued by the management server 30. Note that a management ID that has been already used can be used again unless the same number is used during the same period.

The start date and time and end date and time are set, for example, in consideration of a scheduled pickup time at which a user is scheduled to pick up a printed material and a printing time predicted, for example, from the number of printed sheets. The "scheduled pickup time" is also referred to as "scheduled pickup date and time".

Needless to say, the start date and time and end date and time for all reservations are decided so that printing of a printed material is finished before a scheduled pickup time.

Although a specific time is designated as the scheduled pickup time in the present exemplary embodiment, a predetermined range may be designated as the scheduled pickup time. For example, a range of 30 minutes (e.g., 17:00 to 17:30) may be designated.

In a case where a range is designated as the scheduled pickup time, a print schedule and the like are set on the basis of an earliest time of the range.

Note that the start date and time and end date and time are desirably revised every time a new reservation is received. For example, in a case where the number of printed sheets designated by a reservation received later is large and printing cannot be finished according to an initial schedule, a larger number of reservations can be handled by changing start time and end time of an existing reservation.

Note, however, that printing of a printed material need not be executed at one time during a continuous time and may be executed by utilizing spare times. For example, in a case where spare times are 01:30 to 2:30, 03:15 to 03:25, and 05:20 to 05:50, a single reservation may be allocated to these three spare times.

Note that a latest time of end date and time of printing can be any time before a scheduled pickup time at which a user is scheduled to pick up a printed material. In the present exemplary embodiment, a time margin is set to 30 minutes. That is, the latest time is decided so that printing is completed at least 30 minutes before a scheduled pickup time. In this case, start date and time of printing is decided from an estimated value of a printing time.

The end date and time may be calculated by using the start date and time and an estimated value of a printing time, and the start date and time may be set again only in a case where a latest time of the end date and time exceeds a predetermined standard, that is, in a case where a time margin is less than 30 minutes.

Although "A4" and "A5", which indicate paper sizes, are illustrated in the "paper" column in FIG. 10, information on a paper kind such as gloss paper or an envelope may be recorded. Other examples of a paper kind include coated paper, a clear file folder, and plain paper. Note, however, that information on a paper kind or the like may be managed as a different item.

The number of printed sheets is indispensable. An estimated value of a printing time can be calculated as long as the number of printed sheets and a printing speed of the printer 261 are known.

FIG. 11 illustrates a data example of the operational status table 292. The operational status table 292 illustrated in FIG. 11 includes a management ID, a reservation ID, a box ID, information on use, a scheduled pickup time, an actual pickup time, and whether or not to use air-conditioning. Note that the data example illustrated in FIG. 11 is an example, and, for example, information on intended use may be additionally stored.

The management ID is a number prepared for management of an operational status of each box in the printing-function-equipped locker 20.

The management ID in the operational status table 292 is managed separately from the management ID of the print schedule 291.

This management ID can also be used again even if it is used once, unless the same number is used during the same period. The management ID is issued by an application program that manages the operational status table 292.

In a case where management of storage and pickup of baggage is executed in a complete manner in the printing-function-equipped locker 20, the management ID is issued by an application program that manages storage of baggage. In this case, a user who leaves baggage and a user who takes out the baggage are sometimes the same, for example, as in a case of a coin-operated locker.

In a case where storage of baggage such as home delivery or mail delivery is also managed by the management server 30, a management ID different from a management ID for printing and storage of a printed material is issued as a management ID for management of storage of baggage.

Management of baggage such as home delivery or mail delivery is started when the baggage is put into an empty box.

In the present exemplary embodiment, a box used for storage of baggage and a box used for storage of a printed material are distinguished.

The reservation ID is a number uniquely allocated in the whole printbox service managed in the management server 30 (see FIG. 1). This reservation ID enables association with the management ID of the print schedule 291.

The box ID is a number or other information for identifying a managed box of the printing-function-equipped locker 20. For example, numbers "A1_001" to "A1_009" are used as box IDs. Note that the box IDs are not limited to "A1_001" to "A1_009" as long as the box IDs can identify boxes.

In the "USE" column, a current status including scheduled use is recorded. A box that is not scheduled to be used is managed as "EMPTY". Meanwhile, information indicating "being used" is recorded for a box that is scheduled to be used or a box that is being used. In FIG. 11, the circle mark is recorded.

In the "SCHEDULED PICKUP TIME" column, a scheduled pickup time which a user entered when making a reservation is recorded. This scheduled pickup time is used to decide the print schedule 291 and calculate a time elapsed from the scheduled pickup time.

In the "PICKUP TIME" column, a time of actual pickup of a printed material is recorded. This time is referred to when a fee charged by the management server 30 is calculated. As for a box given "A1_008", "NONE" is written in the "SCHEDULED PICKUP TIME" column since free paper is stored in this box. That is, the box given "A1_008" is being used but has no scheduled pickup time.

In the "AIR CONDITIONING" column, whether or not to use air conditioning, whether or not to desire use of air conditioning, or the like is recorded. The air conditioning includes adjustment of humidity in addition to cooling and heating. An air temperature inside a box can also be kept constant by using the air conditioner 280 (see FIG. 5).

The presence of the "AIR CONDITIONING" column does not necessarily mean that air conditioning of the boxes 270 can be individually managed in the printing-function-equipped locker 20.

Furthermore, even in a case where air conditioning is available, this does not necessarily mean that air conditioning of all of the boxes 270 is managed.

Configuration of Management Server

Figure 12:
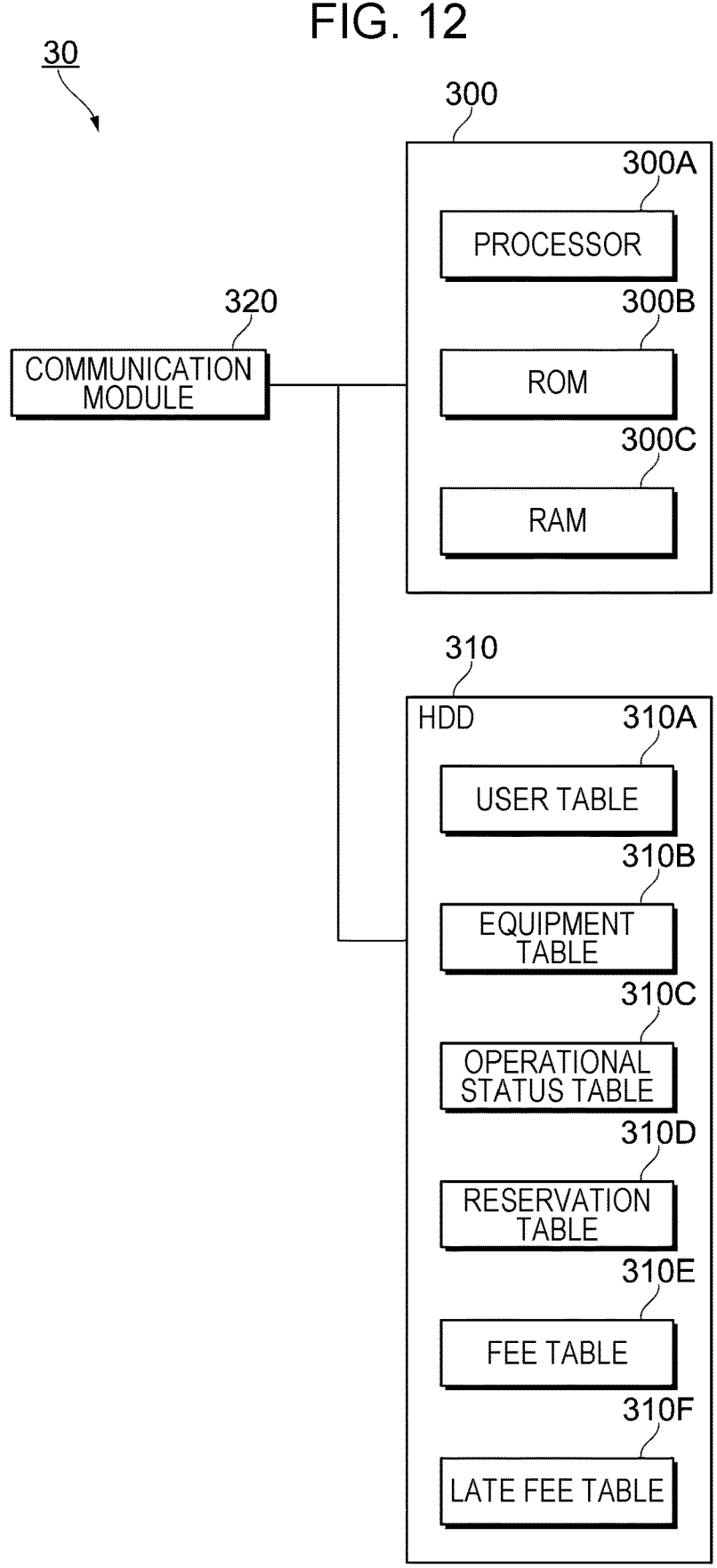
FIG. 12 is a view for explaining an example of a hardware configuration of a management server used in the first exemplary embodiment.

FIG. 12 is a view for explaining an example of a hardware configuration of the management server 30 used in the first exemplary embodiment.

The management server 30 illustrated in FIG. 12 has a controller 300, an HDD 310, and a communication module 320.

The controller 300 has a processor 300A, a ROM 300B in which BIOS and others are stored, and a RAM 300C used as a work area.

The communication module 320 is used for communication with the terminal 10 and the printing-function-equipped locker 20.

The HDD 310 stores therein management data for managing a reservation of printing and storage. In the present exemplary embodiment, a user table 310A, an equipment table 310B, an operational status table 310C, a reservation table 310D, a fee table 310E, and a late fee table 310F are stored as the management data.

FIGS. 13A and 13B illustrate a data example of the user table 310A. FIG. 13A illustrates an example of a table in which both individuals and business operators are managed, and FIG. 13B illustrates an example of a table unique to a business operator.

The user table 310A illustrated in FIG. 13A includes a management ID, a name, a registration form, a user account, a special agreement, and other information. Note that a user's face image or other biological information may be registered.

The management ID is given to each user registered in the printbox service. Although a five-digit number is used in FIG. 13A, the number of digits is not limited. Furthermore, the management ID is not limited to numerals and may be combined with an alphabet and/or a symbol.

In FIG. 13A, both an individual name and a company name are present in the "NAME" column.

In the "REGISTRATION FORM" column, information indicating whether a user is an individual or a corporation is registered. Note that a sex may be registered as for an individual.

In FIG. 13A, a user's e-mail address is registered as the user account. Information on a user account is also used for notification related to a reservation and for identification of a user. As for a corporation, a company e-mail address or a character string after the @ mark is recorded as the user account. As for "COMPANY AB", only a character string after the @ mark is registered. Accordingly, a user having an e-mail address whose character string after the @ mark matches this character string after the @ mark is regarded as belonging to the "COMPANY AB", and a special agreement for the "COMPANY AB" is applied to this user.

In the "SPECIAL AGREEMENT" column, whether or not there is an individual special agreement for use of the printbox service is recorded.

Examples of the special agreement include a special agreement concerning payment, a period for which the service is available, the number of times the service is available, a kind of available service, an area or a place where the service is available, and a terminal used to upload a document.

The special agreement concerning payment is, for example, an upper limit on a fee for each use or an upper limit, for example, on a monthly fee.

The period for which the service is available is, for example, a yearly-basis, a monthly-basis, a weekly-basis, or a time window. For example, this period may be set so that use in the morning is permitted but use in the afternoon is not permitted. This use is a scheduled pickup time.

The number of times the service is available is, for example, the number per year, per month, per week, or the like.

The kind of available service is, for example, only black-and-white printing, only both-sided printing, the number of printed sheets or the number of copies permitted in one printing, or the number of printed sheets or the number of copies permitted during a predetermined period.

The area or a place where the service is available is, for example, all domestic areas, a specific domestic area, all foreign countries and areas, or a specific foreign country or area.

The terminal used to upload a document is, for example, an individual terminal, an unspecified terminal, or a terminal registered in a company or the like.

In FIG. 13A, a special agreement is present only for the "COMPANY AB". The special agreement for the "COMPANY AB" is managed in the table illustrated in FIG. 13B.

The user table 310A illustrated in FIG. 13B includes an employee ID, a name, a user account, a department, and a use authority.

The employee ID is an ID used for management in a corporation. Note, however, that an ID different from the ID used in the corporation may be newly given for the purpose of hiding the employee ID.

The department is registered according to need in management.

In the "USE AUTHORITY" column, whether a user is an employee who is permitted to use the printbox service or an employee who is not permitted to use the printbox service is recorded. In the example of FIG. 13B, an employee who has a lot of opportunities to visit customers is given an authority to use the printbox service, but an employee who basically works inside the office is not given an authority to use the printbox service.

Note that as for an employee who is given an authority to use the printbox service, a special agreement as an individual or a special agreement as a group to which this employee belongs may also be recorded.

For example, in a case where an upper limit on payment, a period for which the service is available, the number of times the service is available, a kind of available service, or the like is decided for the group, the restriction registered for the group is also read out.

FIG. 14 illustrates a data example of the equipment table 310B in which the lockers registered in the printbox service are recorded.

The equipment table 310B illustrated in FIG. 14 includes an area ID, a management ID, an installation place, operating hours, the number of boxes, a size, printing performance, air conditioning, and other information.

The area ID is an ID used for management of an area where the printing-function-equipped locker 20 registered in the printbox service is installed. The area IDs illustrated in FIG. 14 correspond to the areas in FIG. 1.

The management ID is allocated to each printing-function-equipped locker 20. In FIG. 14, an ID combining an area ID and a numeral is used. Note, however, that the management ID may be an ID given irrespective of an area where the printing-function-equipped locker 20 is installed.

The installation place is information for specifying a place where the printing-function-equipped locker 20 is installed. The installation place is, for example, a name or an address of a shop, a name of a street or a passage, or an ID allocated to the installation place.

In the "OPERATING HOURS" column, a time window for which the printing-function-equipped locker 20 is available in relation to the installation place is recorded. The operating hours may differ depending on the day of the week and a holiday. Furthermore, operating hours on a specific day may be set. Furthermore, special operating hours may be set for year-end and New Year holidays.

In the "NUMBER OF BOXES" column, the number of boxes provided in each printing-function-equipped locker 20 is registered. In this example, the total number of boxes is registered. The number of boxes that constitute the printing-function-equipped locker 20 may vary depending on an installation place or an owner.

In the "SIZE" column, a breakdown of sizes of boxes provided in the printing-function-equipped locker 20 is registered. The boxes that constitute the printing-function-equipped locker 20 may have the same size but may have different sizes. For example, two large-sized boxes, two medium-sized boxes, and five small-sized boxes are provided in the printing-function-equipped locker 20 given a management ID "A1". This box configuration is identical to that of the printing-function-equipped locker 20 illustrated in FIG. 2.

In the "PRINTING PERFORMANCE" column, physical performance of the printer 261 (see FIG. 5) provided in the printing-function-equipped locker 20 is registered. In FIG. 14, information indicating that a printing speed is 10 sheets per minute, information indicating that both-sided printing is available, information indicating that output of a special color is available, and information indicating that folding processing is available are registered as the printing performance.

Note that the printing speed may be registered for each size of paper used for printing and each kind of document.

In the "AIR CONDITIONING" column, whether or not the air conditioner 280 (see FIG. 5) is provided is recorded.

FIG. 15 illustrates a data example of the equipment table 310B in which individual lockers are targets of management.

The equipment table 310B illustrated in FIG. 15 includes a management ID, a box ID, a size, a stored object, air-conditioning management, and other information.

The management ID is identical to the management ID illustrated in FIG. 14 and is for identifying the printing-function-equipped locker 20.

The box ID is an ID for identifying an individual box 270 (see FIG. 6) that constitutes the printing-function-equipped locker 20. In the example of FIG. 15, an ID combining a management ID and a numeral is used. Note, however, that the box ID may be a numeral only.

In the "SIZE" column, classification of a size of a corresponding box is recorded. Box IDs "A1_001" to "A1_009" correspond to the boxes of the printing-function-equipped locker 20 illustrated in FIG. 2. Accordingly, "LARGE" is registered as a size of "A1_001" and "A1_002", "MEDIUM" is registered as a size of "A1_003" and "A1_004", and "SMALL" is registered as a size of "A1_005" to "A1_009".

In the "STORED OBJECT" column, a kind of stored object is recorded. In the printing-function-equipped locker 20 used in the present exemplary embodiment, each box is exclusive for storage of a printed material or for storage of baggage. Accordingly, in the example of FIG. 15, "ONLY BAGGAGE" or "ONLY PRINTED MATERIAL" is recorded for each box.

Needless to say, in the printbox service, remaining boxes excluding boxes exclusive for storage of baggage are candidates for an output destination to which a printed material is to be output.

A box given "A1_008" is exclusive for storage of free paper. That is, the box given "A1_008" is occupied by a specific user who issues free paper. Accordingly, in the example of FIG. 15, information "ONLY PRINTED MATERIAL (EXCLUSIVE FOR FREE PAPER)" is recorded.

A box, such as a box exclusive for free paper, that can be used only by a specific user or an administrator, in other words, a box that is not available to an unspecific user is an example of a dedicated box exclusive for a specific purpose.

A box given "A1_009" is used exclusively for supply of paper. Accordingly, in the example of FIG. 15, the "STORED OBJECT" column is blank meaning that the box given "A1_009" is not available to any user.

A box for which the "STORED OBJECT" column is blank is excluded from candidates for storage both in a case of storage of a printed material and a case of storage of baggage.

In the "AIR-CONDITIONING MANAGEMENT" column, information indicating whether or not air conditioning is available is recorded. In the example of FIG. 15, air conditioning is available in the boxes given "A1_001" to "A1_004", but air conditioning is not managed in the other boxes.

FIG. 16 illustrates a data example of the operational status table 310C. In FIG. 16, parts corresponding to those in FIG. 11 are given corresponding reference signs.

A data structure of the operational status table 310C illustrated in FIG. 16 is identical to that of the operational status table 292 illustrated in FIG. 11.

This is because the operational status table 310C illustrated in FIG. 16 is a table unifying plural operational status tables 292 collected from the printing-function-equipped lockers 20 used in the printbox service.

FIG. 17 illustrates a data example of the reservation table 310D of the printbox service. The reservation table 310D illustrated in FIG. 17 is used for management of reservations of printing of a document and storage.

The reservation table 310D illustrated in FIG. 17 includes a reservation ID, a box ID, a scheduled pickup time, a document file, the number of printed sheets, a fee, a special agreement, and other information.

The reservation ID is given for each reservation. The reservation ID is issued so that duplicate reservation IDs are not issued in the whole printbox service. In the present exemplary embodiment, the management server 30 (see FIG. 1) issues the reservation ID.

The box ID is an ID for identifying a box used for storage of a printed material corresponding to a reservation.

The scheduled pickup time is designated by a user using the service on the terminal 10 (see FIG. 1).

In the "FILE NAME" column, a name identifying an uploaded document and other information are recorded.

The number of printed sheets is the number of sheets used for printing. Accordingly, the number of printed sheets does not necessarily match the number of pages of a document. In a case where plural pages are not printed on a single sheet and in a case where both-sided printing is not used, the number of printed sheets matches the number of pages of a document.

In the "FEE" column, a fee which a user is charged for reserved printing and storage is recorded. In the present exemplary embodiment, a total fee for printing and storage is recorded. Note, however, that a fee for printing and a fee for storage may be separately managed. A user may be charged only a fee for printing and may be additionally charged for storage only when being late in picking up a printed material.

In the present exemplary embodiment, a user is charged no fee within 30 minutes from the scheduled pickup time and is charged a fee corresponding to an elapsed time after elapse of 30 minutes from the scheduled pickup time.

In principle, a fee is paid in advance by electronic money for use of the printbox service according to the present exemplary embodiment. In other words, a user who wants to use the printbox service becomes able to reserve printing and storage when paying a fee in advance by electronic money.

This is because after a reservation, paper and a recording material are consumed for printing and a box is managed as "being used" for storage of a printed material.

To discount a fee, a refund is given by electronic money or a coupon that can be used next or subsequent time is issued.

In a case where an extra fee occurs, a user may be permitted to take out a printed material on a condition of payment. Furthermore, the fee may be charged to an account registered in advance or a number such as a credit card used for payment or may be collectively charged at next or subsequent use.

Examples of the electronic money include not only a credit card, but also a debit card and cryptocurrency. Furthermore, examples of the electronic money include a payment method in which when a dedicated reader is touched, payment is executed within a range of money recorded on a touched terminal and a payment method in which payment is executed by reading a QR code (Registered Trademark) or a barcode (Registered Trademark).

In the present exemplary embodiment, discounting service is applied to a user who permits execution of printing to be scheduled in a midnight or early morning time window. This service is called "time-shift discount".

A time window during which the time-shift discount is applied may vary depending on a place where the printing-function-equipped locker 20 is installed. For example, one printing-function-equipped locker 20 may apply discount during a time window from 0 o'clock to 6 o'clock, and another printing-function-equipped locker 20 may apply discount during a time window from 22 o'clock to 5 o'clock. This time window is managed by a service provider.

Introduction of the time-shift discount permits reserved printing that occupies the printer 261 (see FIG. 5) of the printing-function-equipped locker 20 for a long time to be scheduled in a time other than a time window in which a lot of users operate the actual apparatus. Furthermore, in a case where a reservation of printing whose estimated printing time exceeds a predetermined threshold value is made, such printing may be forcibly scheduled in a nighttime.

By thus guiding execution of printing, for example, to a nighttime, it is possible to reduce occurrence of a situation where a user who visits the actual apparatus cannot use copy or on-demand printing using the printing-function-equipped locker 20.

The copy is to print a scanned image of a document on paper.

The on-demand printing is to start printing a document uploaded, for example, to the management server 30 in response to an instruction from a user who has visited the actual apparatus.

In the case of on-demand printing, a fee may be charged not when a document is uploaded, but when printing is executed. This is because no consumable is consumed and no box is occupied since printing is started in response to an instruction from a user who has visited the actual apparatus.

Note that a fee may be paid separately at a time of reservation and at a time of pickup. That is, a fee may be paid in installments.

During a daytime, there are more needs for printing a printed material outdoors than during a nighttime. In view of this, by guiding execution of reserved printing to a time window during which there are fewer needs for on-demand printing, a time for which a user waits at the place where the printing-function-equipped locker 20 is installed is shortened. Furthermore, a service provider gets more opportunities of earning.

In the "SPECIAL AGREEMENT" column, for example, how a printed material is handled after elapse of a scheduled pickup time is specified. In the present exemplary embodiment, storage in a reserved box continues for 30 minutes even after elapse of a scheduled pickup time. The special agreement specifies how a printed material is handled after elapse of the 30 minutes from the scheduled pickup time.

In the present exemplary embodiment, selection of any one of "STORED AT SHOP", "SHREDDER", and "DISCARD" is required. That is, "STORED AT SHOP", "SHREDDER", and "DISCARD" cannot be concurrently selected.

The "STORED AT SHOP" is selected in a case where a user permits staff at a shop where the printing-function-equipped locker 20 is installed or staff in charge of maintenance or the like to take out and store a printed material.

The "SHREDDER" is selected for a user who demands secrecy of a printed material. The "SHREDDER" is selected in a case where a printed material is one, such as a private photo or a company material, that needs to be kept away from third party's eyes.

The "DISCARD AT SHOP" is the third option that is not storage at a shop nor shredding using a shredder. In this case, staff at a shop or staff in charge of maintenance or the like takes out and discards a printed material. That is, the printed material is not stored at the shop.

Note that even in a case where the "STORED AT SHOP" is selected, a user can change the "STORED AT SHOP" to "SHREDDER" or "DISCARD AT SHOP" by giving an instruction from the terminal 10 to the management server 30 for 30 minutes from a scheduled pickup time. Furthermore, "SHREDDER" may be changed to "STORED AT SHOP" or "DISCARD AT SHOP". Furthermore, "DISCARD AT SHOP" may be changed to "STORED AT SHOP" or "SHREDDER".

In addition, extension of a storage time may be selectable.

The management server 30 sends, for example, an e-mail prompting pickup to a user's terminal 10 ten minutes before a scheduled pickup time and in a case where pickup is not detected even after the scheduled pickup time.

In the present exemplary embodiment, printing the same document after shredding of a printed material is not free of charge and needs a fee. Note, however, that the fee may be reduced.

A reservation of printing and storage may be received as long as the reservation is made within a predetermined time from a scheduled pickup time.

If a reservation can be made one week before a scheduled pickup time, a reserved box 270 (see FIG. 6) is occupied for one week. This hinders other user who want to use the printbox service.

A reservation may be received, for example, during a period from 24 hours before to 3 hours before a scheduled pickup time from the perspective of shortening a period for which the box 270 is occupied and securing freedom of adjustment of a print schedule. Needless to say, these times are an example. In a case where the number of printed sheets is small and freedom of adjustment of a print schedule is high, a reservation may be permitted until 30 minutes before a scheduled pickup time.

In relation to fee charging, in a case where a period from receipt of a reservation to a scheduled pickup time is longer than a reference period, an additional storage fee may be charged.

FIGS. 18A and 18B illustrate a data example of the fee table 310E and a data example of the late fee table 310F, respectively. FIG. 18A illustrates a data example of the fee table 310E, and FIG. 18B illustrates a data example of the late fee table 310F.

The fee table 310E illustrated in FIG. 18A includes a management ID of the printing-function-equipped locker 20, extra fee hours, a unit price of an extra fee, discounted hours, a unit price of a discounted fee, and other information.

The management ID is used to reflect a matter unique to an individual printing-function-equipped locker 20. The management ID is unnecessary in a case where extra fee hours and discounted hours common to all printing-function-equipped lockers 20 are used.

The extra fee hours are set for the purpose of decreasing the number of users waiting in front of the actual apparatus. In the present exemplary embodiment, in a case where a scheduled pickup time is included in the extra fee hours, an extra fee occurs. In FIG. 18A, the extra fee hours for the printing-function-equipped locker 20 given a management ID "A1" are 11:00 to 13:00.

In the "UNIT PRICE OF EXTRA FEE", a unit price of an additional fee is registered. The unit price is set, for example, by the provider of the printbox service.

The discounted hours are also set for the purpose of decreasing the number of users waiting in front of the actual apparatus. In a case where a scheduled pickup time is included in the discounted hours, a fee is discounted. In FIG. 18A, the discounted hours for the printing-function-equipped locker 20 given the management ID "A1" are 23:00 to 06:00.

In the "UNIT PRICE OF DISCOUNTED FEE", a unit price of a discounted fee is registered. The unit price is set, for example, by the provider of the printbox service.

The late fee table 310F illustrated in FIG. 18A includes a management ID of the printing-function-equipped locker 20, a unit price of a late fee, and other information.

The late fee table 310F is also used to reflect a matter unique to an individual printing-function-equipped locker 20. The management ID is unnecessary in a case where management of a late fee is common to all printing-function-equipped lockers 20.

The "UNIT PRICE OF LATE FEE" specifies a unit price of a fee charged in a case where a user arrives behind a scheduled pickup time. In the present exemplary embodiment, no late fee occurs within 10 minutes from a scheduled pickup time, but a late fee occurs per minute or per time after elapse of 10 minutes from the scheduled pickup time.

In FIG. 18B, a unit price of a late fee of the printing-function-equipped locker 20 given the management ID "A1" is 10 yen per minute. A unit price of a late fee of the printing-function-equipped locker 20 given a management ID "A2" is 500 yen per time. Note that a late fee may be charged depending on a size of the box 270 (see FIG. 6) or the number of printed sheets.

Use Examples of Printbox Service

Use examples of the printbox service are described below with reference to FIGS. 19 to 36.

Use Example 1

FIG. 19 is a view for explaining an example of processing operation that proceeds in the network print system 1 (see FIG. 1) used in the first exemplary embodiment. In FIG. 19, the symbol "S" represents a step.

The processing operation illustrated in FIG. 19 starts when a user selects use of the printbox service on the terminal 10 (step 1).

Figure 20:
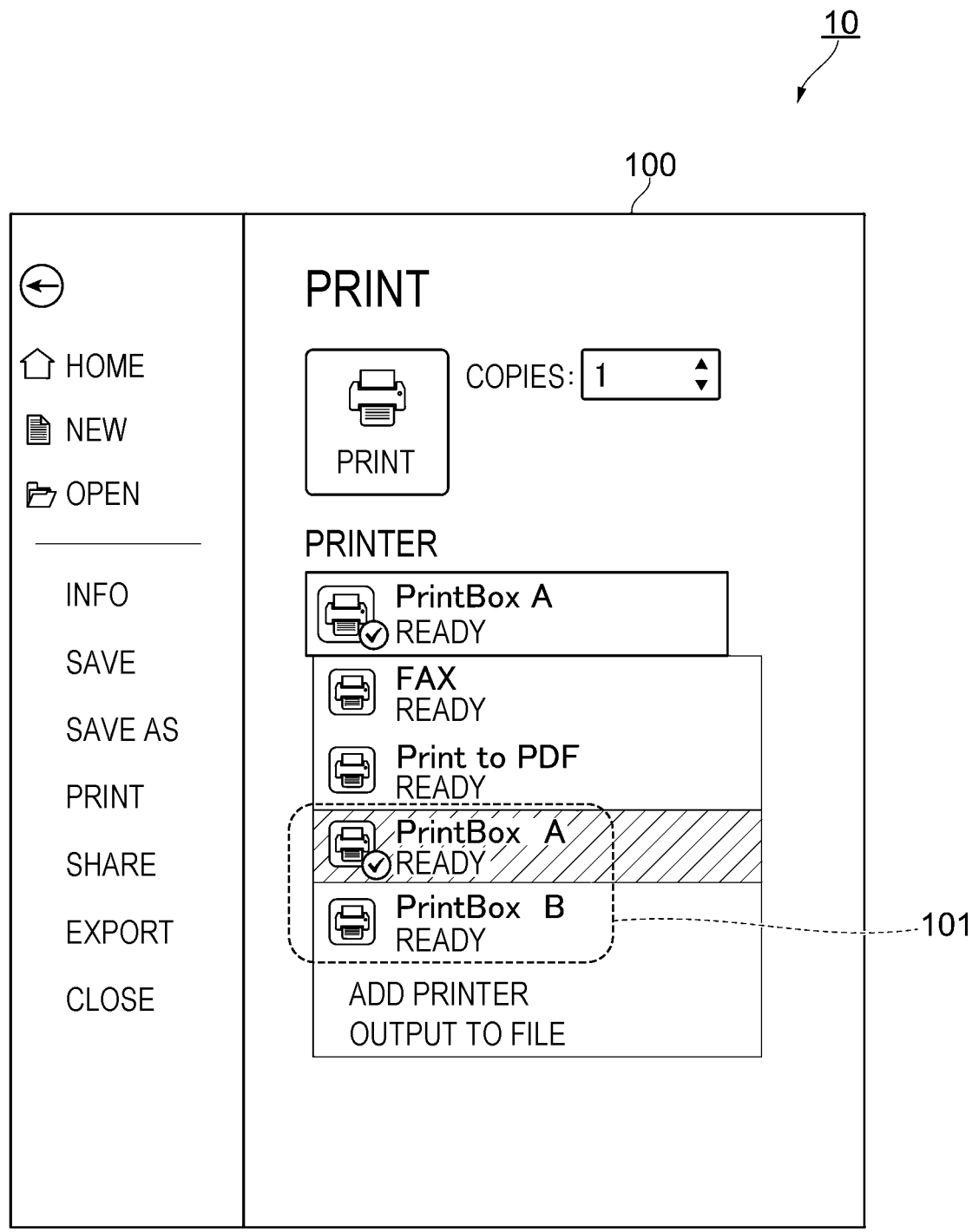
FIG. 20 illustrates an example of an operation screen for printing displayed on a display of a terminal.

FIG. 20 illustrates an example of an operation screen 100 for printing displayed on a display of the terminal 10. On the operation screen 100 illustrated in FIG. 20, an item "PRINT" has been selected, and a list of printers available for printing is displayed.

On the operation screen 100 illustrated in FIG. 20, a candidate 101 for a printbox service is displayed. In this example, two candidates 101, specifically, "PrintBox A" and "PrintBox B" are displayed.

A status of each of these candidates 101 is "READY". Accordingly, the user can select any of the services.

In the present exemplary embodiment, it is assumed that "PrintBox A" has been selected on the operation screen 100.

Instead of displaying a list of candidates for a printbox service that can be designated as illustrated in FIG. 20, only a generic name of printbox services may be displayed, and a specific service business operator may be selectable after the generic name is selected.

The management server 30 of the "PrintBox A" accessed by the terminal 10 presents a condition entry screen (step 2).

Figure 21:
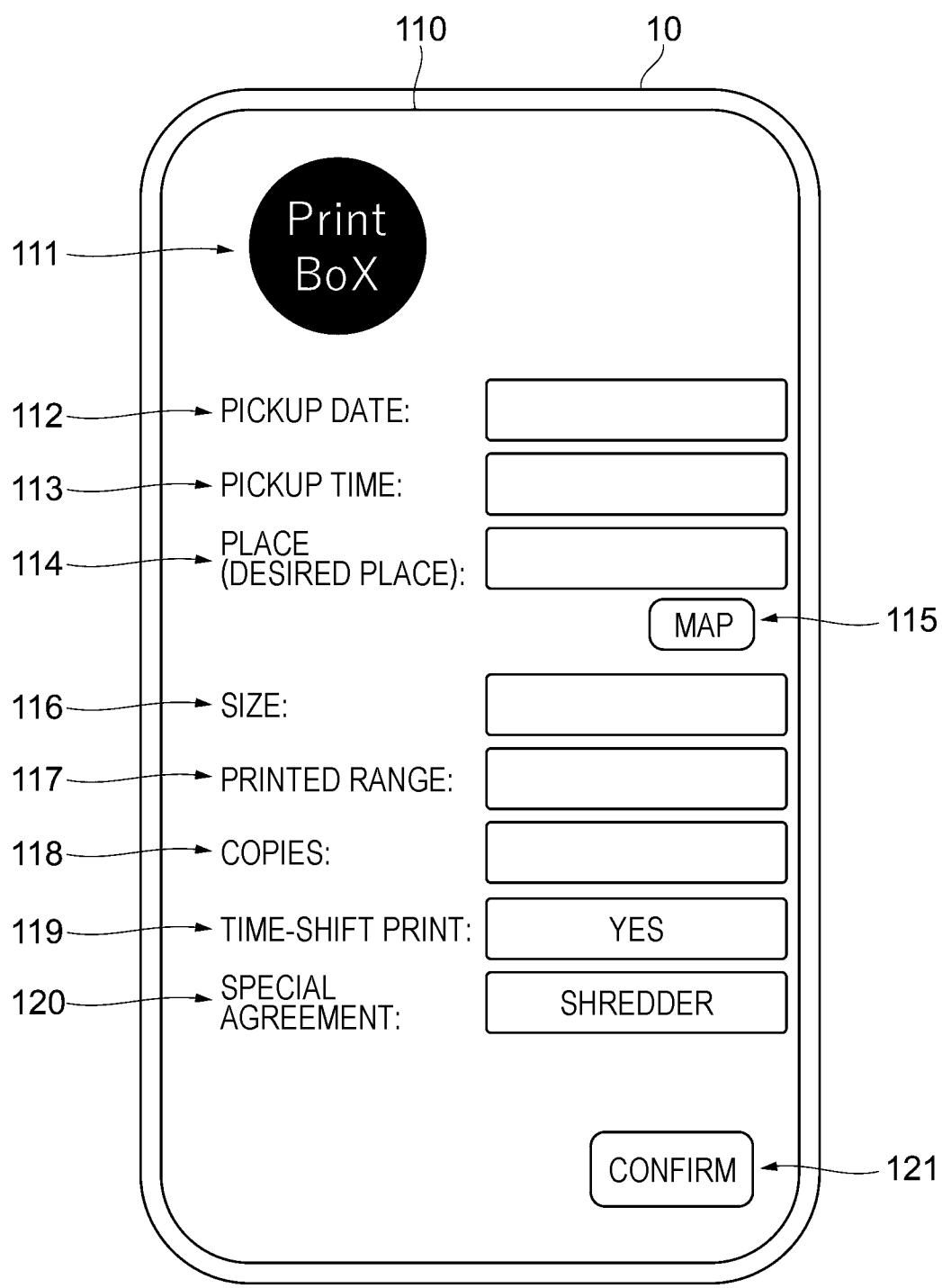
FIG. 21 is a view for explaining an example of an entry screen presented for use of the printbox service.

FIG. 21 is a view for explaining an example of an entry screen presented for use of the printbox service. The entry screen illustrated in FIG. 21 is displayed on the display 110 of the terminal 10 when a print tab is operated after selection of a document to be printed or while a document is open.

The entry screen illustrated in FIG. 21 includes a service logo 111, a pickup date designation field 112, a pickup time designation field 113, a desired pickup place designation field 114, a button 115 for displaying a map, a paper size designation field 116, a printed range designation field 117, copies designation field 118, a time-shift print designation field 119, a special agreement designation field 120, and a button 121 for confirming entered contents.

A logo corresponding to "PrintBox A" is displayed as the service logo 111. Note that a logo corresponding to "PrintBox B" is illustrated in FIG. 22.

Figure 22:
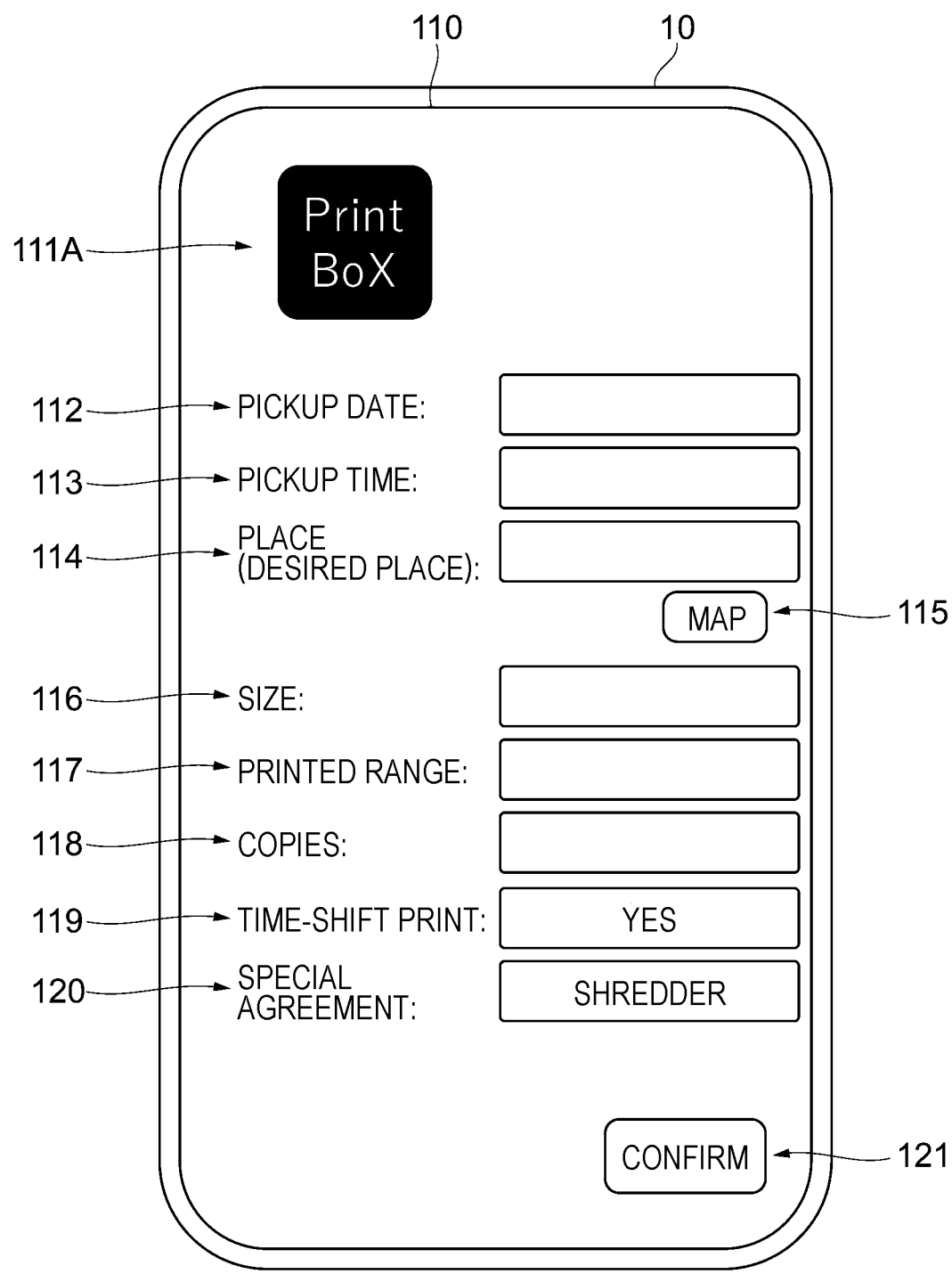
FIG. 22 is a view for explaining another example of an entry screen presented for use of the printbox service.

FIG. 22 is a view for explaining another example of an entry screen presented for use of a printbox service. In FIG. 22, parts corresponding to those in FIG. 21 are given corresponding reference signs.

On the entry screen illustrated in FIG. 22, a logo 111A has rectangular appearance, which is different from circular appearance of the logo 111 illustrated in FIG. 21.

In the place designation field 114, the user can enter, for example, a shop name, a place name, or a station name as a text. In the designation field 114, candidates for a place may be displayed as a pulldown menu. The user can also select a base from the map displayed by operating the button 115.

In the paper size designation field 116, a paper kind or size selected from a list of paper kinds and sizes is entered.

In the printed range designation field 117, for example, "all pages" or page numbers are entered as a range of pages of a document to be printed.

In the copies designation field, the number of copies to be printed is entered.

Furthermore, print orientation, a color mode, binding, folding, or the like can also be designated (not illustrated in FIG. 21).

In FIG. 21, "YES" is entered in the time-shift print designation field 119, and "SHREDDER" is entered in the special agreement designation field 120. In addition, for example, it is assumed that whether or not to use air conditioning is designated. Whether or not to use time-shift print is designated by a user because some users do not want a printed material to be stored for a long period even in a locked box.

Upon detection of operation of the button 121 for confirming entered conditions, the management server 30 presents candidates for a place that meet the conditions to the terminal 10 (step 3). The candidates that meet the conditions are decided by using at least one of a paper size, the number of printed sheets, a kind of paper used for printing, whether or not air conditioning is available in each box, and the like. For example, in a case where photo printing paper is designated as the kind of paper, boxes in which humidity is equal to or lower than a standard are decided as candidates since it is necessary to avoid sticking together of stored photos. Note that in a low-humidity season, boxes in which air conditioning is unavailable may be decided as candidates.

Figure 23:
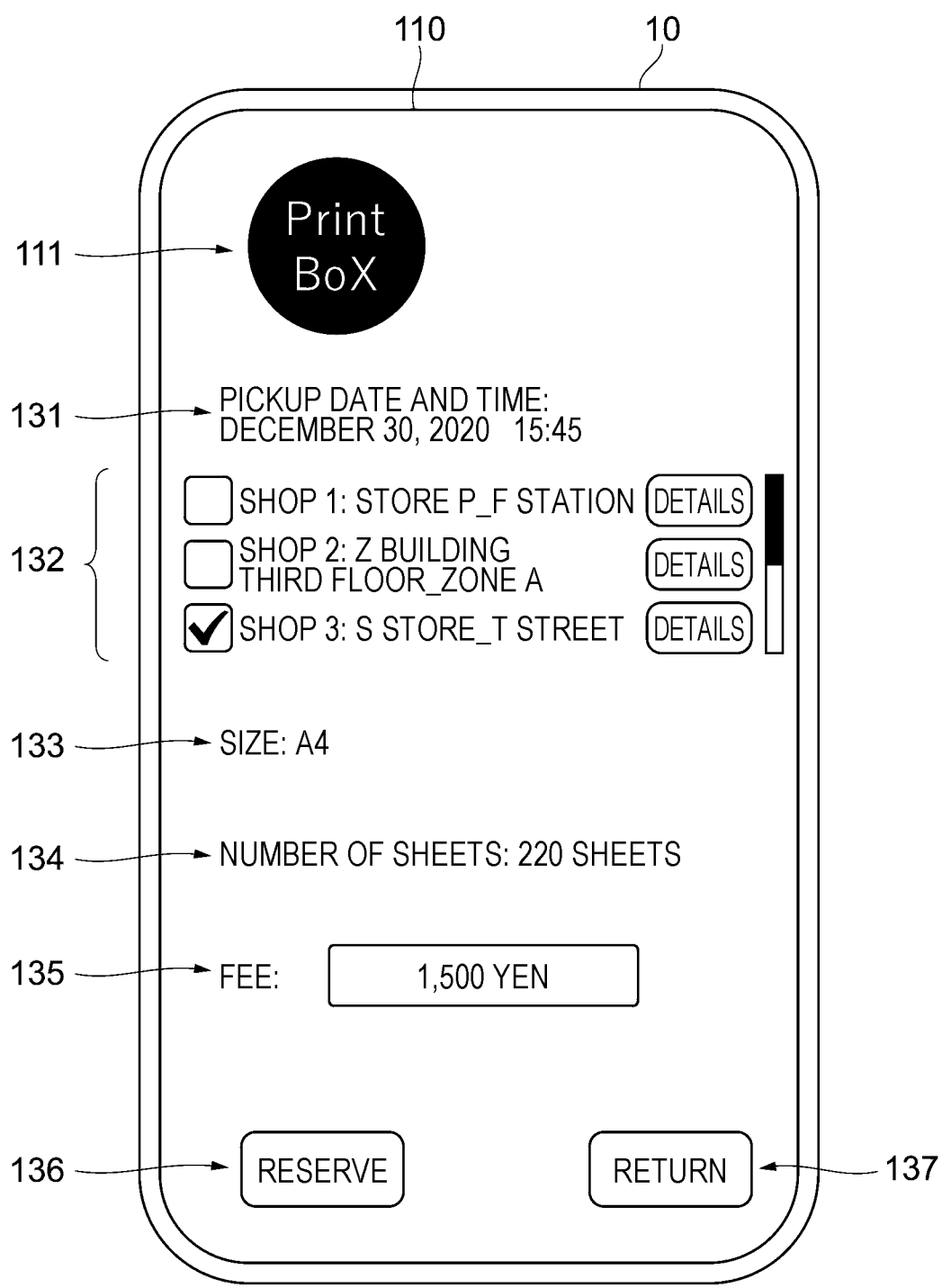
FIG. 23 is a view for explaining an example of a screen for presenting candidates for a place that satisfy a condition.

FIG. 23 is a view for explaining an example of a screen for presenting candidates for a place that meet conditions. In FIG. 23, parts corresponding to those in FIG. 21 are given corresponding reference signs.

The screen illustrated in FIG. 23 includes the service logo 111, a pickup date and time field 131, a pickup place or place candidate field 132, a paper size field 133, a printed sheets field 134, a fee field 135, a button 136 for confirming a reservation, and a button 137 for returning to a previous screen.

On the screen illustrated in FIG. 23, plural candidates are displayed together with checkboxes since there is no place that satisfies the conditions desired by the user by itself.

Although three candidates are displayed in FIG. 23, a scroll bar is displayed on a right side of the screen since there are other candidates that are not displayed.

In FIG. 23, the user selects "S STORE_T STREET", which is the third candidate.

Although candidates for a place are displayed in a case where there is no place that satisfies the conditions desired by the user by itself in the present exemplary embodiment, nearby candidates may be displayed even in a case where there is a place that satisfies the conditions desired by the user by itself.

See FIG. 19 again.

When the terminal 10 notifies the management server 30 about operation of the reservation button 136 (step 4), the management server 30 presents a screen demanding payment (step 5).

When the user instructs the terminal 10 to execute payment (step 6), the management server 30 confirms the reservation (step 7).

In the present exemplary embodiment, a document is uploaded from the terminal 10 when the reservation is confirmed. The management server 30 stores a data file of the uploaded document in the HDD 310 (see FIG. 12) and transmits the data file of the document and information on the reservation to a printing-function-equipped locker 20 that executes printing and storage of a printed material. The data file and other information need not be transmitted to the printing-function-equipped locker 20 at the same time as the upload of the document. The data file may be print data.

Furthermore, when the reservation is confirmed, the management server 30 notifies the terminal 10 about a reservation number and other information (step 8).

Figure 24:
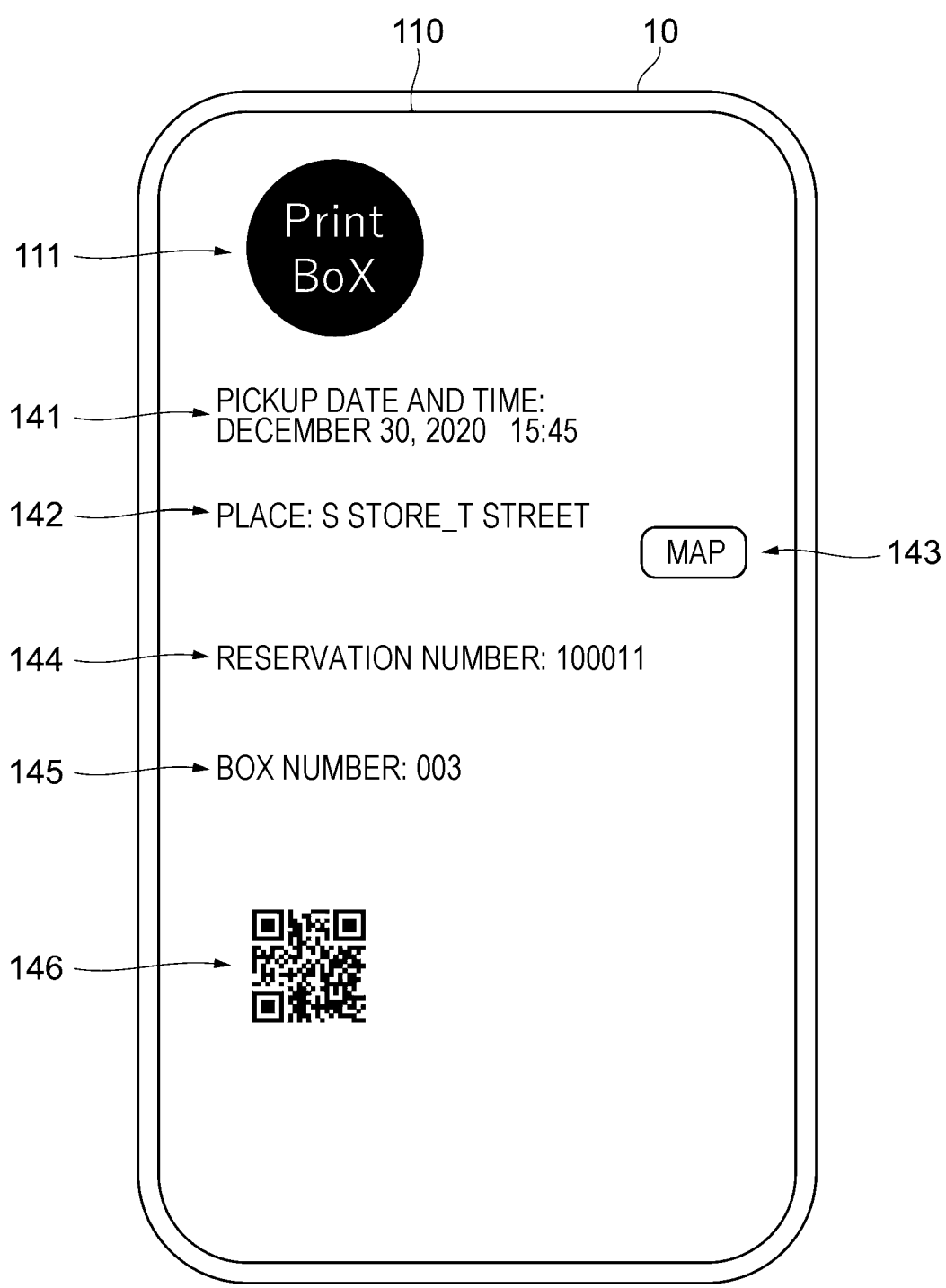
FIG. 24 is a view for explaining an example of a reservation number notification screen.

FIG. 24 is a view for explaining an example of a reservation number notification screen. In FIG. 24, parts corresponding to those in FIG. 21 are given corresponding reference signs.

The notification screen illustrated in FIG. 24 includes the service logo 111, a pickup date and time field 141, a pickup place field 142, a button 143 for displaying a map, a reservation number field 144, a printed material storage box number field 145, and a QR code (Registered Trademark) 146.

In FIG. 24, "100011" is displayed as the reservation number, and "003" is displayed as a number of a box in which a printed material is to be stored.

The reservation number is used, for example, for user authentication at a time of pickup of the printed material. This reservation number is managed as a reservation ID in the reservation table 310D (see FIG. 17).

The box number is already determined at the time of presenting candidates for which printing can be reserved and is tentatively reserved. The number of the box used for storage of the printed material is decided according to a paper size and the number of printed sheets of the printed material among boxes that are "EMPTY" at the time of the reservation.

The QR code 146 records information on the confirmed reservation and is used, for example, for user authentication at a time of pickup of the printed material.

As a matter of course, a printed material printed on A3-size paper cannot be stored in a box for an A4 size.

Furthermore, in a case where a printed material needs a space corresponding to 2000 sheets of A4-size paper, the printed material cannot be stored in a box for storing up to 1000 sheets of A4-size paper.

In such a case, a single box that can store the printed material is secured for storage or plural boxes are secured for storage.

Figure 25:
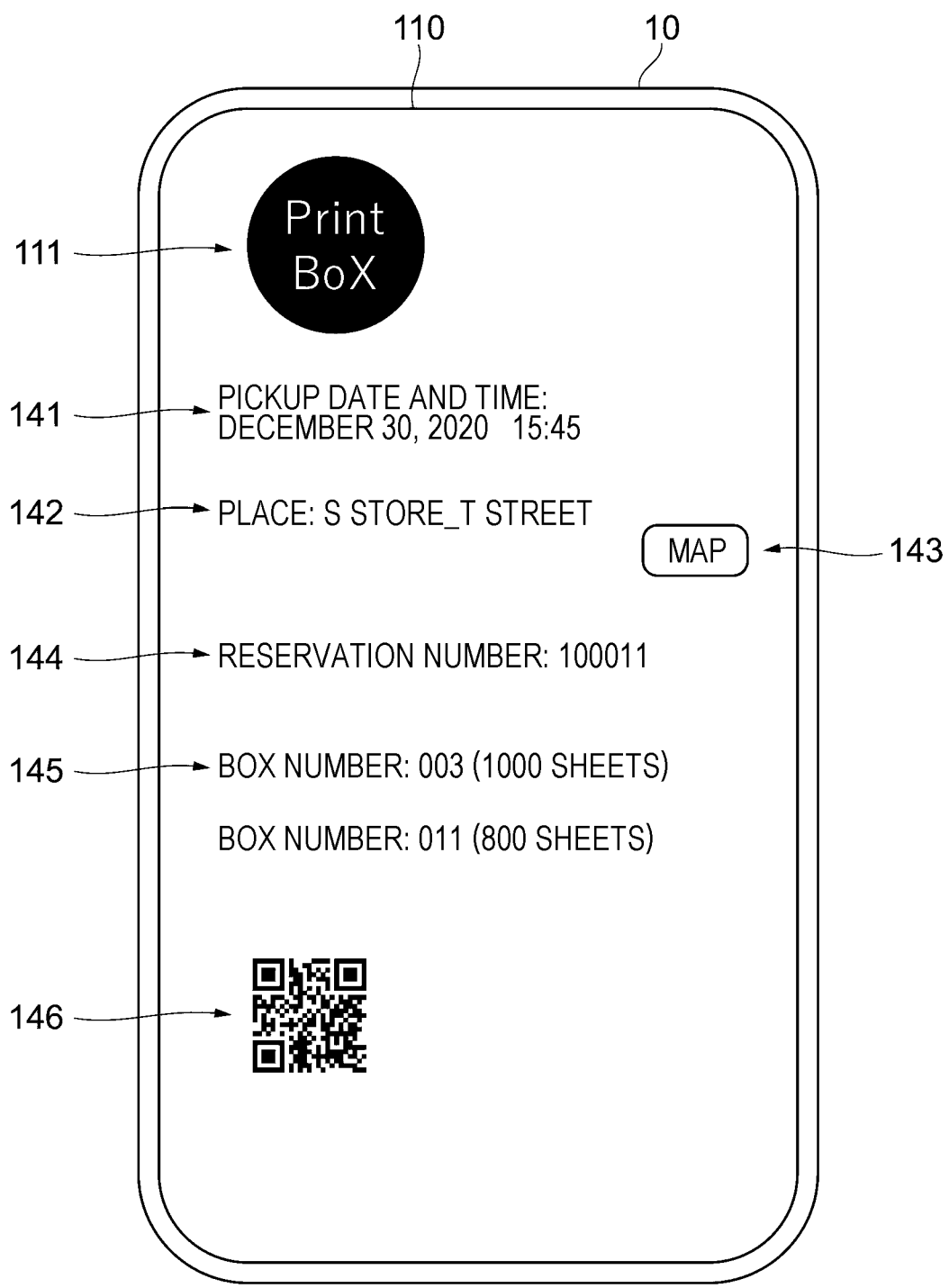
FIG. 25 is a view for explaining an example in which plural boxes of the same printing-function-equipped locker are secured for a single reservation.

FIG. 25 is a view for explaining an example in which plural boxes of the same printing-function-equipped locker 20 are secured for a single reservation. In FIG. 25, parts corresponding to those in FIG. 24 are given corresponding reference signs.

In FIG. 25, two boxes "003" and "011" are secured for the reservation number "100011".

In the example of FIG. 25, 1000 sheets of a printed material are stored in the box "003", and 800 sheets of the printed material are stored in the box "011". The number of copies may be displayed instead of the number of sheets. Note that only box numbers corresponding to the reservation number may be displayed as in the case of FIG. 24.

Figure 26:
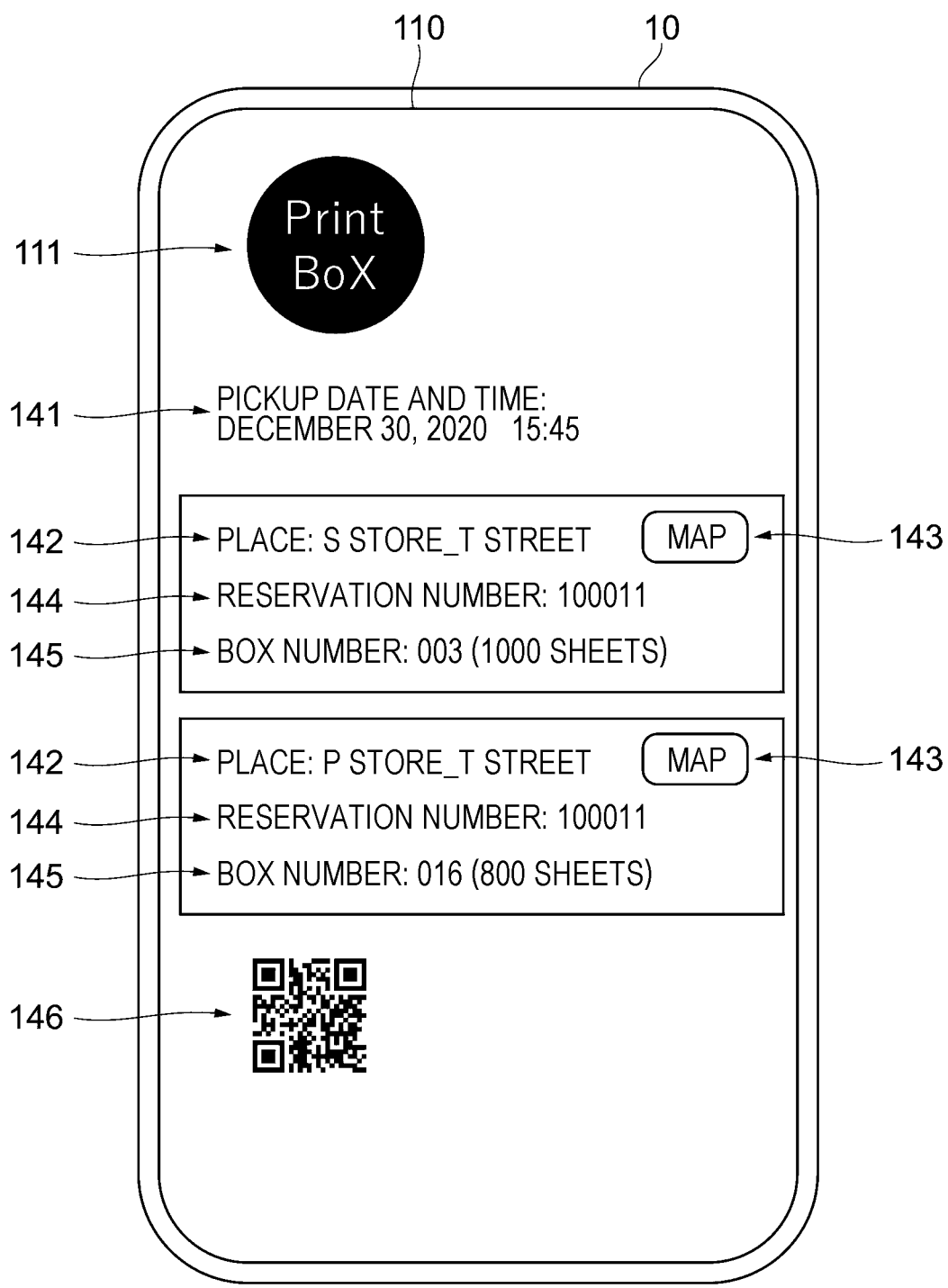
FIG. 26 is a view for explaining an example in which two respective boxes of two printing-function-equipped lockers installed in different places are secured for a single reservation.

FIG. 26 is a view for explaining an example in which two respective boxes of two printing-function-equipped lockers 20 installed in different places are secured for a single reservation. In FIG. 26, parts corresponding to those in FIG. 24 are given corresponding reference signs.

Plural places are allocated not only in a case where the number of boxes is insufficient, but also in a case where paper or a recording material is insufficient. In a case where supply of paper or a recording material is scheduled, a reservation may be received on the assumption that paper or the recording material will be supplied as scheduled.

In FIG. 26, a box "003" of "S STORE_T STREET" and a box "016" of "P STORE_T STREET" are secured for the reservation number "100011". In a case where the number of sheets to be printed in accordance with a reservation needs to be divided into plural places, the management server 30 presents the plural places to the terminal 10 in step 3.

A nearby place that becomes a candidate may be selected, for example, on the basis of a distance connecting two points on a map with a straight line, a distance calculated along a path of movement, or a time taken for movement.

Note that an upper limit is placed on the distance or the time, and a reservation is not received in a case where printing and storage that satisfy the conditions desired by the user cannot be executed within the upper limit.

In a case where printing and storage that satisfy the conditions desired by the user cannot be executed within the upper limit on the distance or the time, the user may be given an option of confirming a reservation within a range of sheets that can be printed and stored and registering remaining sheets in a waiting list.

The notification screens illustrated in FIGS. 24 to 26 can be read out and displayed any time.

See FIG. 19 again.

The printing-function-equipped locker 20 that has received the data file and other information starts management in association with a box specified at a time of the reservation (step 9).

The management includes creation and update of a print schedule. In creation of the print schedule, a possibility of time-shift print and a maintenance time are also considered. Even in a case where time-shift print is not desired at a time of reservation of printing, time-shift print may be executed if time-shift print is permitted later.

The printing-function-equipped locker 20 that has started management of the reservation executes printing in accordance with the print schedule (step 10).

Then, the printing-function-equipped locker 20 starts storage of a printed material in the corresponding box (step 11). The storage of the printed material continues until the user visits the actual place to pick up the printed material, except for a case where a predetermined period has elapsed from a scheduled pickup time and, for example, shredding by a shredder is executed.

In the following description, it is assumed that the user visits the printing-function-equipped locker 20 in which the printed material is stored at the scheduled pickup time.

In the present exemplary embodiment, printing of the printed material is completed until 30 minutes before the scheduled pickup time, and the printed material is stored in the reserved box.

The user who visits the actual place to pick up the printed material unlocks the door 210 corresponding to the box in which the printed material is stored by operating the door 210 (see FIG. 2) or the touch panel 223A (see FIG. 3) disposed at a center of the body 201 (see FIG. 2).

The printing-function-equipped locker 20 receives the user's operation for picking up the printed material (step 12).

The following describes examples of an operation related to user's pickup of a printed material.

Figure 27A:
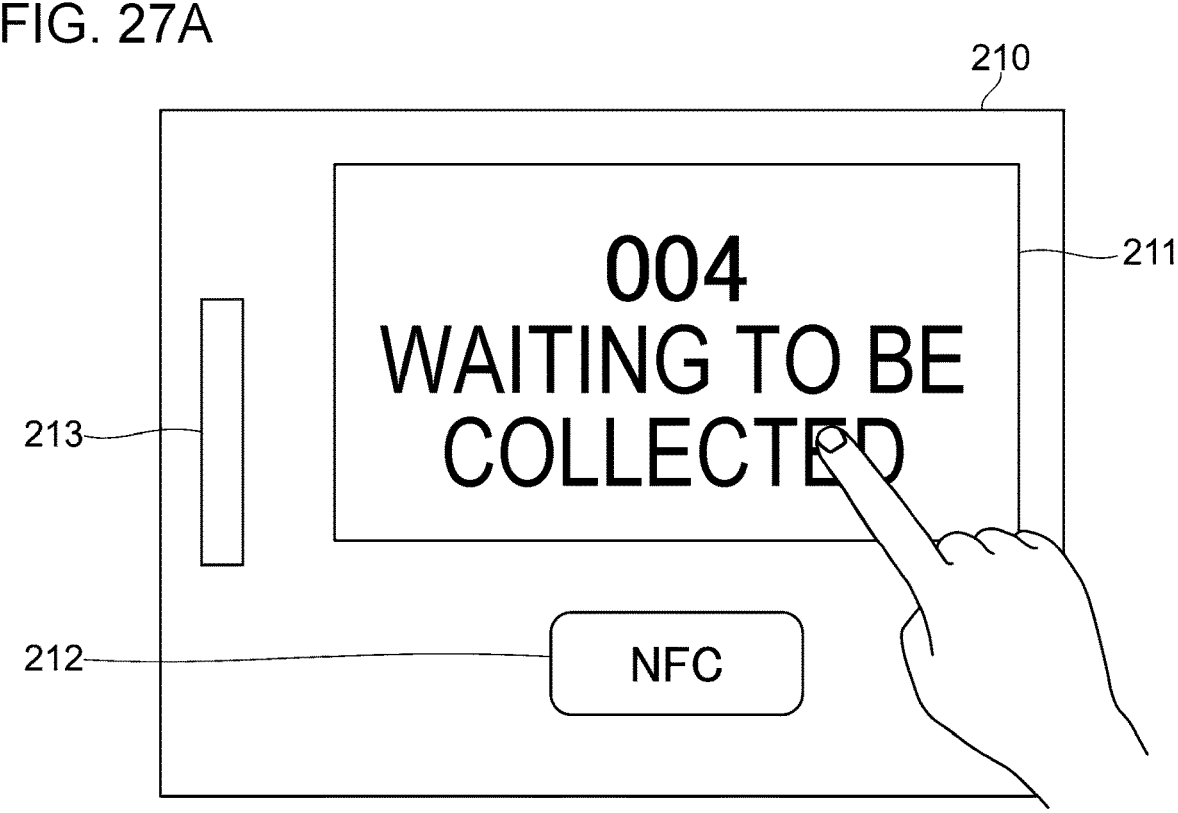
FIGS. 27A and 27B are views for explaining an example of an operation for picking up a printed material.
Figure 27B:
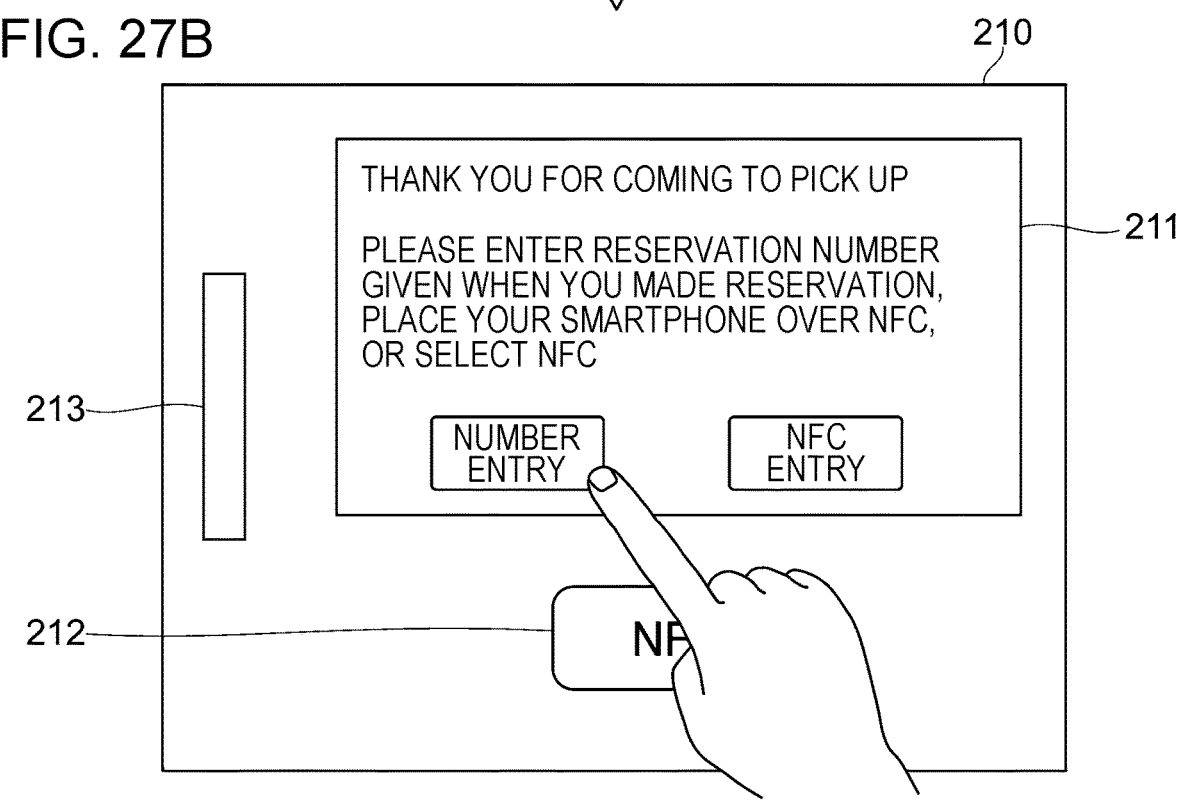

FIGS. 27A and 27B are views for explaining an example of an operation for picking up a printed material. FIG. 27A illustrates an example of an operation for displaying a printed material pickup screen, and FIG. 27B illustrates an example of an operation for unlocking the door 210 by entering a reservation number. In FIGS. 27A and 27B, parts corresponding to those in FIG. 2 are given corresponding reference signs.

In FIGS. 27A and 27B, it is assumed that the display 211 is a touch panel.

First, as illustrated in FIG. 27A, a user taps the display 211 of the door 210 on which a number of a box in which his or her printed material is contained is displayed. The number of the box is written on the reservation number notification screen (see FIG. 24).

When the user taps the display 211, the display 211 displays a guide for an operation necessary for unlocking the door 210, as illustrated in FIG. 27B.

In the example of FIG. 27B, messages "THANK YOU FOR COMING TO PICK UP" and "PLEASE ENTER RESERVATION NUMBER GIVEN WHEN YOU MADE RESERVATION, PLACE YOUR SMARTPHONE OVER NFC, OR SELECT NFC" are displayed.

In the example of FIG. 27B, a "NUMBER ENTRY" button and an "NFC ENTRY" button are displayed in a lower portion of the display 211.

In the example of FIG. 27B, the user taps the "NUMBER ENTRY" button.

Figure 28A:
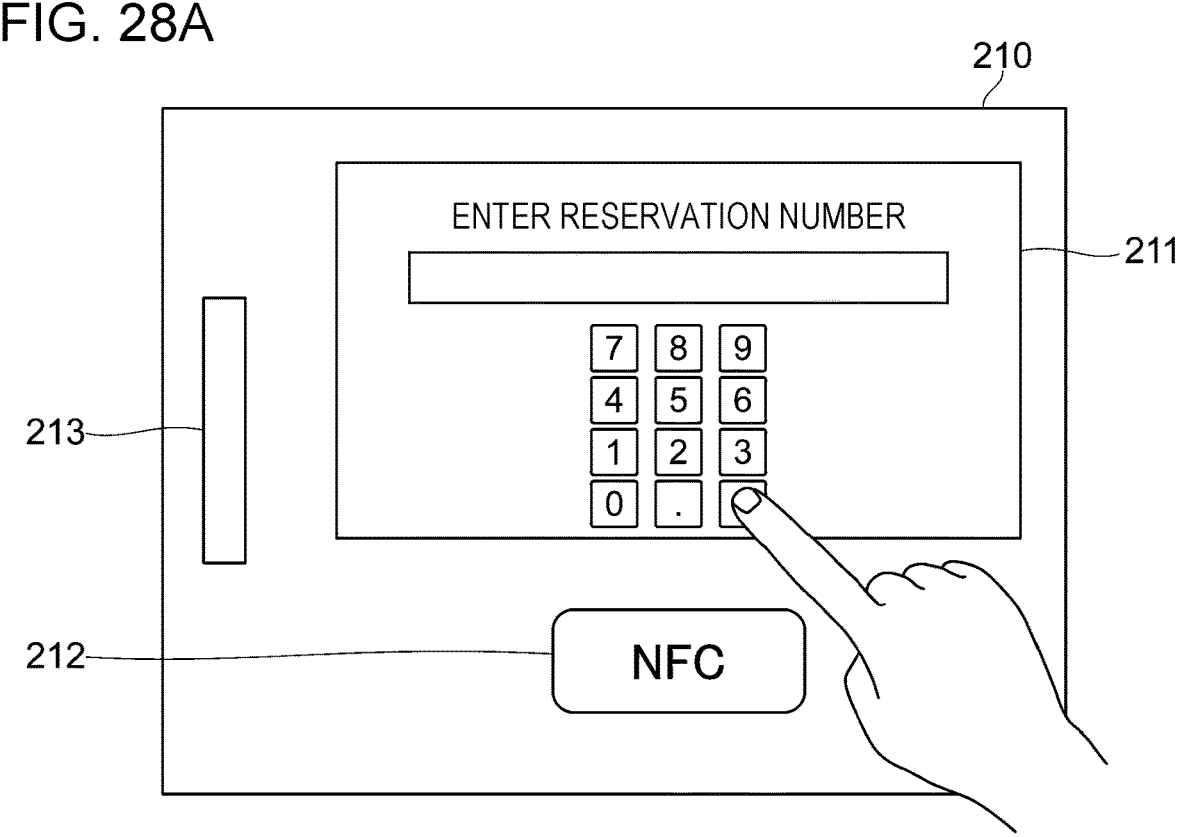
FIGS. 28A and 28B illustrate an example of a screen displayed in a case where unlocking using a reservation number is selected.
Figure 28B:
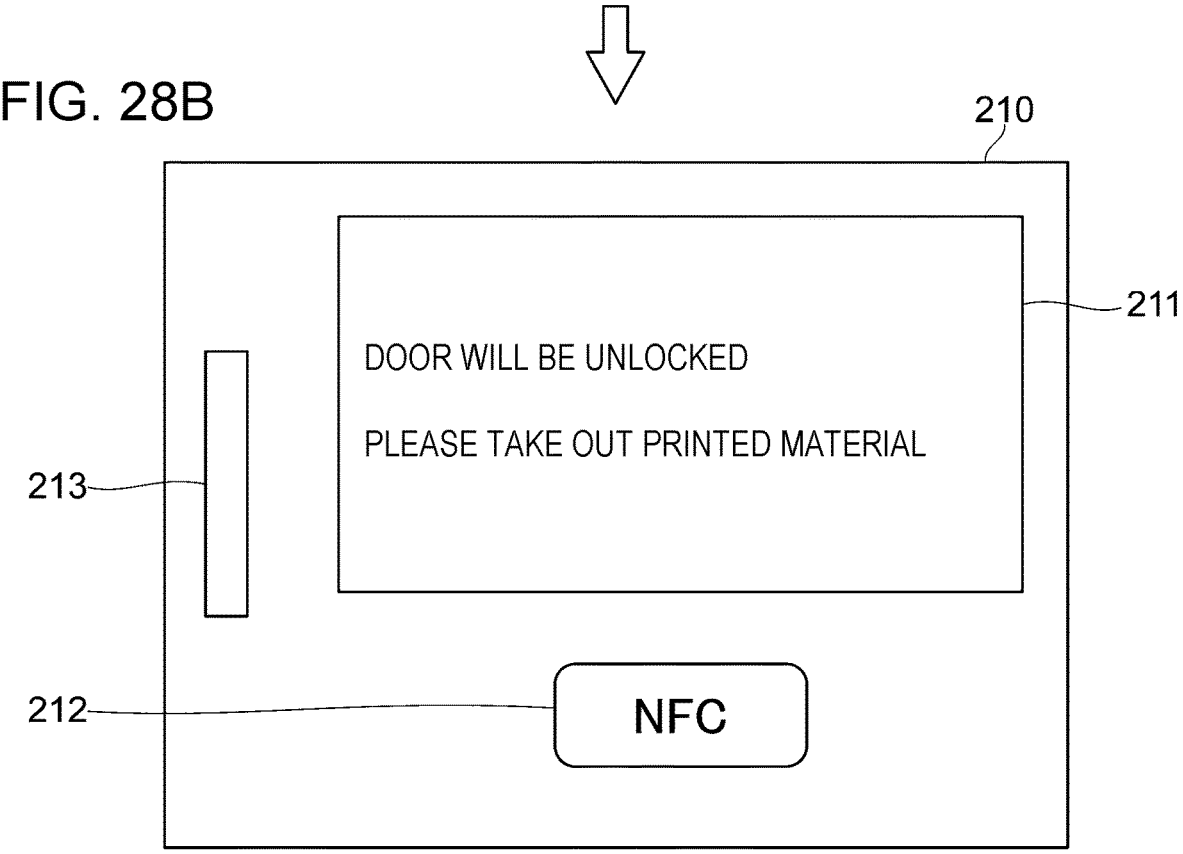

FIGS. 28A and 28B illustrate an example of a screen displayed in a case where unlocking using a reservation number is selected. FIG. 28A illustrates an example of a reservation number entry screen, and FIG. 28B illustrates an example of a screen displayed in a case where the user has been authenticated. In FIGS. 28A and 28B, parts corresponding to those in FIGS. 27A and 27B are given corresponding reference signs.

In FIG. 28A, a message prompting entry of a reservation number, a reservation number entry field, and a numerical keypad are displayed on the display 211.

In a case where an entered number matches a reservation number managed for the box 270 (see FIG. 6) corresponding to the door 210, the display 211 switches to the screen of FIG. 28B.

In FIG. 28B, messages "DOOR WILL BE UNLOCKED" and "PLEASE TAKE OUT PRINTED MATERIAL" are displayed.

Figure 29A:
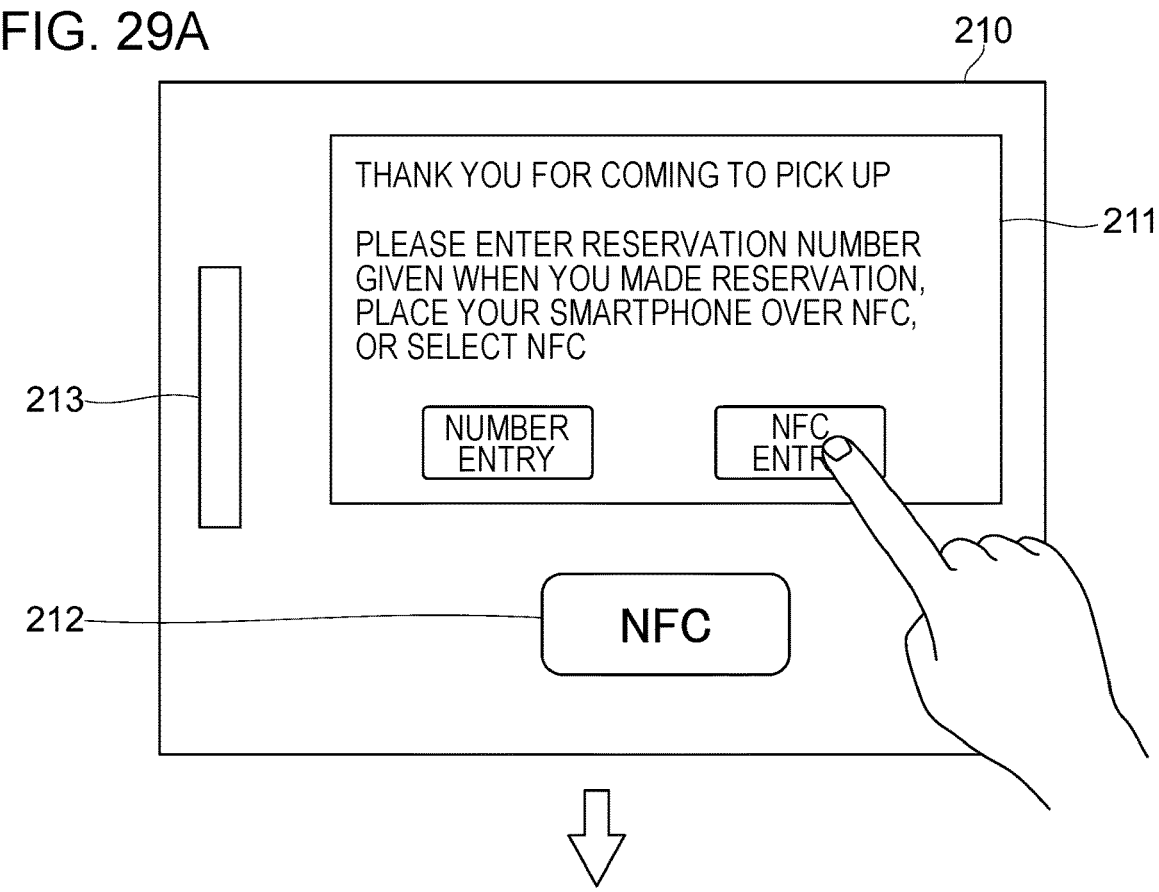
FIGS. 29A and 29B illustrate an example of a screen displayed in a case where unlocking using NFC entry is selected.
Figure 29B:
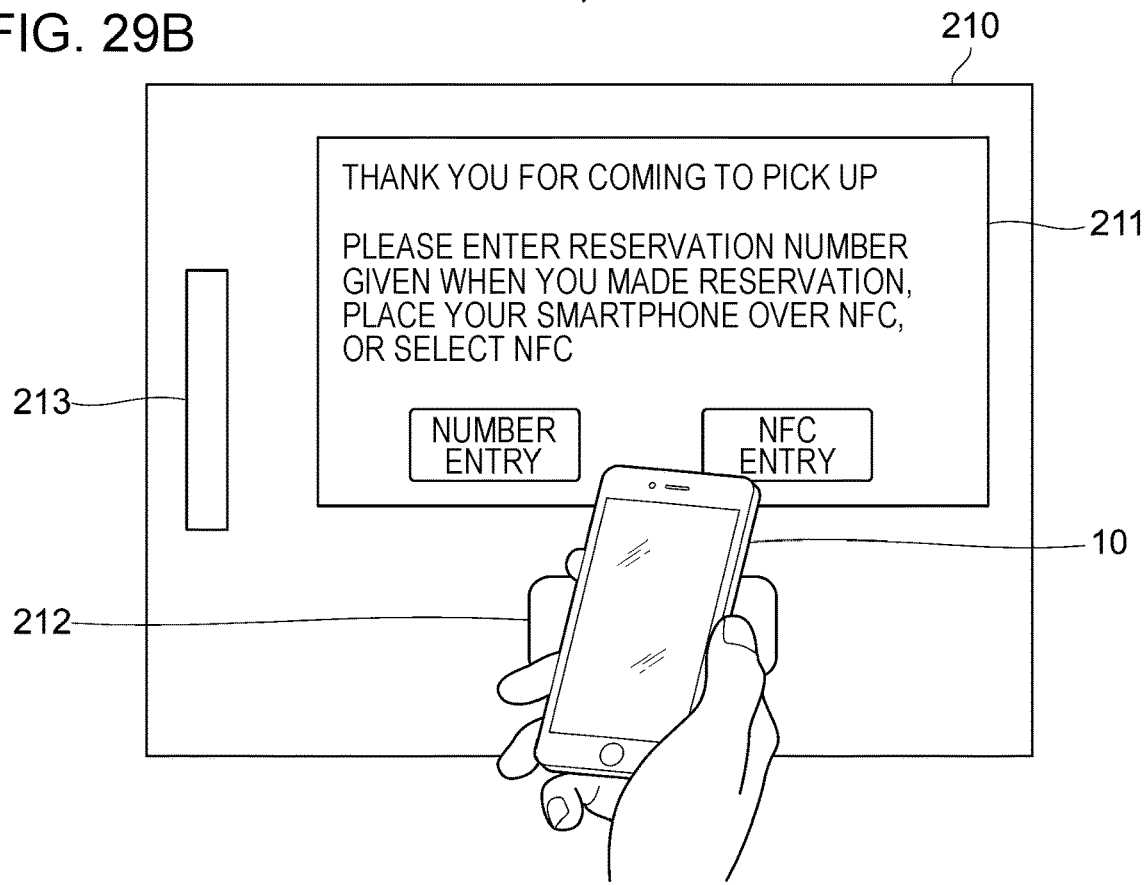

FIGS. 29A and 29B illustrate an example of a screen displayed in a case where unlocking using NFC entry is selected. FIG. 29A illustrates an example of an operation for unlocking the door 210 by NFC entry, and FIG. 29B is a view illustrating a user placing the terminal 10 over the NFC communication unit 212. In FIGS. 29A and 29B, parts corresponding to those in FIGS. 27A and 27B are given corresponding reference signs.

Also in FIG. 29A, messages "THANK YOU FOR COMING TO PICK UP" and "PLEASE ENTER RESERVATION NUMBER GIVEN WHEN YOU MADE RESERVATION, PLACE YOUR SMARTPHONE OVER NFC, OR SELECT NFC" are displayed, and a "NUMBER ENTRY" button and an "NFC ENTRY" button are displayed in a lower portion of the display 211, as in FIG. 27B.

In the example of FIG. 29A, the user taps the "NFC ENTRY" button.

When the user places the terminal 10 over the NFC communication unit 212 as illustrated in FIG. 29B, information for identifying the user associated with a reservation number or a reservation is read out to the door 210 and is compared with information managed for the box 270 (see FIG. 6) corresponding to the door 210.

In a case where the user is authenticated as a result of the comparison, the display 211 switches to the screen of FIG. 28B. This enables the user to pick up the printed material.

Figure 30A:
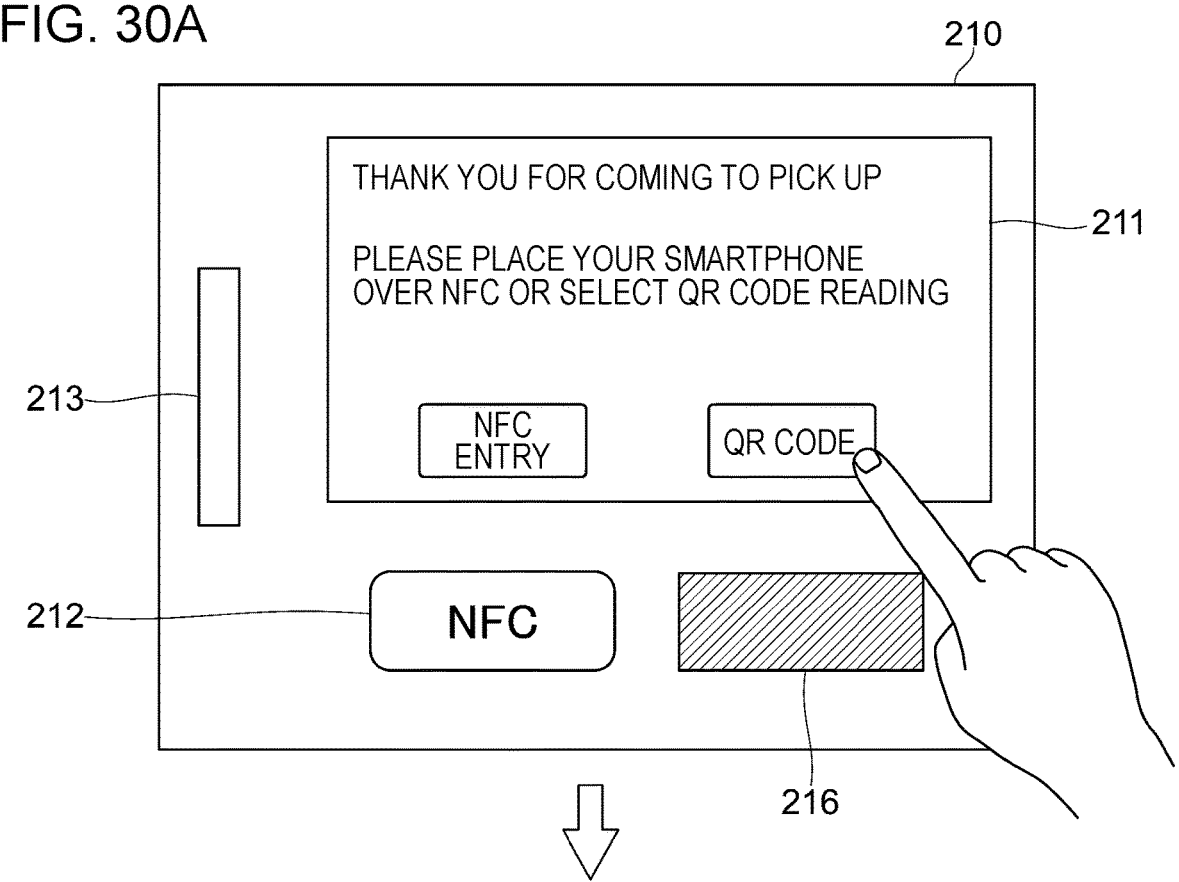
FIGS. 30A and 30B illustrate an example of a screen displayed in a case where a QR code is used for unlocking.
Figure 30B:
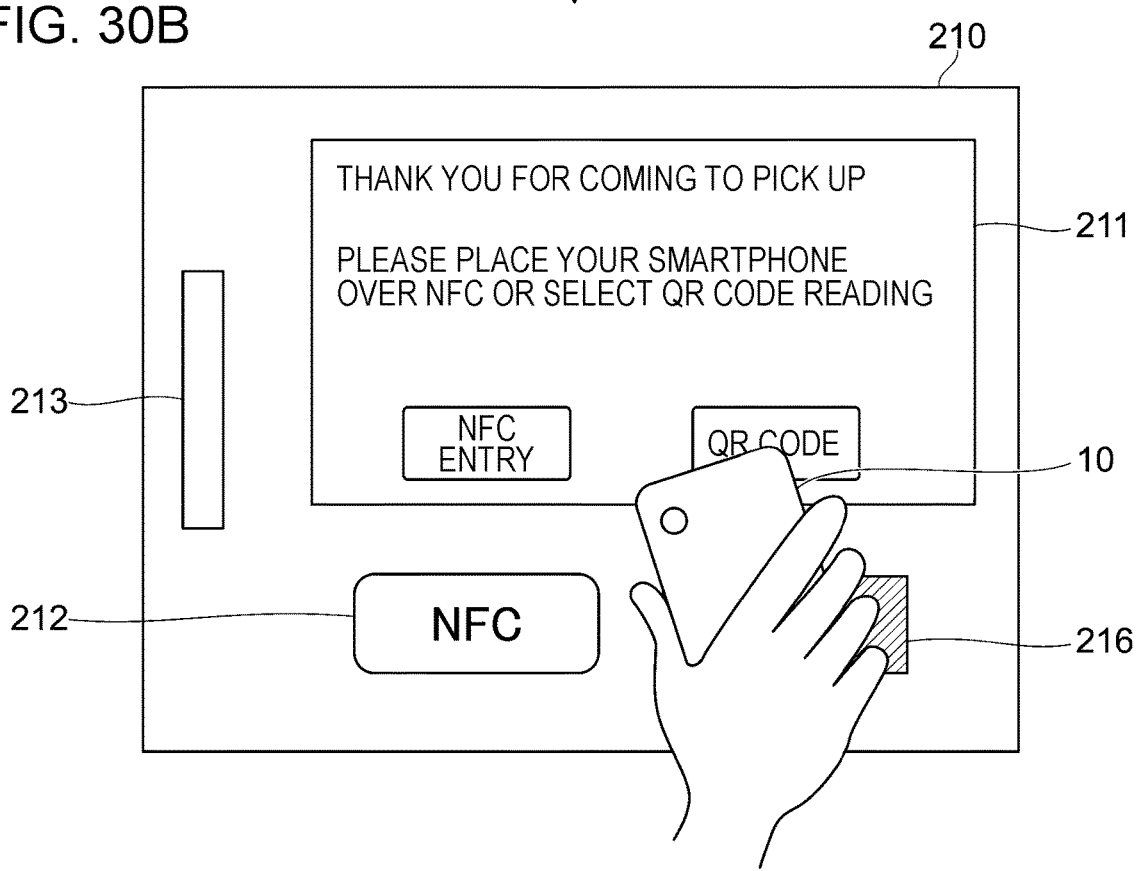

FIGS. 30A and 30B illustrate an example of a screen displayed in a case where a QR code is used for unlocking. FIG. 30A illustrates an example of the door 210 having a RQ code reading unit 216, and FIG. 30B is a view for explaining how a QR code is read. In FIGS. 30A and 30B, parts corresponding to those in FIGS. 27A and 27B are given corresponding reference signs.

In FIG. 30A, the RQ code reading unit 216 is disposed beside the NFC communication unit 212 in a lower portion of the door 210.

In the example of FIG. 30A, messages "THANK YOU FOR COMING TO PICK UP" and "PLEASE PLACE YOUR SMARTPHONE OVER NFC OR SELECT QR CODE READING" are displayed, and an "NFC ENTRY" button and a "QR CODE" button are displayed in a lower portion of the display 211.

In the example of FIG. 30A, the user taps the "QR CODE" button.

In this case, the user causes the QR code 146 (see FIG. 24) included in a notification screen presented when the reservation was confirmed to be displayed on the display screen of the terminal 10. Then, the user places the QR code over the reading unit 216, as illustrated in FIG. 30B.

As described above, the QR code 146 records information on the reservation.

As a result, the information thus read out is compared with information managed for the box 270 (see FIG. 6) corresponding to the door 210 over which the QR code 146 is placed.

In a case where the user is authenticated as a result of the comparison, the display 211 switches to the screen of FIG. 28B. This enables the user to take out the printed material.

Note that the operation procedures described with reference to FIGS. 27 through 30 can be performed through the touch panel 223A (see FIG. 3) disposed in a central part of the body 201 (see FIG. 1). In this case, however, the user may be required to enter a number of a box in which a printed material to be picked up is stored.

In a case where a method for reading information related to a reservation by using NFC or a QR code is selected as illustrated in FIGS. 29A and 29B and 30A and 30B, user authentication is executed by using a number of a box included in the read information.

Furthermore, in a case where the user is authenticated, for example, the target door 210 may be opened under control of the processor 200A (see FIG. 5), a number or a position of the unlocked box may be displayed on the touch panel 223A, or a display color or luminance of the display 211 provided on the door 210 may be changed. The change in display color or luminance may be performed for the whole display 211 or may be performed only for characters displayed on the display 211.

Furthermore, the terminal 10 which the user carries may be notified about a position or a number of the door 210 corresponding to a box in which a printed material is stored.

As illustrated in FIGS. 27 through 30, an advantage of directly operating the door 210 of the box in which the printed material is stored lies in a case where another user is operating the touch panel 223A provided at the center of the body 201.

Figure 31A:
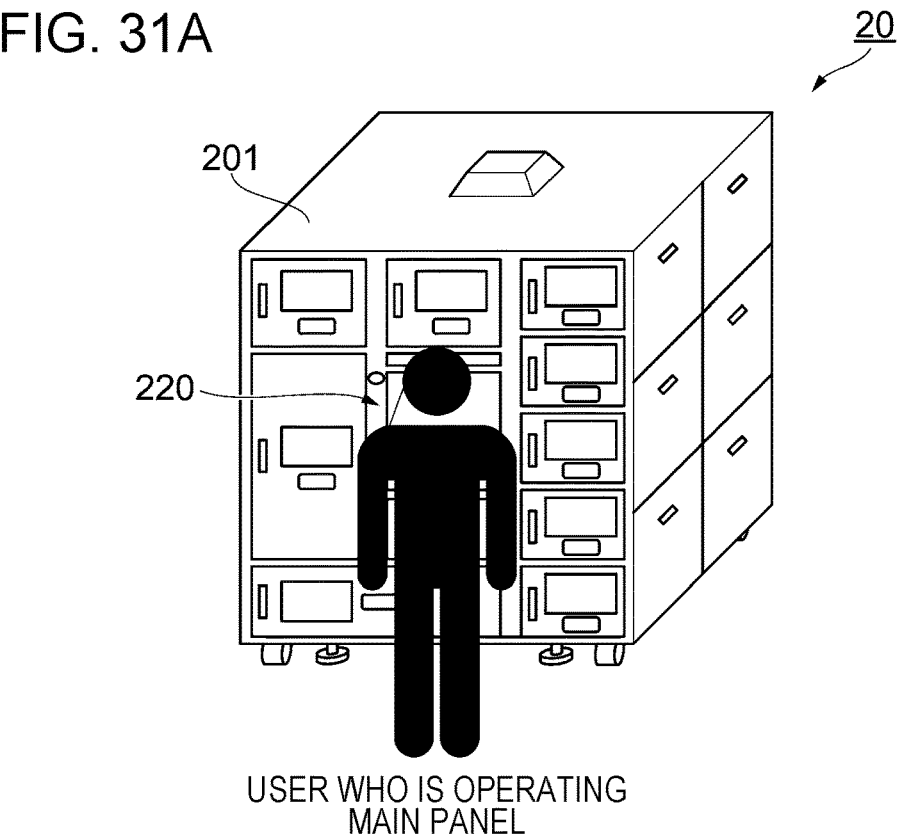
FIGS. 31A and 31B are views for explaining a case where a front panel is being used when a user tries to pick up a printed material.
Figure 31B:
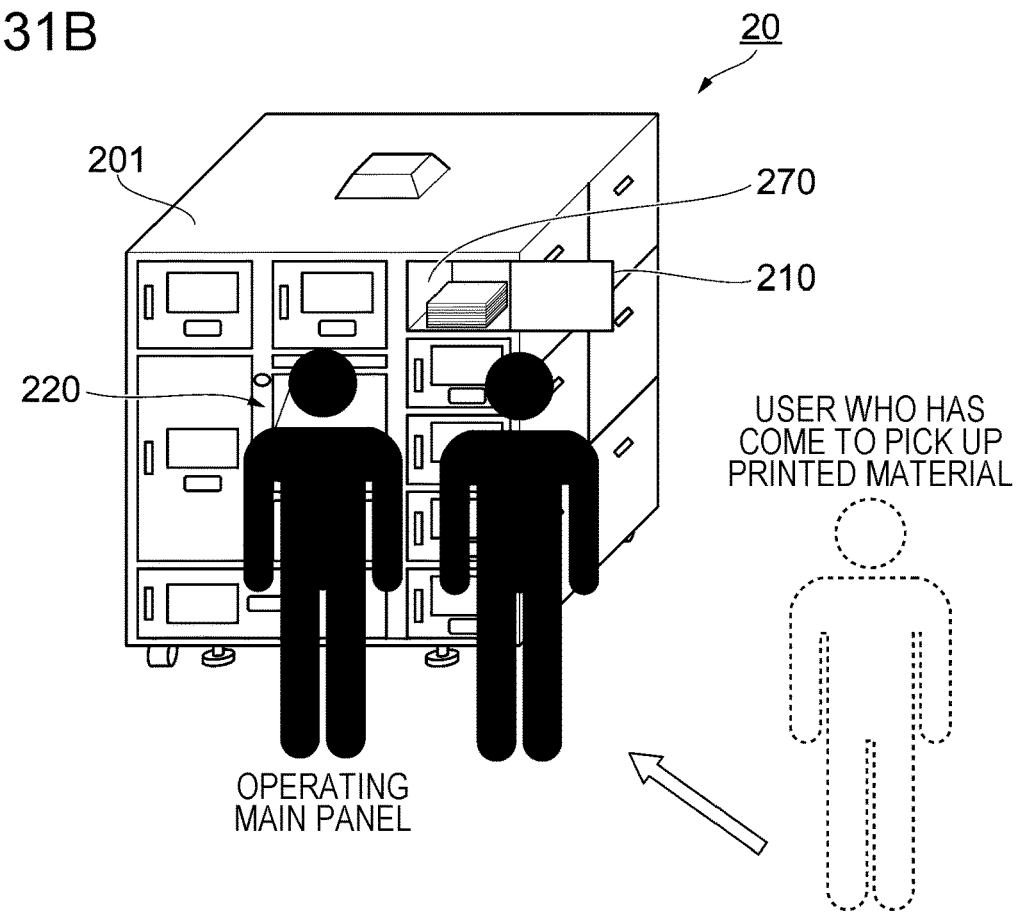

FIGS. 31A and 31B are views for explaining a case where the front panel 220 is being used when a user tries to pick up a printed material. FIG. 31A illustrates another user who is operating the front panel 220, and FIG. 31B illustrates how a user takes out a printed material. The front panel 220 is an example of an "operation panel" operated by a user for purposes such as on-demand print, scan, and copy.

Another user illustrated in FIG. 31A is operating the front panel 220 in order to execute on-demand print or scan a document.

For the on-demand print, a user gives an instruction at the actual place to print a document uploaded in advance onto a cloud server or a user, for example, inserts a portable semiconductor memory into the front panel 220 and gives an instruction to print a document.

In either case, a user who comes to pick up a printed material cannot operate the front panel 220 while the other user is operating the front panel 220 and needs to wait for the other user to finish his or her operation.

Meanwhile, in a case where the user can perform a pickup operation on the door 210 of a box in which a printed material is stored as described above, the user can take out the printed material by opening the door 210 without waiting for the other user to finish his or her operation, as illustrated in FIG. 31B.

In a case where a user prints a document while being out, it is assumed that the user visits a client after picking up a printed material and a time of the visit is decided in advance.

Even in such a case, in a case where a user can pick up a printed material without a waiting time as in the present exemplary embodiment, the user can visit a client at a scheduled time.

See FIG. 19 again.

When the user completes pickup of the printed material by any of the above methods, the printing-function-equipped locker 20 notifies the management server 30 about completion of pickup (step 13). Upon receipt of the notification, the management server 30 transfers the notification to the terminal 10.

Then, the printing-function-equipped locker 20 updates management data managed in the HDD 200D (see FIG. 5) (step 14). Specifically, a pickup time is recorded in the operational status table 292 (see FIG. 11).

Meanwhile, the management server 30 updates the operational status table 310C (see FIG. 12) managed in the HDD 310 (see FIG. 12) (step 15). Specifically, the pickup time is recorded in the operational status table 310C (see FIG. 16).

Use Example 2

Figure 32:
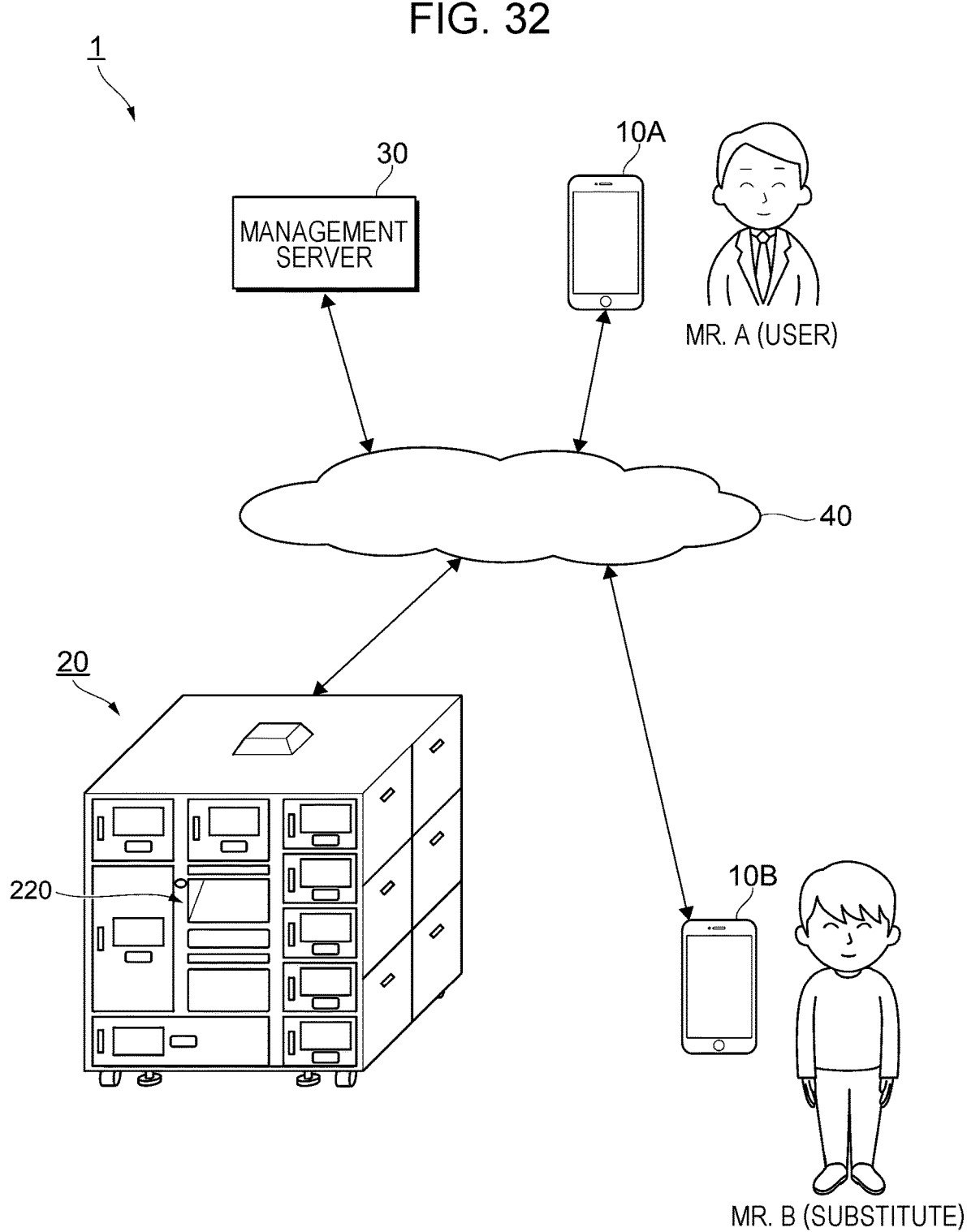
FIG. 32 is a view for explaining a case where a substitute picks up a printed material.

The following describes a case where a substitute picks up a printed material with reference to FIGS. 32 and 33.

FIG. 32 is a view for explaining a case where a substitute picks up a printed material. In FIG. 32, parts corresponding to those in FIG. 1 are given corresponding reference signs.

In the network print system 1 in FIG. 32, a user who makes a reservation of printing and storage of a printed material to the printbox service is Mr. A, and a user A's substitute who visits the printing-function-equipped locker 20 to collect the printed material is Mr. B.

In FIG. 32, a terminal operated by Mr. A is a terminal 10A, and a terminal operated by Mr. B is a terminal 10B.

The terminal 10A operated by Mr. A and the terminal 10B operated by Mr. B can communicate with each other through the communication network 40.

Since the substitute picks up the printed material, Mr. A is located at a place away from the printing-function-equipped locker 20.

Figure 33A:
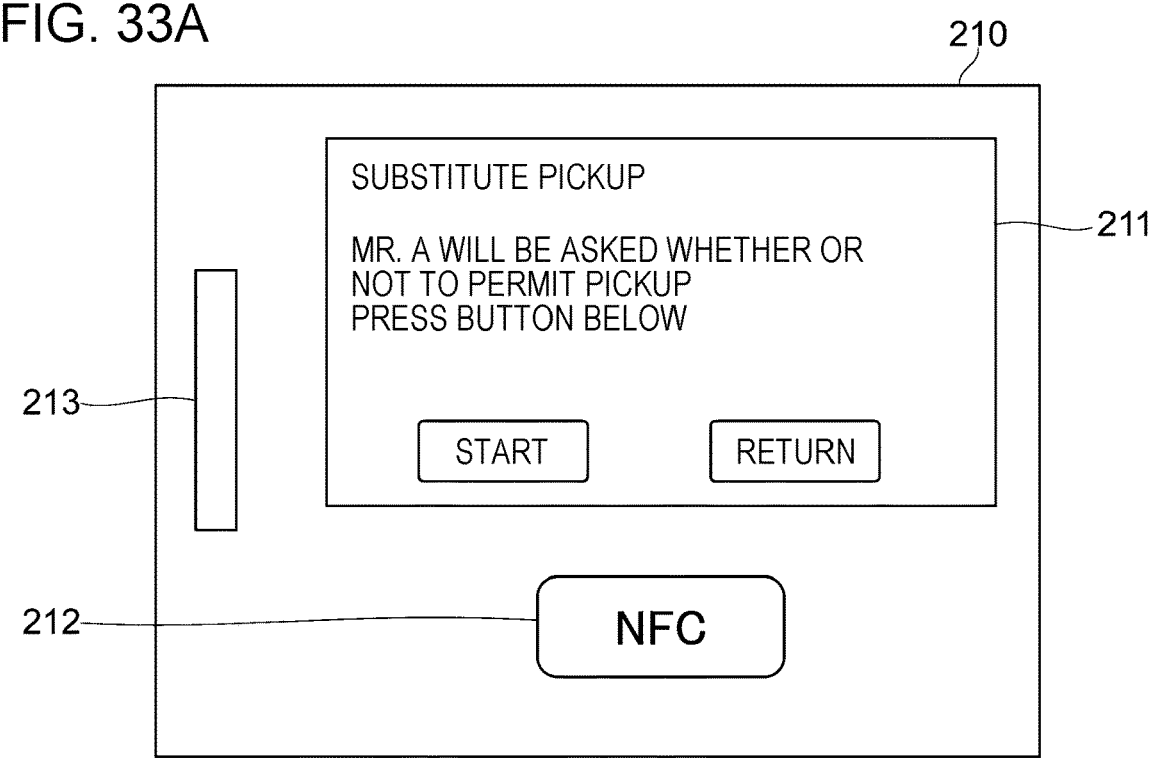
FIGS. 33A and 33B are views for explaining an example of an operation screen presented when the substitute picks up the printed material.
Figure 33B:
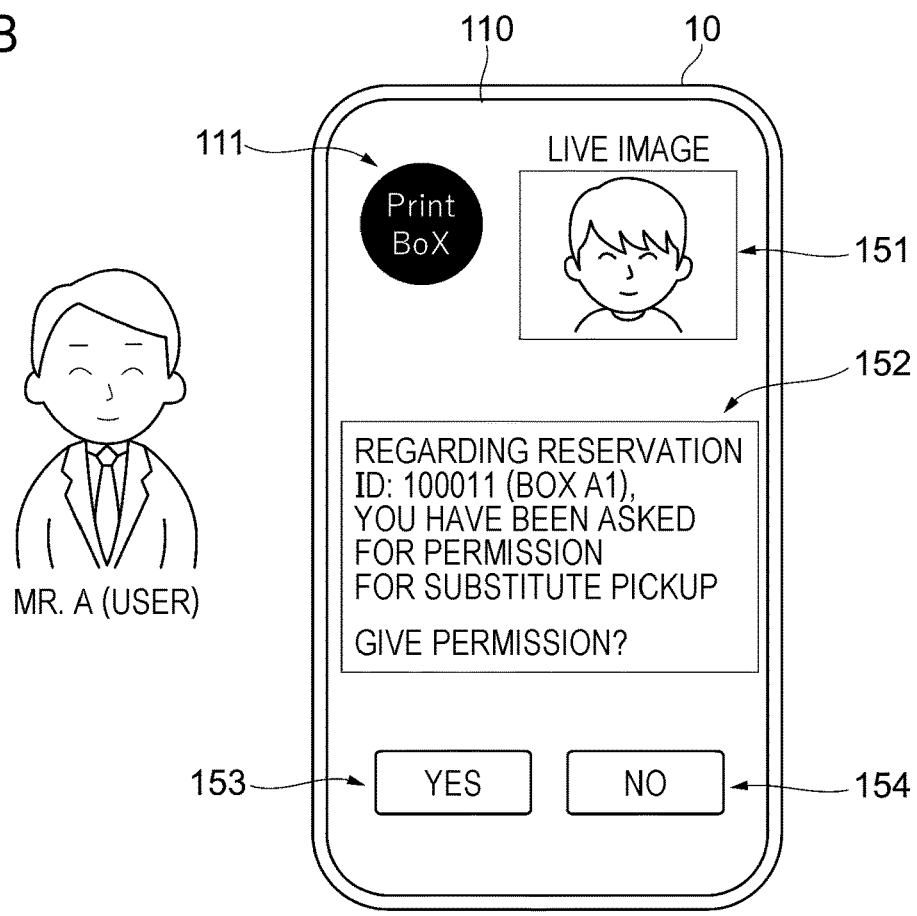

FIGS. 33A and 33B are views for explaining an example of an operation screen presented when the substitute picks up the printed material. FIG. 33A illustrates an example of an operation screen presented to Mr. B who has come to pick up the printed material, and FIG. 33B illustrates an example of an operation screen presented to Mr. A who requested pickup. In FIG. 33B, parts corresponding to those in FIG. 21 are given corresponding reference signs.

The operation screen illustrated in FIG. 33A is displayed on the display 211 of the door 210. This operation screen is displayed, for example, when Mr. B, who is a substitute visiting the printing-function-equipped locker 20 (see FIG. 32), selects substitute pickup by operating, for example, the front panel 220 (see FIG. 2).

In the example of FIG. 33A, messages "SUBSTITUTE PICKUP", "MR. A WILL BE ASKED WHETHER OR NOT TO PERMIT PICKUP", and "PRESS BUTTON BELOW" are displayed on the display 211. In the example of FIG. 33A, a "START" button and a "RETURN" button are displayed in a lower portion of the display 211.

Although information on Mr. A, who requested pickup, is displayed in the example of FIG. 33A, the information on Mr. A may be kept secret. For example, a message such as "USER WHO MADE RESERVATION WILL BE ASKED WHETHER OR NOT TO PERMIT PICKUP" or "USER WHO REQUESTED PICKUP WILL BE ASKED WHETHER OR NOT TO PERMIT PICKUP" is used.

In the present exemplary embodiment, when "START" is operated, a notification asking for permission of substitute's pickup is transmitted to Mr. A's terminal 10A.

The operation screen illustrated in FIG. 33B is displayed when the terminal 10A accesses the management server 30 (see FIG. 32) based on Mr. A's operation.

The operation screen illustrated in FIG. 33B includes a service logo 111, a live image 151, a message field 152, a "YES" button 153 operated in a case where permission is given, and a "NO" button 154 operated in a case where permission is not given.

The live image 151 is, for example, an image taken by the camera 222 (see FIG. 3) of the front panel 220 (see FIG. 3) and uploaded to the management server 30.

In a case where it is difficult for the camera 222 to take an image of Mr. B who is operating a screen, a face image of Mr. B taken when Mr. B operates the touch panel 223A of the front panel 220 may be used.

In a case where the door 210 is provided with a camera, a live image of the face of Mr. B operating a screen is taken.

Alternatively, an image live-streamed from the terminal 10B of Mr. B, who is a substitute, to the terminal 10A may be used as the live image 151. For example, Mr. A who has received a notification about substitute pickup may acquire a live image from the terminal 10B of Mr. B who is requested to substitute Mr. A, and the live image thus acquired may be displayed.

Note, however, that the live image 151 need not necessarily be displayed since it is only necessary that it can be confirmed that Mr. B picks up the printed material. For example, it may be confirmed that Mr. B picks up the printed material, for example, based on a phone conversation with Mr. B.

In the example of FIG. 33B, messages "REGARDING RESERVATION ID: 100011 (BOX A1), PERMISSION FOR SUBSTITUTE PICKUP IS BEING ASKED FOR" and "GIVE PERMISSION?" are displayed in the message field 152.

When Mr. A operates the "YES" button 153, the management server 30 is notified about execution of the operation. Next, the management server 30 instructs the printing-function-equipped locker 20 to unlock the target door 210.

When Mr. A operates the "NO" button 154, an unlocked state of the target door 210 is maintained.

Use Example 3

Free paper replenishing processing is described below with reference to FIGS. 34 and 35.

Figure 34:
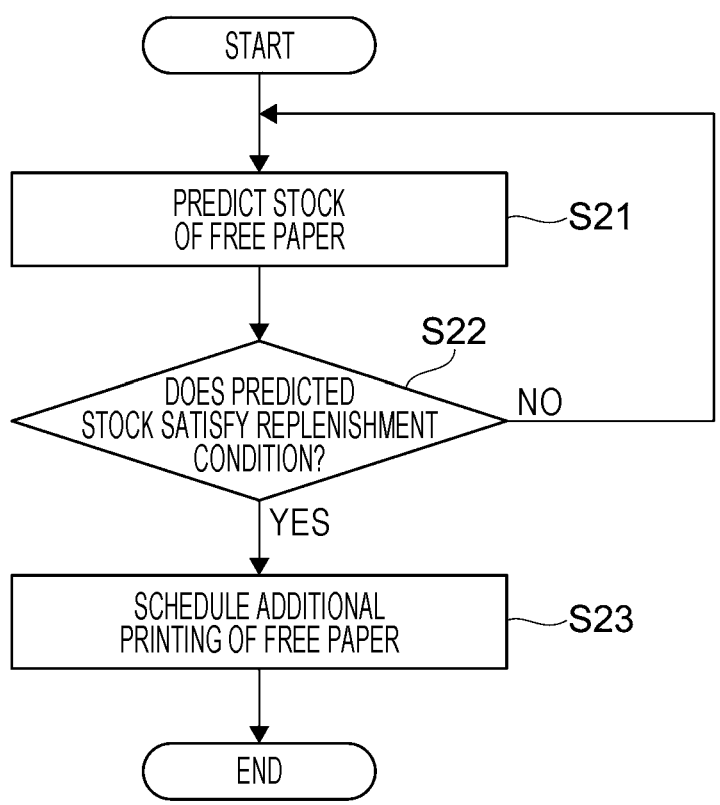
FIG. 34 is a flowchart for explaining free paper replenishing processing.

FIG. 34 is a flowchart for explaining free paper replenishing processing. In FIG. 34, the symbol "S" represents a step.

The processing illustrated in FIG. 34 is realized through execution of a program by the processor 200A (see FIG. 5).

In the printing-function-equipped locker 20 illustrated in FIG. 2, free paper is stored in the box "008".

Since the door 210 of the box in which free paper is stored is not locked, anyone can freely open the door 210 and take out free paper.

Note, however, that the door 210 of the box in which free paper is stored may be locked. When a user selects takeout of free paper, for example, on the front panel 220, the target door 210 may be unlocked.

The processor 200A according to the present exemplary embodiment always predicts a stock of free paper (step 21).

One example of a method for predicting a stock of free paper is to take an image of an inside of a box by a camera placed in the box and predict a stock from the taken image. It is unnecessary to take an image of the whole stored free paper. An image is taken from a position and a direction from which a height of a bundle of stored free paper can be grasped. Specifically, an image is taken from a position and a direction from which it can be determined whether or not there is a stock equal to or higher than a standard height for determining necessity of additional printing.

Another example of a method for predicting a stock of free paper is a method for predicting a stock from a weight of a printed material. This method can be employed in a case where a weight scale is placed in the box.

Another example of a method for predicting a stock of free paper is a method for predicting a stock from the number of times of opening and closing of the door 210 (see FIG. 1) of the box in which free paper is stored.

Another example of a method for predicting a stock of free paper is a method for predicting a stock from the number of times of authentication at a time of opening and closing of the door 210. This method is employed in a case where authentication is required for unlocking, which is free of charge. This authentication does not require identification of an individual. For example, it is only necessary to enter information for unlocking that is, for example, distributed in advance.

Another example of a method for predicting a stock of free paper is a method of predicting the number of persons who opened and closed the door 210 from an image taken by the camera 222 (see FIG. 3).

When the stock of free paper is predicted, the processor 200A determines whether or not the predicted stock satisfies a replenishing condition (step 22). The replenishing condition varies depending on a method used for prediction. In a case where an approximate number of copies or sheets is predicted, it is determined whether or not the predicted number is larger than a reference value.

In any case, the processor 200A returns to step 21 while a negative result is being obtained in step 22.

Meanwhile, in a case where a positive result is obtained in step 22, the processor 200A schedules additional printing of free paper (step 23).

Figure 35A:
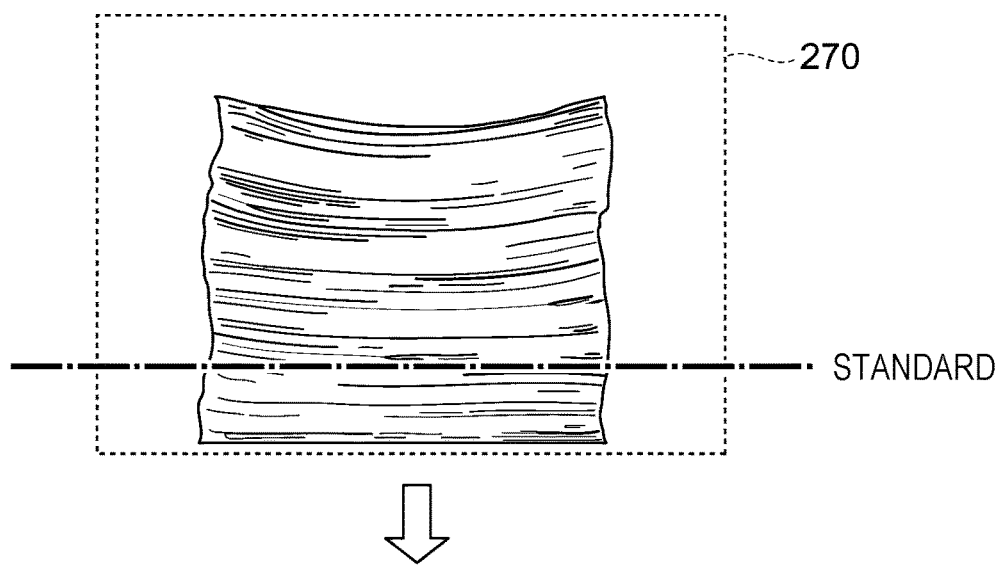
FIGS. 35A through 35C are views for explaining replenishment of free paper by the processor.
Figure 35B:
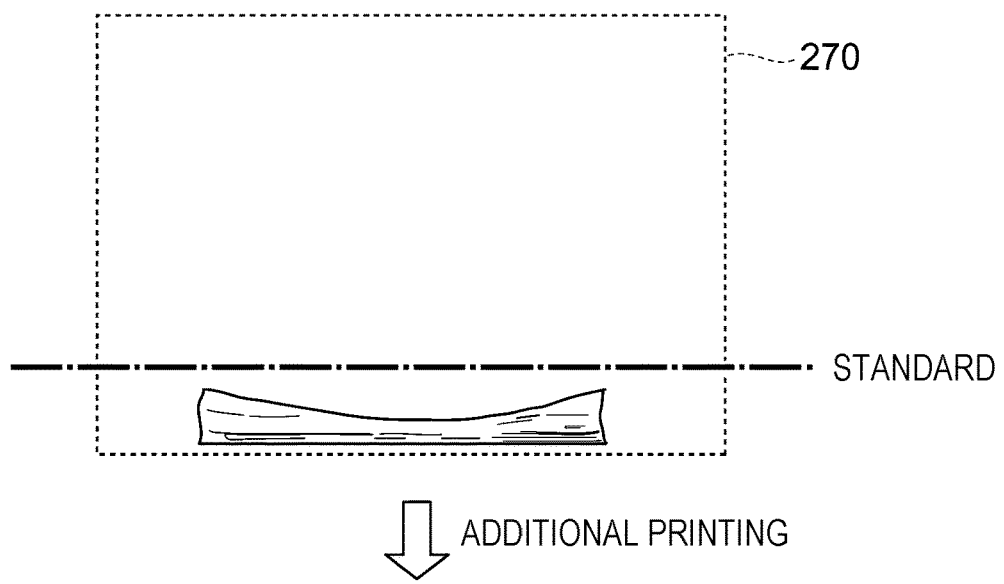
Figure 35C:
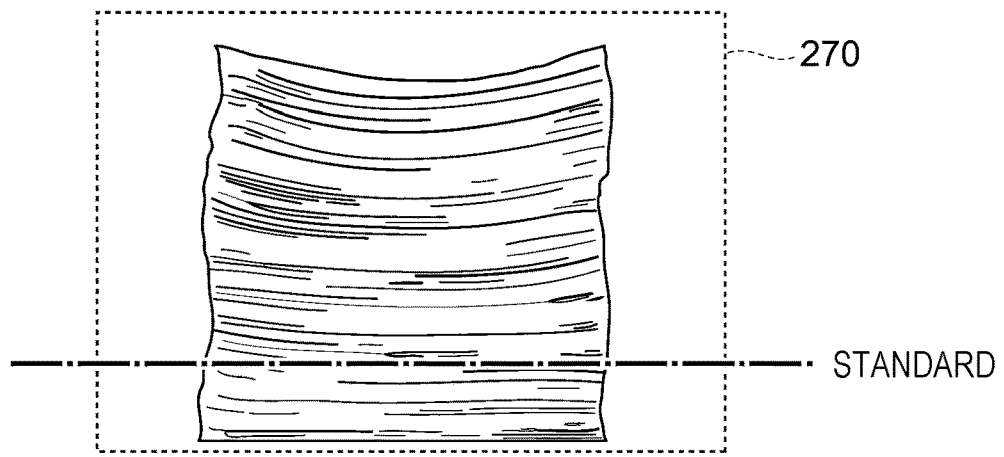

FIGS. 35A through 35C are views for explaining replenishment of free paper by the processor 200A. FIG. 35A illustrates an example in which a stock of free paper is larger than a standard, FIG. 35B illustrates an example in which a stock of free paper is smaller than the standard, and FIG. 35C illustrates an example in which a stock of free paper becomes larger than the standard as a result of additional printing.

The replenishment of a printed material by additional printing by the processor 200A can also be applied to newspapers and booklets which a user can take out by paying a fee. In a case of such a printed material that requires payment, the door 210 is opened and closed on a condition that payment is detected. That is, payment is used instead of authentication. In a case of such a printed material that requires payment, the box 270 is provided with a false bottom for the purpose of preventing more copies than copies corresponding to paid money from being taken out and a mechanism of discharging only copies corresponding to paid money to a place that can be accessed by a user under control of the processor 200A is employed.

Use Example 4

FIGS. 36A and 36B are views for explaining an example of a screen presented in a case where a user who desires on-demand printing is guided to a nearby shop. FIG. 36A illustrates an example of a screen displayed in a case where on-demand printing is received during execution of reserved printing, and FIG. 36B illustrates an example of a screen for introducing a nearby shop.

In the printing-function-equipped locker 20 used in the present exemplary embodiment, printing of a printed material is executed in accordance with a user's reservation of the printbox service.

Accordingly, such a situation can occur in which reserved printing is being executed when a user who desires on-demand printing visits the printing-function-equipped locker 20 although no customer is present around the printing-function-equipped locker 20.

In such a case, convenience of a user who visits for on-demand printing is impaired. Furthermore, a business operator who installs the printing-function-equipped locker 20 loses an opportunity to provide a service.

In view of this, the printing-function-equipped locker 20 causes a screen illustrated in FIG. 36A to be displayed on the touch panel 223A in a case where on-demand printing is received during execution of reserved printing.

In the example of FIG. 36A, messages "RESERVED PRINTING IS BEING CURRENTLY EXECUTED", "THIS PRINTING IS SCHEDULED TO END 10 MINUTES LATER AT 15:30", and "DO YOU NEED INFORMATION ON NEARBY SHOP WHERE ON-DEMAND PRINTING IS AVAILABLE?", a "YES" button, and a "NO" button are displayed.

In the example of FIG. 36A, in which a reason why on-demand printing cannot be executed is displayed, it is expected that a user is more likely to accept the situation than a case where no reason is displayed.

In the example of FIG. 36A, information indicating that the user needs to wait for 10 minutes at the place and a time at which on-demand printing will become available are displayed. This provides the user who desires on-demand printing with information for deciding whether the user should wait at the place or go to another shop.

Note that in a case where there is another reserved printing successive to printing that is being executed, a period it takes for all of the successive reservations to end and a time at which on-demand printing becomes available are displayed.

Furthermore, in relation to a scheduled pickup time, reserved printing is sometimes scheduled so that there occurs only a slight unoccupied time between successive reserved printing. In this case, there is a possibility that execution of other scheduled printing is affected if on-demand printing is received unconditionally after the end of printing that is being executed.

In such a case, it is desirable that the processor 200A be provided with a function of causing a user who desires on-demand printing to enter the number of sheets printed by the on-demand printing and a data file and checking in advance whether or not the on-demand printing can be interposed.

In a case where the on-demand printing is printing of several sheets, the on-demand printing can be interposed even if there is only an unoccupied time of about five minutes. Meanwhile, in a case where an estimated operating time of the on-demand printing is longer than an unoccupied time of the schedule, the on-demand printing cannot be interposed.

Note, however, that the schedule is sometimes adjustable in relation to a scheduled pickup time of a printed material. For example, there are cases where printing is scheduled several hours before a scheduled pickup time of a printed material (e.g., time-shift print). In such cases, if all of other scheduled printing can be executed even if the start time is shifted to a later time by about 30 minutes, the on-demand printing can be interposed after the end of printing that is being executed or the on-demand printing can be interposed by interrupting the printing that is being executed.

Such interposing of the on-demand printing is possible because a printed material printed by using the printbox service is stored in a reserved box 270.

In a case where the "YES" button is operated, the touch panel 223A switches to the screen of FIG. 36B.

In the example of FIG. 36B, names of shops, distances to the shops, and buttons for displaying maps for explaining places of the shops are displayed below a message "THERE ARE THREE AVAILABLE SHOPS" on the touch panel 223A.

Furthermore, a button for "RETURN" to a previous screen is displayed in a lower portion of the screen.

By presenting other shops where on-demand printing is available, both convenience of a user and an opportunity of earning can be realized since on-demand printing is often urgent.

Note that it is necessary to avoid a situation where there is a reservation of the printbox service at a time when the user will arrive at the guided shop.

Therefore, in a case where another shop is presented, it is confirmed that there is no reservation of the printbox service. Furthermore, it is also possible to employ a function of causing a user to upload a document that is a target of on-demand printing to the management server 30 before moving to another shop so that the user can pick up a printed material at the printing-function-equipped locker 20 installed at the other shop after arriving at the other shop.

This function allows the user to effectively use a time of movement to the other shop. Furthermore, it is desirable that a time at which a printed material can be picked up if a reservation of printing and storage of the printbox service is received at each of presented shops be calculated and presented.

If a time at which a printed material can be picked up is known, a user can reserve a shop convenient for the user while comprehensively considering, for example, a time of movement to a shop and a time of movement to a destination after pickup.

Note that reading of a document by a scanner is not relevant to printing and therefore can be received even during execution of reserved printing.

Second Exemplary Embodiment

A second exemplary embodiment will be described below with reference to FIGS. 37 through 40.

Overall Configuration of System

Figure 37:
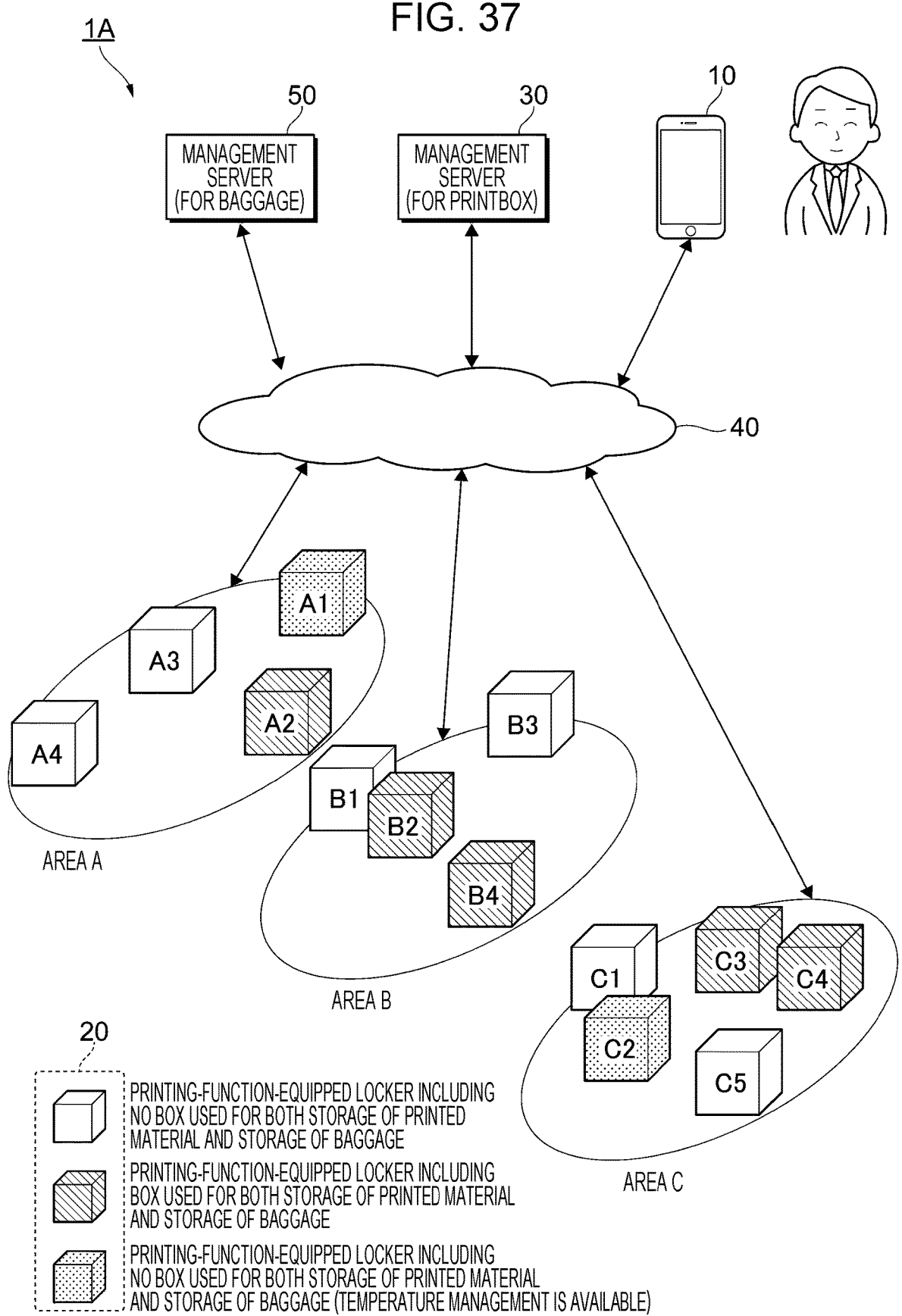
FIG. 37 is a view for explaining a use example of a network print system assumed in the second exemplary embodiment.

FIG. 37 is a view for explaining a use example of a network print system 1A assumed in the second exemplary embodiment. In FIG. 37, parts corresponding to those in FIG. 1 are given corresponding reference signs.

The network print system 1A according to the present exemplary embodiment includes a printing-function-equipped locker 20 that includes no box used for both of storage of a printed material and storage of baggage and a printing-function-equipped locker 20 that includes a box used for both of storage of a printed material and storage of baggage.

Furthermore, the printing-function-equipped locker 20 that includes a box used for both of storage of a printed material and storage of baggage is classified into a printing-function-equipped locker 20 that supports a temperature management function and a printing-function-equipped locker 20 that does not have a temperature management function.

That is, the printing-function-equipped lockers 20 illustrated in FIG. 37 are classified into three kinds depending on a function. In FIG. 37, different kinds of shading are used for the different kinds of printing-function-equipped lockers 20.

The network print system 1A illustrated in FIG. 37 is different from the network print system 1 illustrated in FIG. 1 in that a management server 50 that manages storage of baggage is added. In the present exemplary embodiment, a business operator who runs the management server 50 is different from a business operator who runs a management server 30. Note, however, that the business operators who run these servers may be the same.

Data Example of Equipment Table

FIG. 38 illustrates a data example of an equipment table 310B used in the second exemplary embodiment. In FIG. 38, parts corresponding to those in FIG. 15 are given corresponding reference signs.

A difference between the equipment table 310B illustrated in FIG. 38 and the equipment table 310B illustrated in FIG. 15 is a "STORED OBJECT" column.

Specifically, a stored object of box IDs "A1_002" to "A1_007", "A2_005", "B1_001", and "C1_001" in the equipment table 310B illustrated in FIG. 38 is a printed material and baggage.

That is, these boxes are used for storage of a printed material in some cases and are used for storage of baggage in other cases.

Configuration of Management Server that Manages Storage of Baggage

Figure 39:
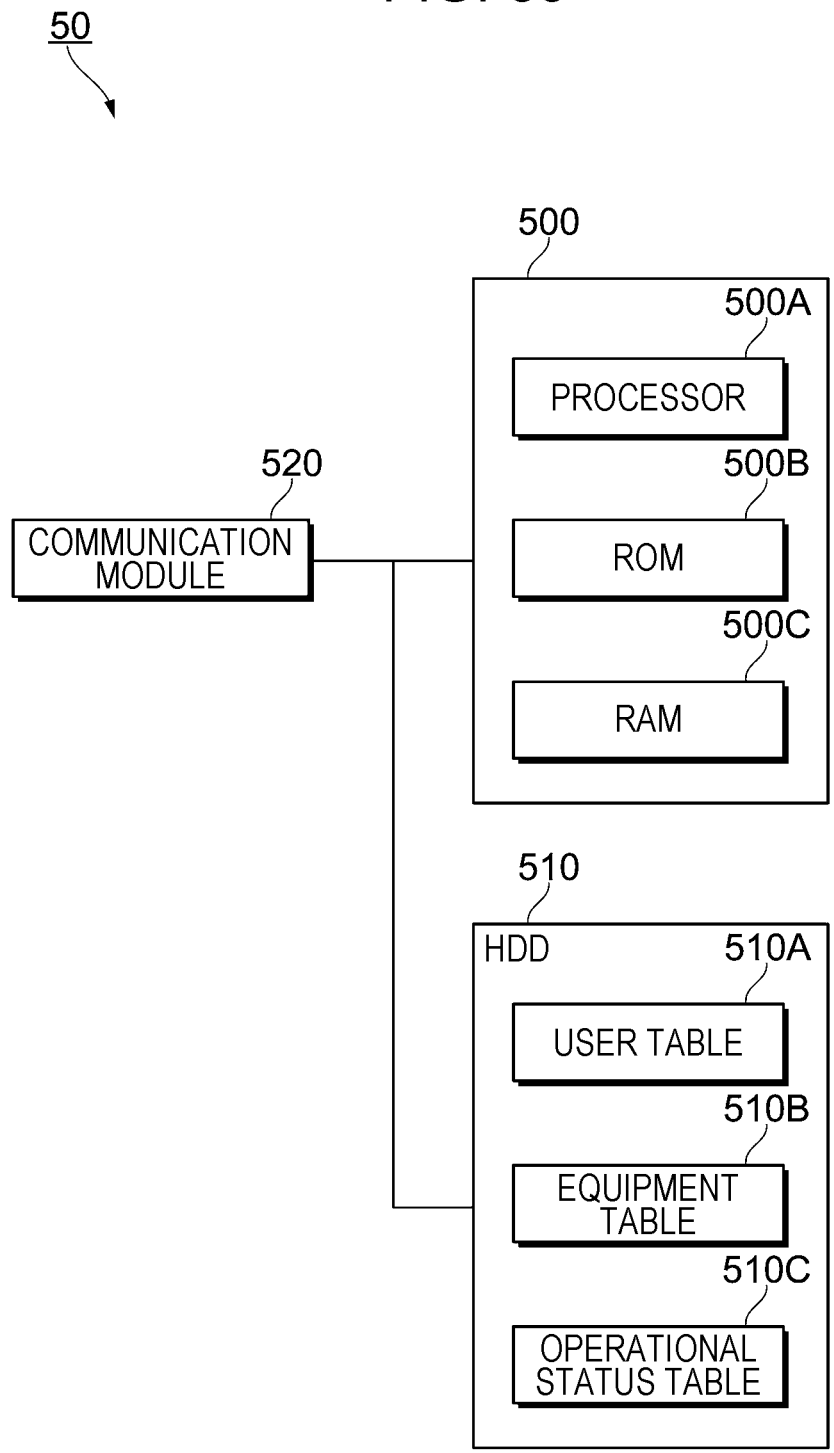
FIG. 39 is a view for explaining an example of a hardware configuration of a management server used in the second exemplary embodiment.

FIG. 39 is a view for explaining an example of a hardware configuration of the management server 50 used in the second exemplary embodiment.

The management server 50 illustrated in FIG. 39 has a controller 500, an HDD 510, and a communication module 520.

The controller 500 has a processor 500A, a ROM 500B in which BIOS and others are stored, and a RAM 500C used as a work area.

The communication module 520 is used for communication with a terminal 10, the printing-function-equipped locker 20, and the management server 30.

The HDD 510 stores therein management data for managing receipt and dispatch of baggage. In the present exemplary embodiment, a user table 510A, an equipment table 510B, and an operational status table 510C are stored as the management data.

The user table 510A is a table in which users registered in a service for receipt and dispatch of baggage using a locker are managed.

The equipment table 510B is a table in which equipment of managed lockers is managed. In the present exemplary embodiment, one or some of the managed lockers are the printing-function-equipped lockers 20. For example, the equipment table 510B uses a similar data structure to the equipment table 310B (see FIG. 38).

The operational status table 510C is a table in which operating statuses of boxes of the lockers are managed.

As the operating statuses, for example, information such as "EMPTY", "WAITING TO BE RECEIVED", and "WAITING TO BE DISPATCHED" is recorded.

Data of the operating status "WAITING TO BE RECEIVED" is associated with information on a recipient. Data of the operating status "WAITING TO BE DISPATCHED" is associated with information on a sender.

The operational status table 510C also uses, for example, a similar data structure to the operational status table 310C (see FIG. 16).

Processing Operation

Figure 40:
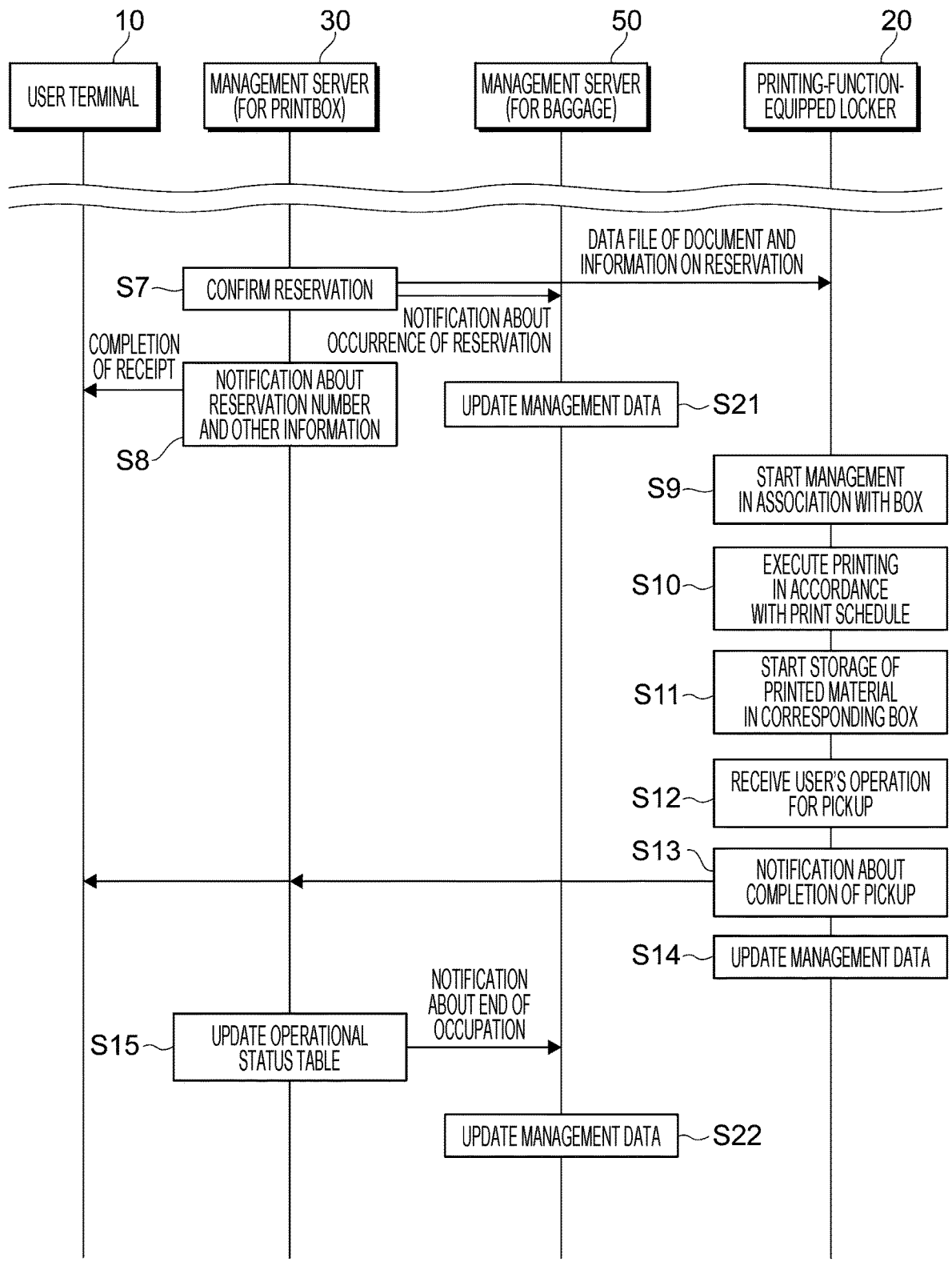
FIG. 40 is a view for explaining an example of processing operation that proceeds in the network print system used in the second exemplary embodiment.

FIG. 40 is a view for explaining an example of processing operation that proceeds in the network print system 1A (see FIG. 37) used in the second exemplary embodiment. In FIG. 40, parts corresponding to those in FIG. 19 are given corresponding reference signs. In FIG. 40, the symbol "S" represents a step.

The processing operation illustrated in FIG. 40 is illustrated from the perspective of use of a printbox service. In FIG. 40, the processing operation in steps 1 to 6 in FIG. 19 is omitted.

Therefore, the following description starts from step 7.

In FIG. 40, when a reservation of printing and storage of a printed material by the printbox service is confirmed, the management server 30 transmits a data file of a document and information on the reservation to the printing-function-equipped locker 20 and notifies the management server 50 that manages storage of baggage about occurrence of the reservation. This is because one or some boxes are also used for storage of baggage in the present exemplary embodiment. The notification may be given to the management server 50 only in a case where a box also used for storage of baggage is reserved.

Upon receipt of the notification, the management server 50 updates the management data (step 21). Specifically, the management server 50 updates a status of use of a corresponding box in the operational status table 510C (see FIG. 39).

Note that processing operation of the printing-function-equipped locker 20 that has received the data file of the document and other information is identical to FIG. 19.

Accordingly, when receipt of a printed material is completed, the management server 30 that manages storage of a printed material is notified about the completion.

The completion of receipt of the printed material means that a box in which the printed material was stored has become empty again.

Therefore, the management server 30 that manages a printed material updates the operational status table 310C and notifies the management server 50 that manages storage of baggage about end of occupation.

Upon receipt of this notification, the management server 50 updates the management data (step 22). Specifically, the management server 50 changes a status of use of the corresponding box in the operational status table 510C (see FIG. 39) to "EMPTY".

Third Exemplary Embodiment

In the present exemplary embodiment, a case where a door 210 (see FIG. 2) and a box 270 (see FIG. 6) are physically separate and the box 270 is movable inside a body 201 (see FIG. 2) is described.

Configuration of Printing-Function-Equipped Locker

Figure 41:
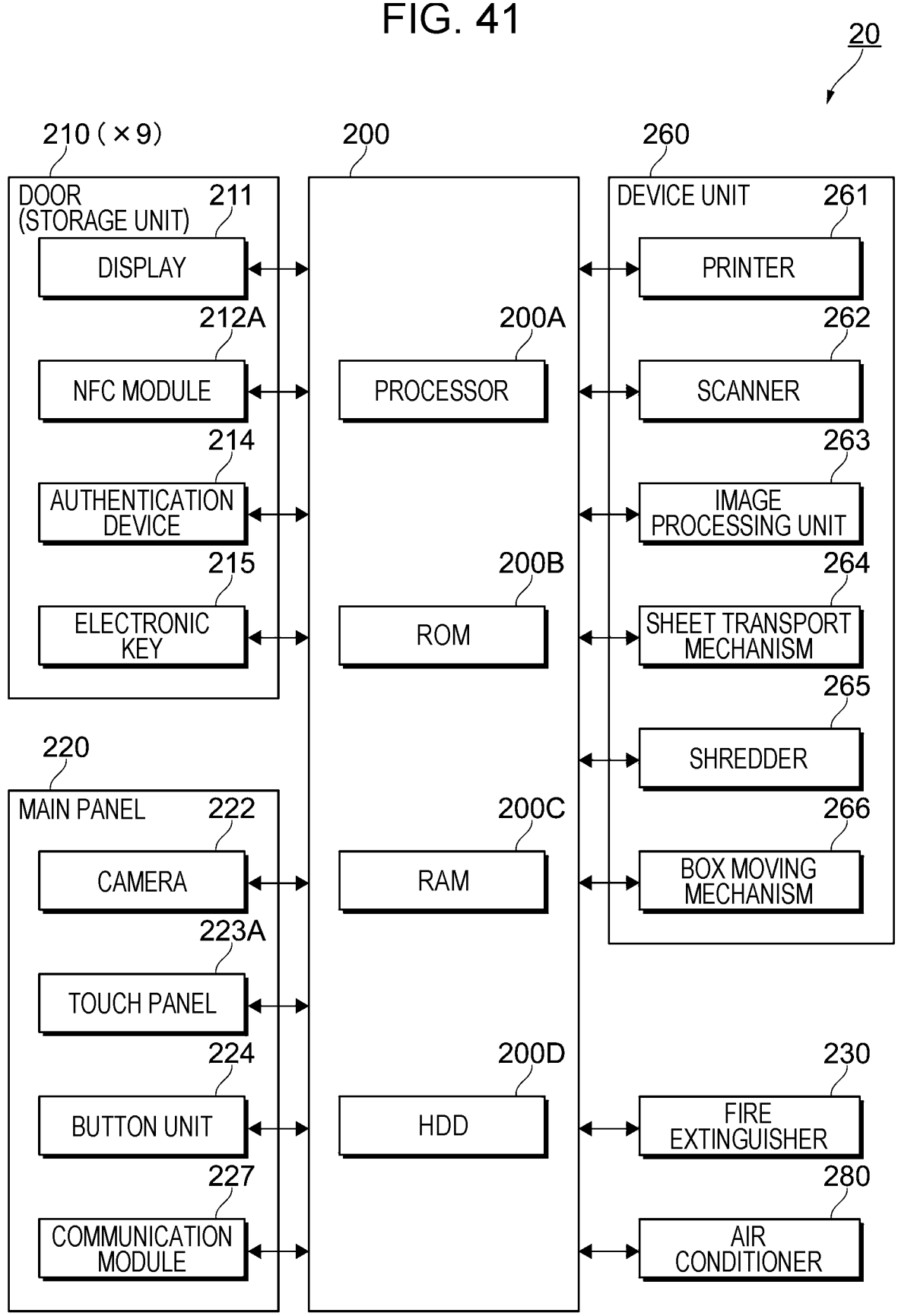
FIG. 41 is a view for explaining an example of a hardware configuration of a printing-function-equipped locker used in the third exemplary embodiment.

FIG. 41 is a view for explaining an example of a hardware configuration of a printing-function-equipped locker 20 used in the third exemplary embodiment. In FIG. 41, parts corresponding to those in FIG. 5 are given corresponding reference signs.

A device unit 260 of the printing-function-equipped locker 20 used in the present exemplary embodiment is different from the hardware configuration illustrated in FIG. 5 in that a box moving mechanism 266 is added. The box moving mechanism 266 is an example of a mechanism that is capable of moving a position of a box.

Figure 42A:
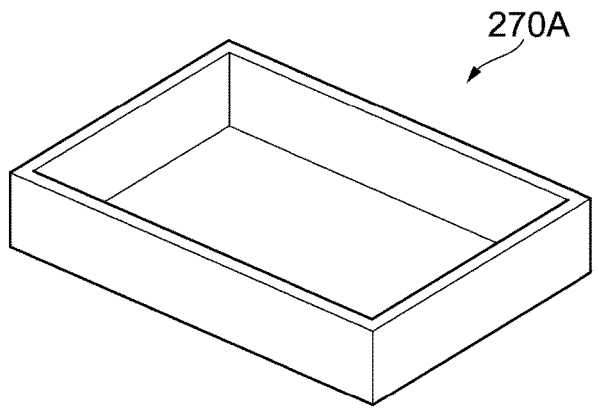
FIGS. 42A and 42B are views for explaining a shape and moving directions of a box moved by a box moving mechanism.
Figure 42B:
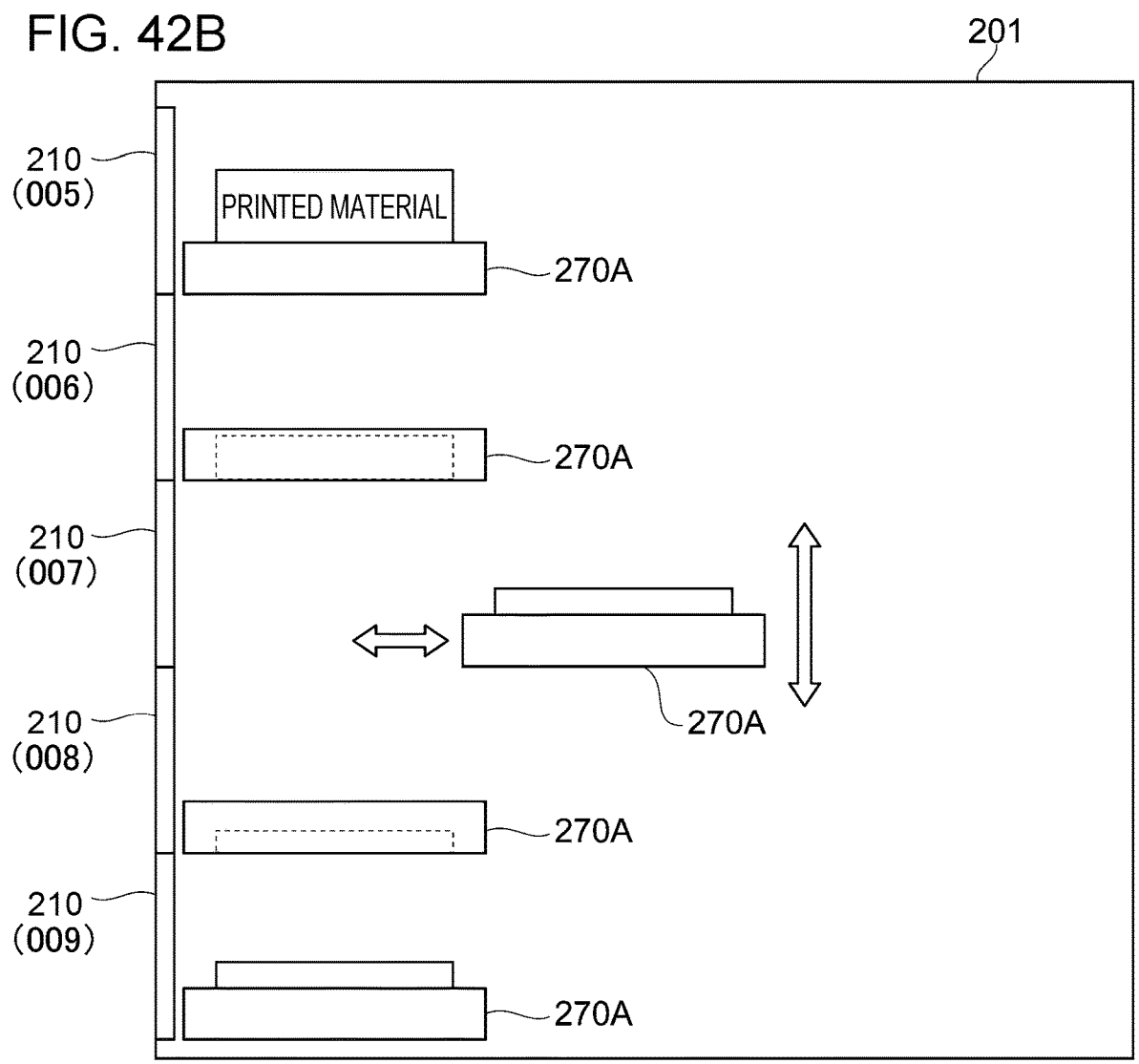

FIGS. 42A and 42B are views for explaining a shape and moving directions of a box 270A moved by the box moving mechanism 266. FIG. 42A illustrates an example of the box 270A used in the third exemplary embodiment, and FIG. 42B illustrates directions in which the box 270A is moved.

FIG. 42B illustrates an inside of the body 201 seen through from a right side face side. In FIG. 42B, the arrows indicate directions in which the box 270A moves. That is, the box 270A moves not only in a horizontal direction between a front face side and a back face side, but also moves in an up-down direction.

As illustrated in FIG. 42A, the box 270A according to the present exemplary embodiment has a box shape having a bottom face surrounded by side faces. In other words, the box 270A is opened on an upper side.

Accordingly, in the present exemplary embodiment, a printed material is put into and extracted from the box 270A through an opening provided on an upper side of the box 270A.

Figure 43A:
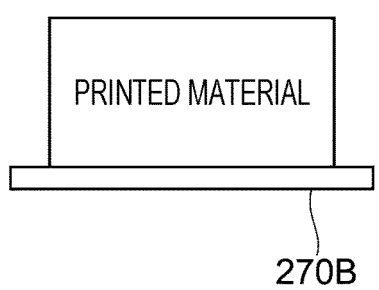
FIGS. 43A to 43C are views for explaining another shape and moving directions of the box moved by the box moving mechanism.
Figure 43B:
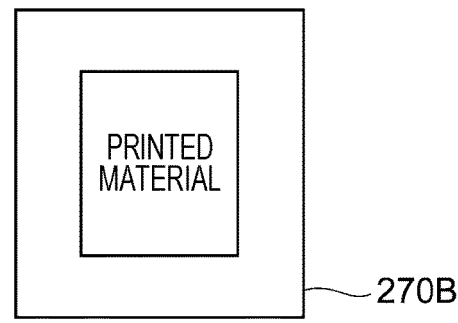
Figure 43C:
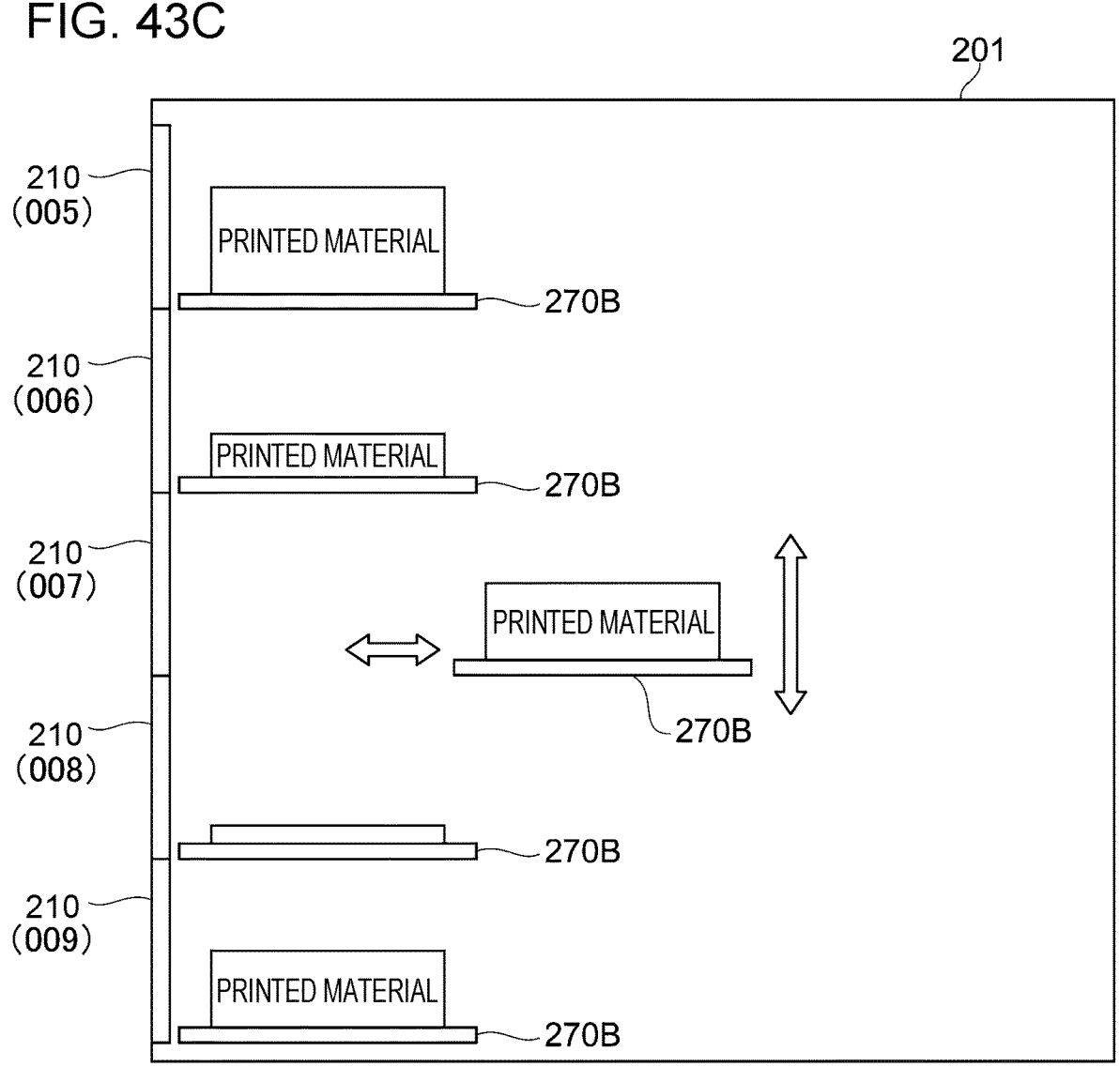

FIGS. 43A to 43C are views for explaining another shape and moving directions of the box 270B moved by the box moving mechanism 266. FIG. 43A is a view of the box 270B viewed from a side face side of the body 201, FIG. 43B is a view of the box 270B viewed from above, and FIG. 43C illustrates directions in which the box 270B is moved.

FIG. 43C is a view of an inside of the body 201 seen through a right side face side. In FIG. 43C, the arrows indicate directions in which the box 270B moves. That is, the box 270B moves not only in a horizontal direction between a front face side and a back face side, but also moves in an up-down direction.

As illustrated in FIGS. 43A and 43B, the box 270B used in the present exemplary embodiment has a shape similar to a plate or a shelf.

Accordingly, in the present exemplary embodiment, a printed material can be put into and extracted from the box 270B not only from an upper side, but also from a side face side.

Example of Movement of Movable Box

Figure 44:
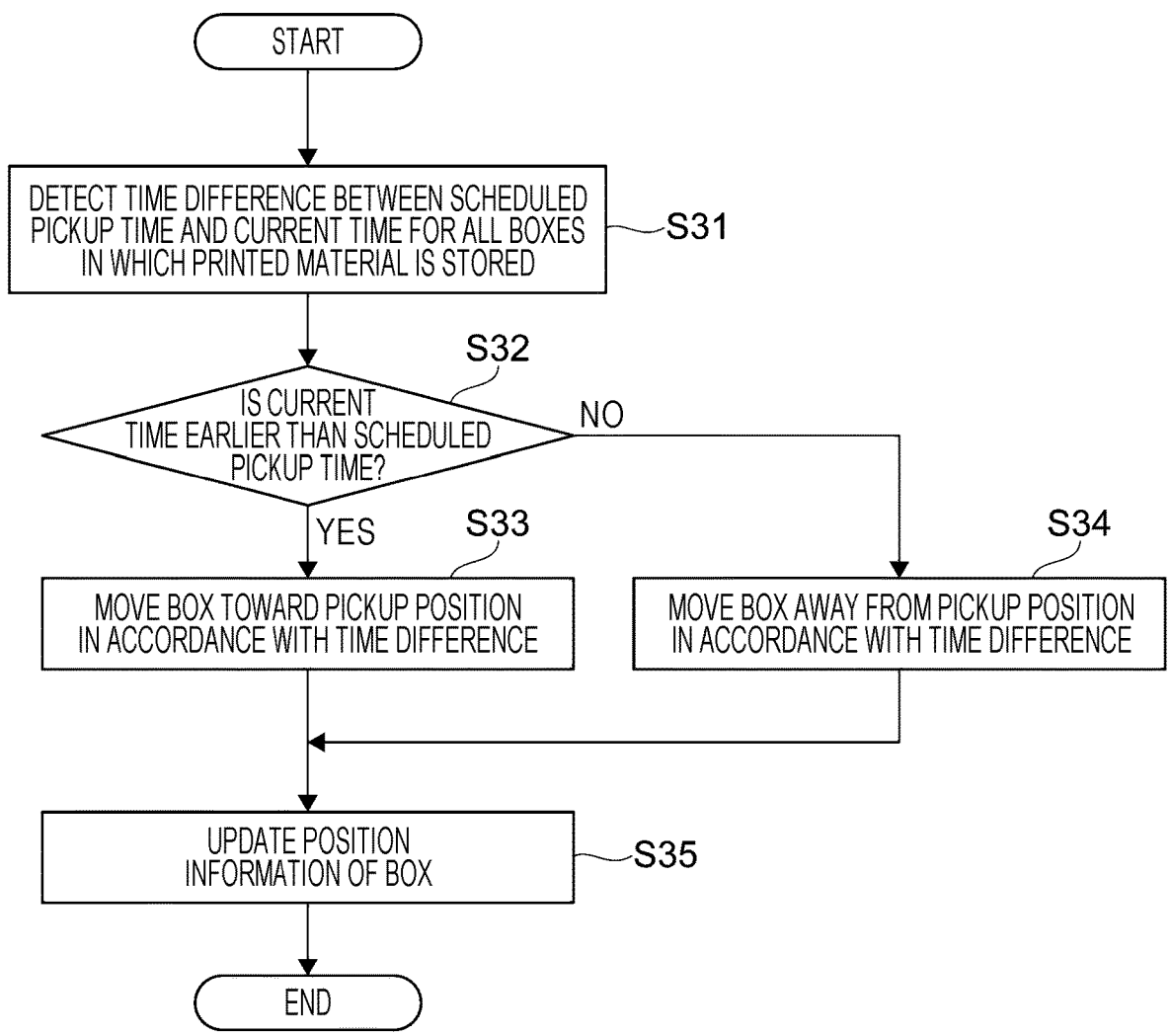
FIG. 44 is a flowchart for explaining movable box moving processing.

FIG. 44 is a flowchart for explaining movable box moving processing. In FIG. 44, the symbol "S" represents a step.

The processing illustrated in FIG. 44 is realized through execution of a program by the processor 200A (see FIG. 5).

The processor 200A according to the present exemplary embodiment detects, for all boxes in which a printed material is stored, a time difference between a scheduled pickup time and a current time (step 31).

Next, the processor 200A determines whether or not the current time is earlier than the scheduled pickup time (step 32).

In a case where the current time is earlier than the scheduled pickup time, the processor 200A obtains a positive result in step 32.

In this case, the processor 200A moves the box 270A or 270B toward a pickup position in accordance with the time difference (step 33).

In the present exemplary embodiment, it is assumed that the pickup position is a height at which a user can easily extract a printed material. For example, it is assumed that the pickup position is a central portion in a height direction of the body 201. In the printing-function-equipped locker 20 illustrated in FIG. 2, it is assumed that the pickup position is the position of the box ID "A1_001" or "A1_007". Note, however, that this position is merely an example.

Meanwhile, in a case where the current time is later than the scheduled pickup time, the processor 200A obtains a negative result in step 32.

In this case, the processor 200A moves the box 270A or 270B away from the pickup position in accordance with the time difference (step 34). In the printing-function-equipped locker 20 illustrated in FIG. 2, it is assumed that the box 270A or 270B is moved to the position of the box ID "A1_002", "A1_003", "A1_005", or "A1_006".

When the movement in step 33 or step 34 is completed, the processor 200A updates position information of the boxes (step 35).

For example, the processor 200A updates the positions of the boxes in which a printed material is stored in the body 201 on the basis of the doors 210 whose positions do not move.

In the present exemplary embodiment, a method of moving an adjacent another box one by one to a space formed by moving the box 270A or 270B toward the back face side is employed. Note, however, that plural boxes may be moved at once in a case where a place for evacuation can be secured. Furthermore, positions of plural boxes located behind separate doors 210 may be exchanged instead of moving boxes one by one.

First, how a box moves in a case where the current time is earlier than the scheduled pickup time is described.

FIGS. 45A to 45C are views for explaining how a box moves in a body in a case where the current time approaches the scheduled pickup time. FIG. 45A illustrates a position of the box "A1_007" two hours before the scheduled pickup time or earlier, FIG. 45B illustrates a position of the box "A1_007" one hour before the scheduled pickup time, and FIG. 45C illustrates a position of the box "A1_007" 15 minutes before the scheduled pickup time.

Figure 46A:
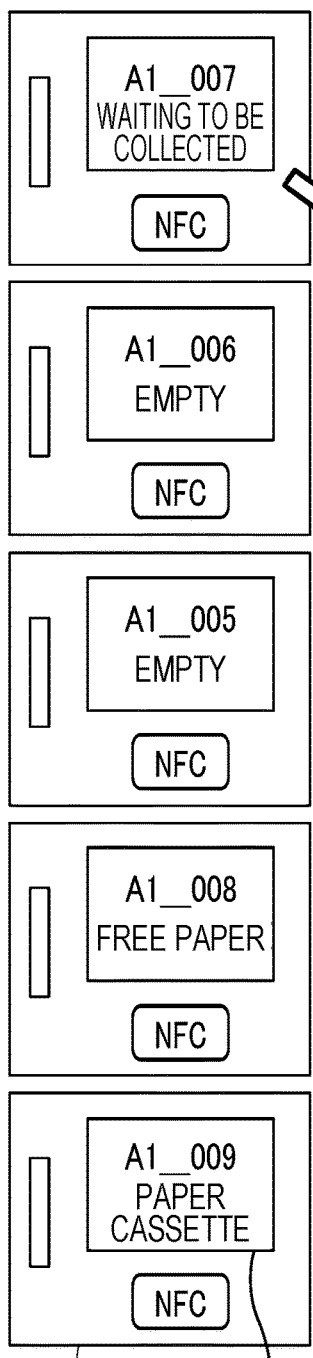
FIGS. 46A to 46C are views for explaining how a box number displayed on a door moves in a case where the current time approaches the scheduled pickup time.
Figure 46B:
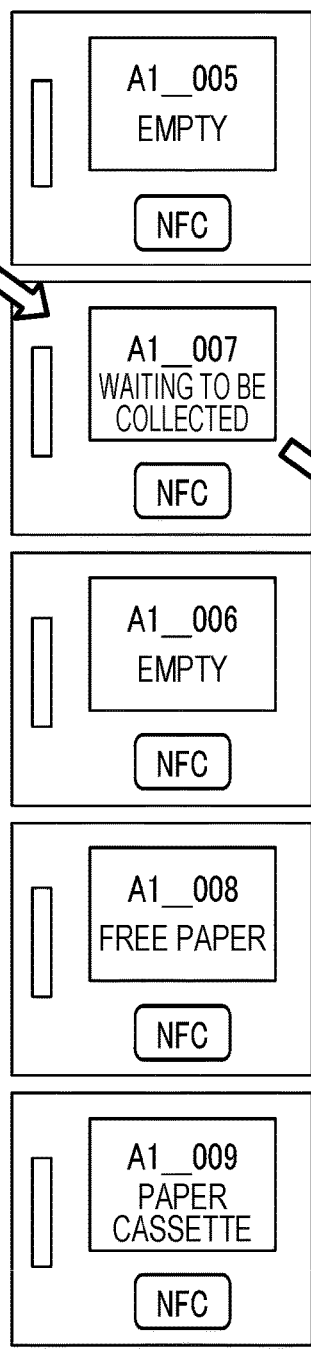
Figure 46C:
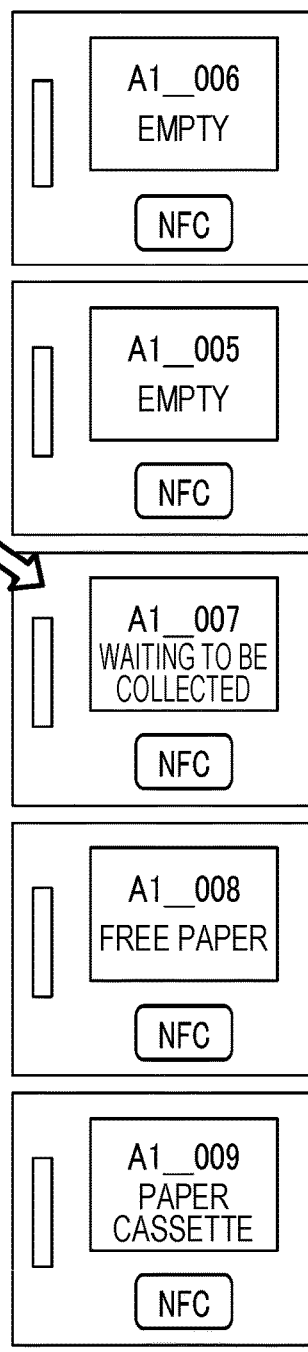

FIGS. 46A to 46C are views for explaining how a box number displayed on the door 210 moves in a case where the current time approaches the scheduled pickup time. FIG. 46A illustrates display two hours before the scheduled pickup time or earlier, FIG. 46B illustrates display one hour before the scheduled pickup time, and FIG. 46C illustrates display 15 minutes before the scheduled pickup time.

In FIGS. 45 and 46, a pickup position is a position of the door 210 given a number "007".

Two hours before the scheduled pickup time or earlier, the box ID "A1_005" is located at the pickup position. Accordingly, in FIG. 46A, "A1_005" and "EMPTY" are displayed on the display 211 of the door 210 at this position.

Meanwhile, the box "A1_007" to be moved is located at the position of the door 210 given a number "005" two hours before the scheduled pickup time or earlier. Accordingly, "A1_007" and "WAITING TO BE COLLECTED" are displayed on the display 211 of the door 210 at this position.

One hour before the scheduled pickup time, the box "A1_007" to be moved moves to a next stage below. That is, the box "A1_007" moves to a position of the door 210 given a number "006". Accordingly, "A1_007" and "WAITING TO BE COLLECTED" are displayed on the display 211 of the door 210 at this position.

Then, 15 minutes before the scheduled pickup time, the box "A1_007" to be moved moves to the pickup position in a next stage below. That is, the box "A1_007" moves to a position of the door 210 given the number "007". Accordingly, "A1_007" and "WAITING TO BE COLLECTED" are displayed on the display 211 of the door 210 at this position.

Next, how a box moves in a case where the current time is later than the scheduled pickup time is described.

FIGS. 47A to 47C are views for explaining how a box moves in a body in a case where an elapsed time from the scheduled pickup time becomes longer. FIG. 47A illustrates a position of the box "A1_007" in a case where the elapsed time is within 30 minutes, FIG. 47B illustrates a position of the box "A1_007" in a case where 1 hour has elapsed from the scheduled pickup time, and FIG. 47C illustrates a position of the box "A1_007" in a case where two hours or longer have elapsed from the scheduled pickup time.

Figure 48A:
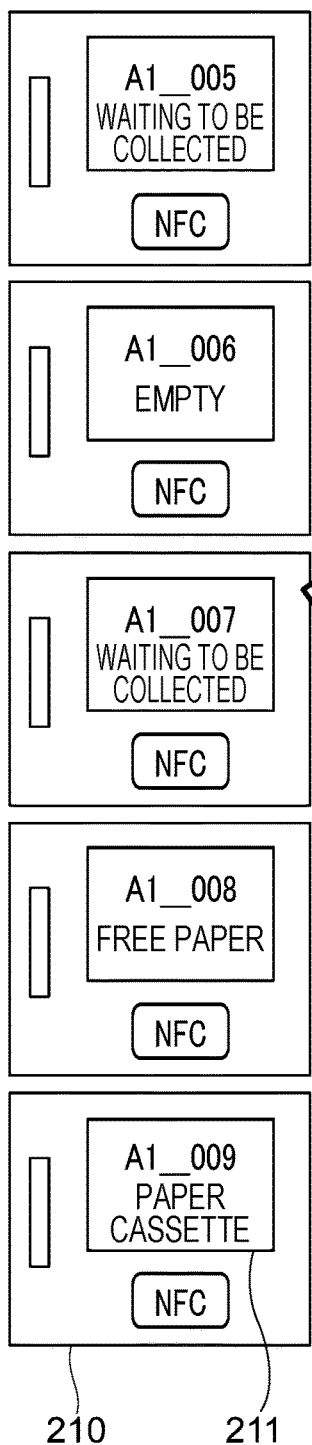
FIGS. 48A to 48C are views for explaining how a box number displayed on a door moves after the current time becomes later than the scheduled pickup time.
Figure 48B:
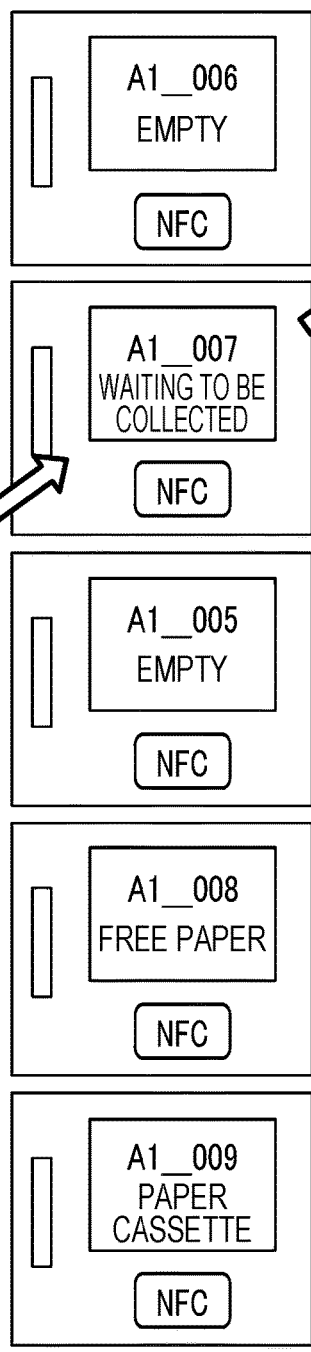
Figure 48C:
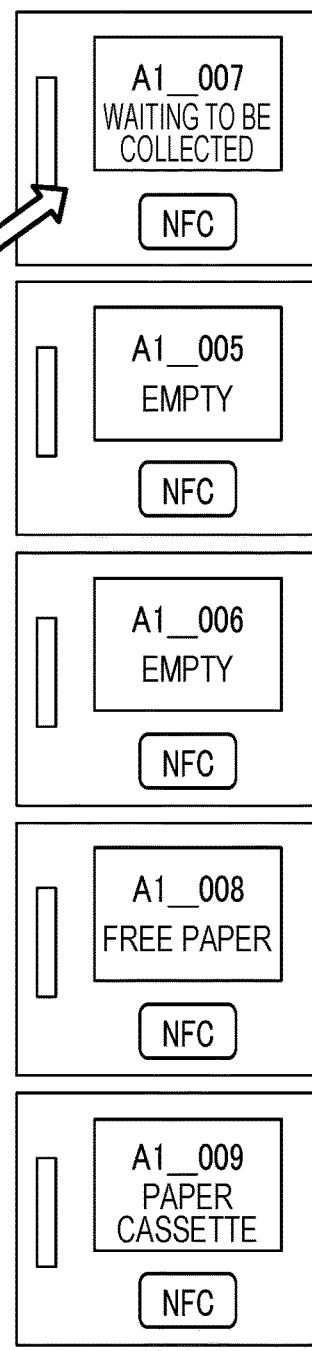

FIGS. 48A to 48C are views for explaining how a box number displayed on the door 210 moves after the current time becomes later than the scheduled pickup time. FIG. 48A illustrates display in a case where the elapsed time is within 30 minutes, FIG. 48B illustrates display in a case where 1 hour has elapsed from the scheduled pickup time, and FIG. 48C illustrates display in a case where two hours or longer have elapsed from the scheduled pickup time.

In FIGS. 47A to 47C and 48A to 48C, it is assumed that storage of a printed material continues even after elapse of two hours or longer from the scheduled pickup time.

In FIGS. 47A to 47C and 48A to 48C, the pickup position is the position of the door 210 given the number "007".

Within 30 minutes from the scheduled pickup time, the box ID "A1_007" is located at the pickup position. Accordingly, in FIG. 48A, "A1_007" and "WAITING TO BE COLLECTED" are displayed on the display 211 of the door 210 at this position.

Meanwhile, when 1 hour elapses from the scheduled pickup time, the box "A1_007" to be moved moves to a next stage above. That is, the box "A1_007" moves to the position of the door 210 given the number "006" Accordingly, "A1_007" and "WAITING TO BE COLLECTED" are displayed on the display 211 of the door 210 at this position.

When two hours or longer elapses from the scheduled pickup time, the box "A1_007" to be moved moves to a next stage above. That is, the box "A1_007" moves to the position of the door 210 given the number "005". Accordingly, "A1_007" and "WAITING TO BE COLLECTED" are displayed on the display 211 of the door 210 at this position.

Although a printed material is moved toward a predetermined specific door position as the current time approaches the scheduled pickup time in the present exemplary embodiment, a printed material may be moved to a door position desired by a user.

Furthermore, although a printed material is moved away from the predetermined specific door position after the current time becomes later than the scheduled pickup time, a printed material may be moved toward a place where a shredder 265 (see FIG. 5) is located. Alternatively, after the current time becomes later than the scheduled pickup time, a printed material may be moved toward a trash box for discard.

Fourth Exemplary Embodiment

In the present exemplary embodiment, a case where a door 210 from which a document that has been scanned is discharged is made transparent is described.

Figure 49A:
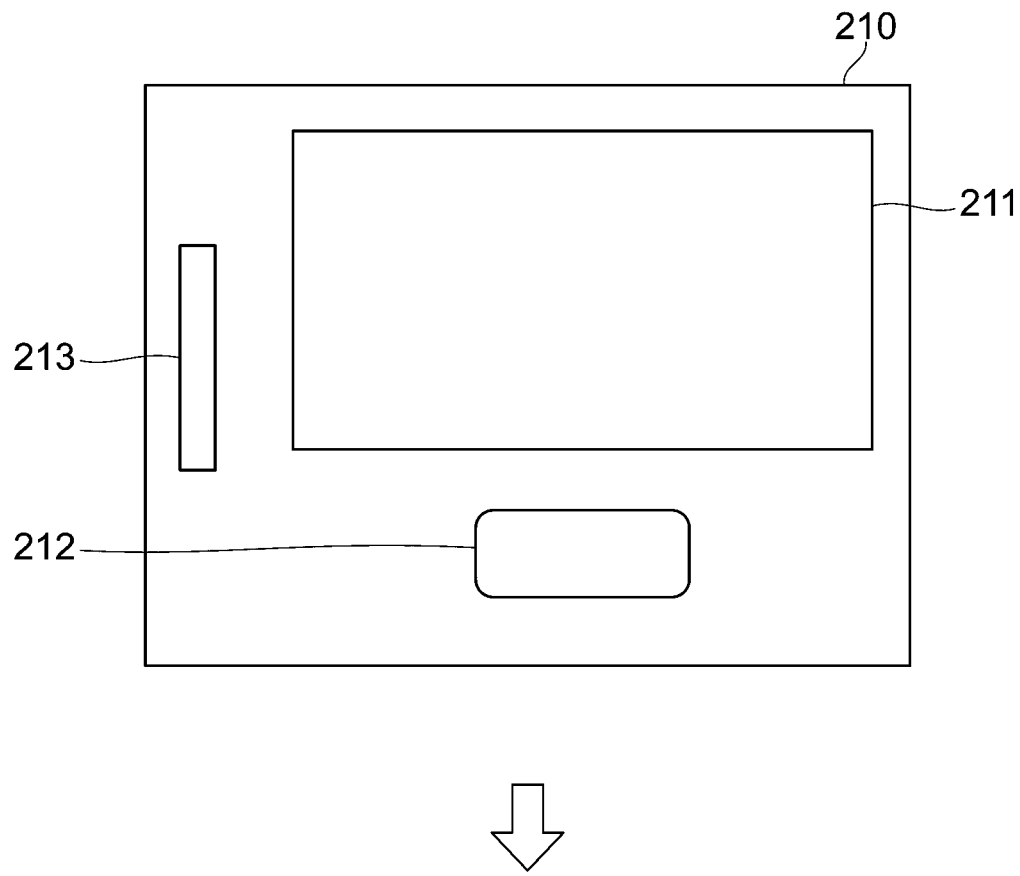
FIGS. 49A and 49B are views for explaining a case where the door and others are made transparent in a case where a scanned document is discharged into a box.
Figure 49B:
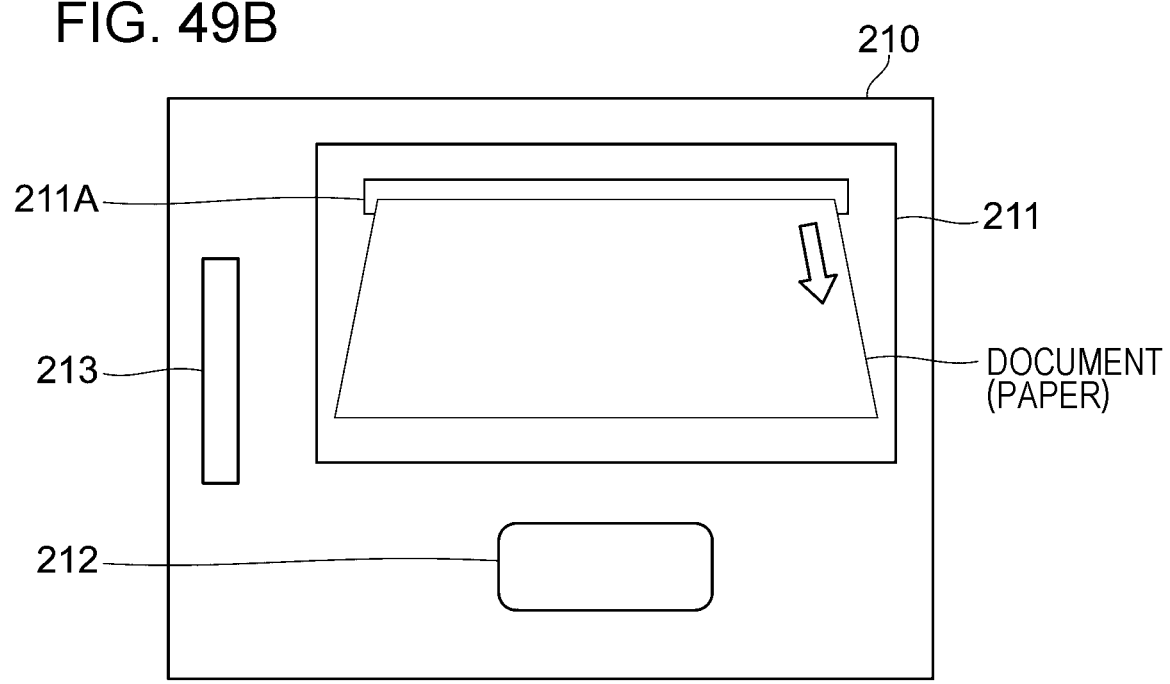

FIGS. 49A and 49B are views for explaining a case where the door 210 and others are made transparent in a case where a scanned document is discharged into a box. FIG. 49A illustrates the door 210 before execution of scan, and FIG. 49B illustrates a change of the door 210 during scan.

In a printing-function-equipped locker 20 (see FIG. 1), scan of a document is executed inside the apparatus. Accordingly, a user cannot observe the scan of the document from an outside. In particular, in a case where the scanned document is discharged into an empty box, some users feel anxious about whether paper discharged into the box is a genuine original document.

In view of this, in the present exemplary embodiment, a device that can adjust light transparency is used as a display 211.

In FIG. 49A, an inner side of the door 210 cannot be observed since the display 211 is in a mode for transmitting no light.

Meanwhile, in FIG. 49B, a user can observe, in real time, a document being discharged from a slit 210A provided in a box on an inner side of the door 210 since the display 211 is in a mode for transmitting light.

Addition of this function make a user feel safer.

Although the display 211 whose light transparency can be switched has been described in FIGS. 49A and 49B, the door 210 may be light control glass. The light control glass may have, for example, a structure in which a film whose light transparency can be switched is attached to a light-transmitting member or a structure in which a liquid crystal layer is sandwiched between two light-transmitting members. The light-transmitting member is, for example, glass or plastic.

Although a case where a document is scanned is assumed in the present exemplary embodiment, an inner side of the door 210 of a box into which a document is output may be observable from an outside even in copy operation of outputting a scanned image of a document as a printed material.

The door 210 of a box into which a printed material is output may also be made transparent so that a user can observe a printed material being output from an outside of the door 210 in real time.

Fifth Exemplary Embodiment

In the present exemplary embodiment, another example of appearance of the printing-function-equipped locker 20 (see FIG. 1) is described.

Figure 50:
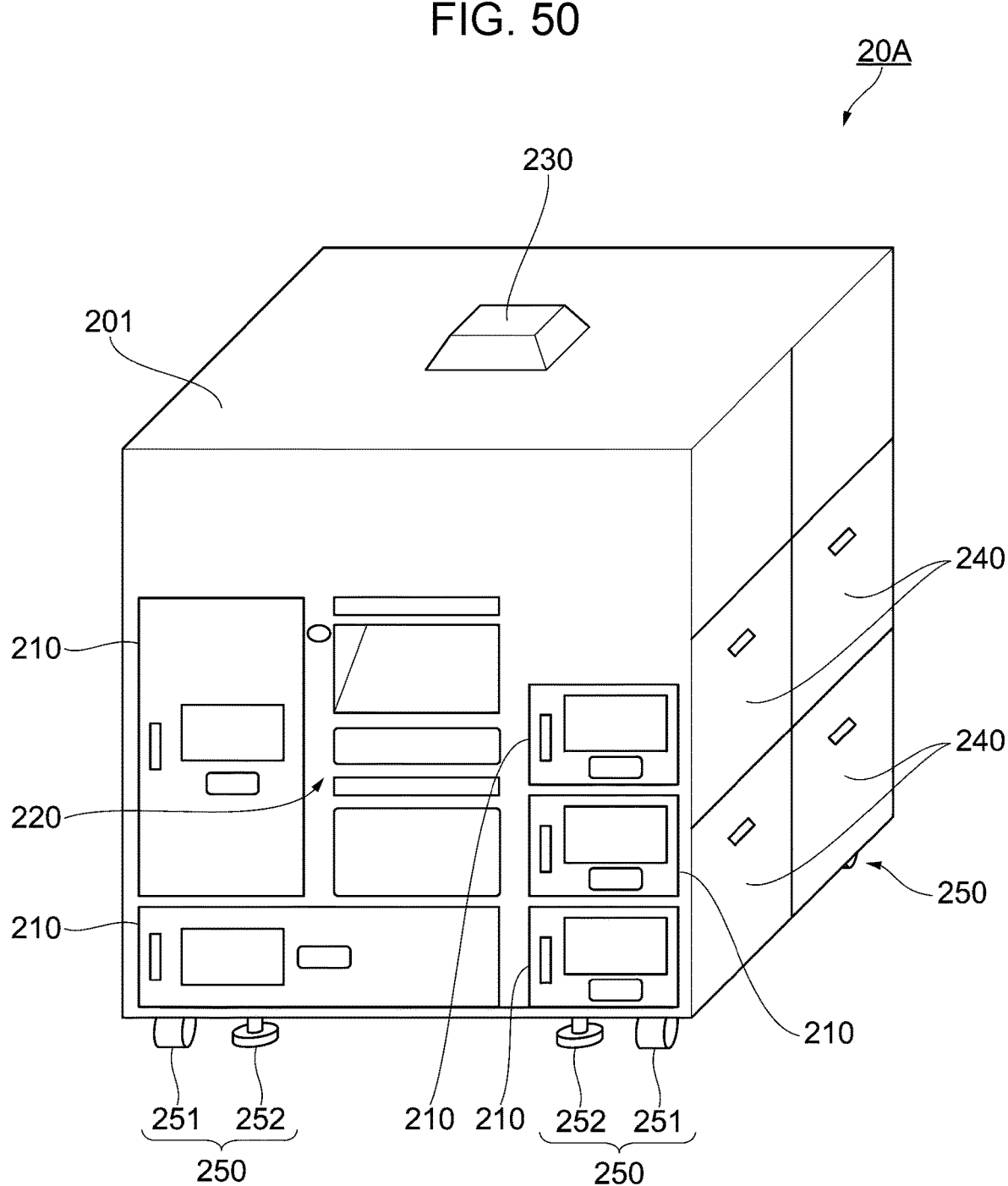
FIG. 50 is a view for explaining an example of appearance of a printing-function-equipped locker used in the fifth exemplary embodiment.

FIG. 50 is a view for explaining an example of appearance of a printing-function-equipped locker 20A used in the fifth exemplary embodiment. In FIG. 50, parts corresponding to those in FIG. 2 are given corresponding reference signs.

Figure 51A:
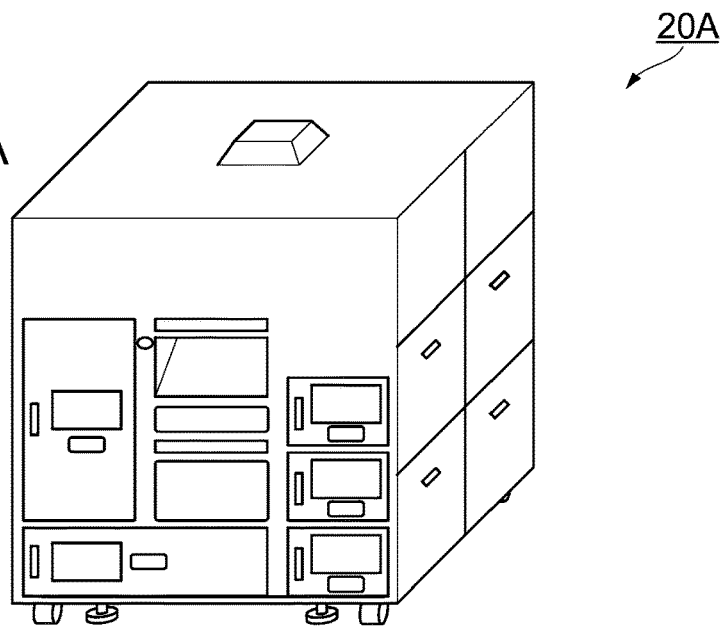
FIGS. 51A to 51D are views for explaining an example of a hexagonal structure of the printing-function-equipped locker used in the fifth exemplary embodiment.
Figure 51B:
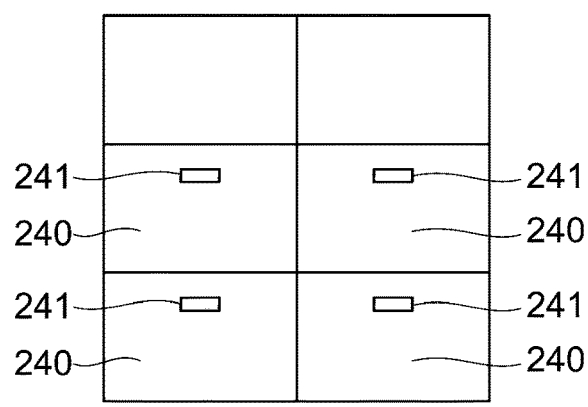
Figure 51C:
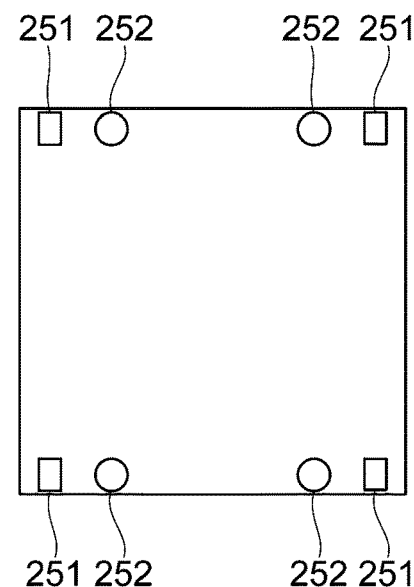
Figure 51D:
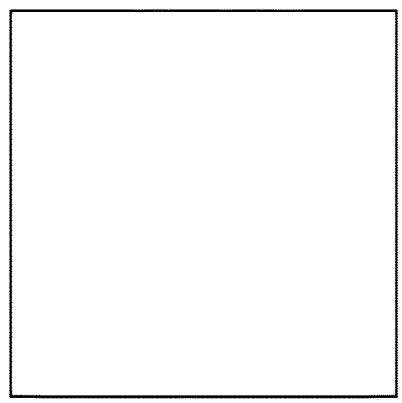

FIGS. 51A to 51D are views for explaining an example of a hexagonal structure of the printing-function-equipped locker 20A used in the fifth exemplary embodiment. FIG. 51A illustrates a front face, a flat face, and a right side face, FIG. 51B is a left side view, FIG. 51C is a bottom view, and FIG. 51D is a back view. FIG. 51A is cabinet projection drawn at an oblique angle of 45 degrees. In FIGS. 51A to 51D, parts corresponding to those in FIGS. 4A to 4D are given corresponding reference signs.

The printing-function-equipped locker 20A illustrated in FIGS. 50 and 51A to 51D is different from the printing-function-equipped locker 20 described in the first exemplary embodiment in that doors 210 and boxes 270 (see FIG. 6) on an upper side are removed.

By removing the doors 210 and boxes 270 on an upper side, a center of gravity of the printing-function-equipped locker 20A can be lowered. By lowering the center of gravity, the printing-function-equipped locker 20A that is hard to fall is provided.

However, a reduction in the number of doors 210 and boxes 270 means a reduction in the number of places for storage.

In view of this, a printed material and baggage stored in the printing-function-equipped locker 20 (see FIG. 1) may be concentrated on a lower-stage side instead of reducing the number of doors 210 and boxes 270 as in the printing-function-equipped locker 20A.

A printed material and baggage may be concentrated in a lower stage by a method for preferentially outputting a printed material to the doors 210 on the lower side and preferentially receiving baggage from the doors 210 on the lower side or a method for moving boxes 270 to a lower-stage side after output of a printed material and receipt of baggage. These kinds of control are executed by a processor 200A (see FIG. 5).

Sixth Exemplary Embodiment

Also in the present exemplary embodiment, another example of appearance of the printing-function-equipped locker 20 (see FIG. 1) is described.

Figure 52:
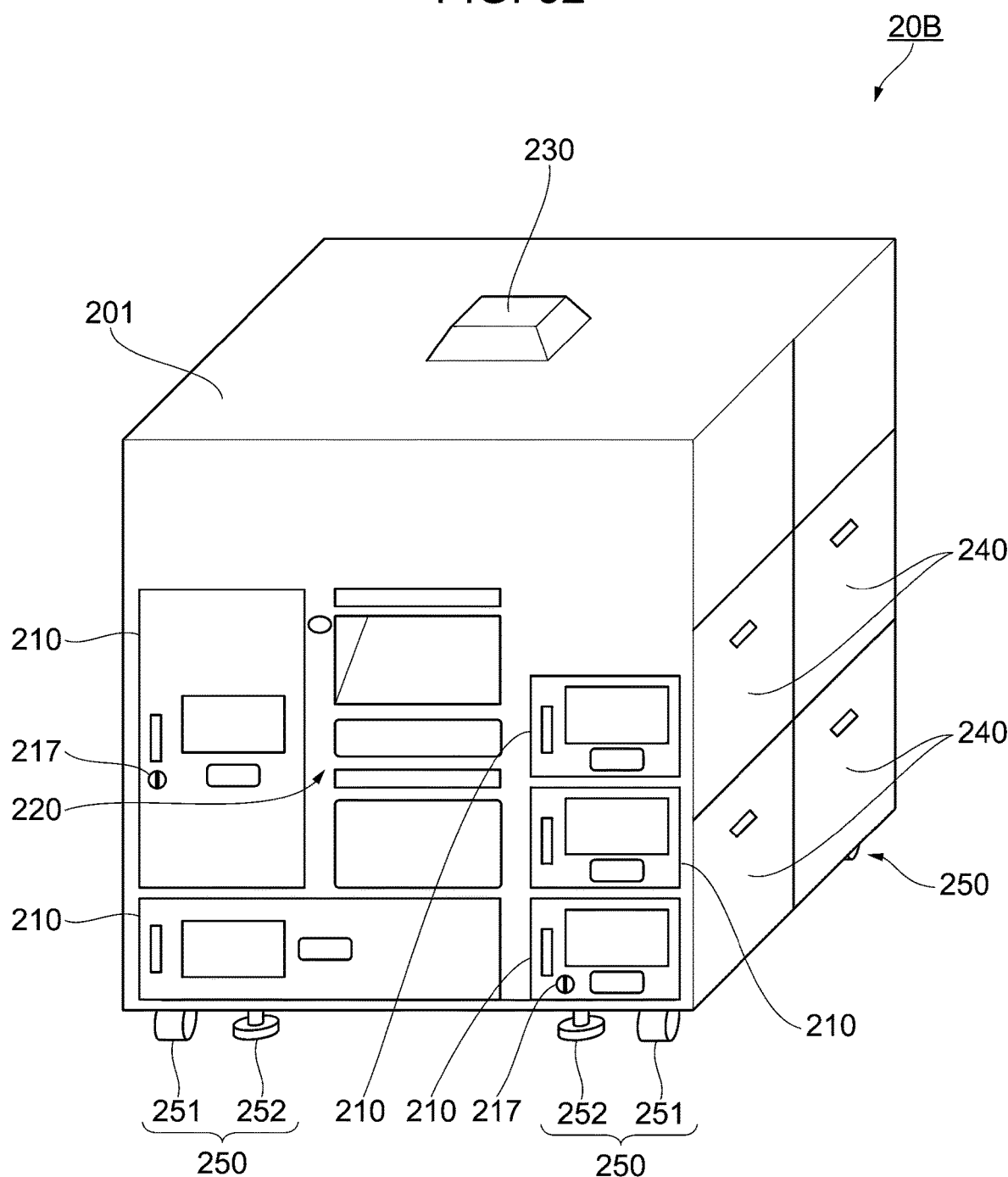
FIG. 52 is a view for explaining an example of appearance of a printing-function-equipped locker used in the sixth exemplary embodiment.

FIG. 52 is a view for explaining an example of appearance of a printing-function-equipped locker 20B used in the sixth exemplary embodiment. In FIG. 52, parts corresponding to those in FIG. 50 are given corresponding reference signs.

Figure 53A:
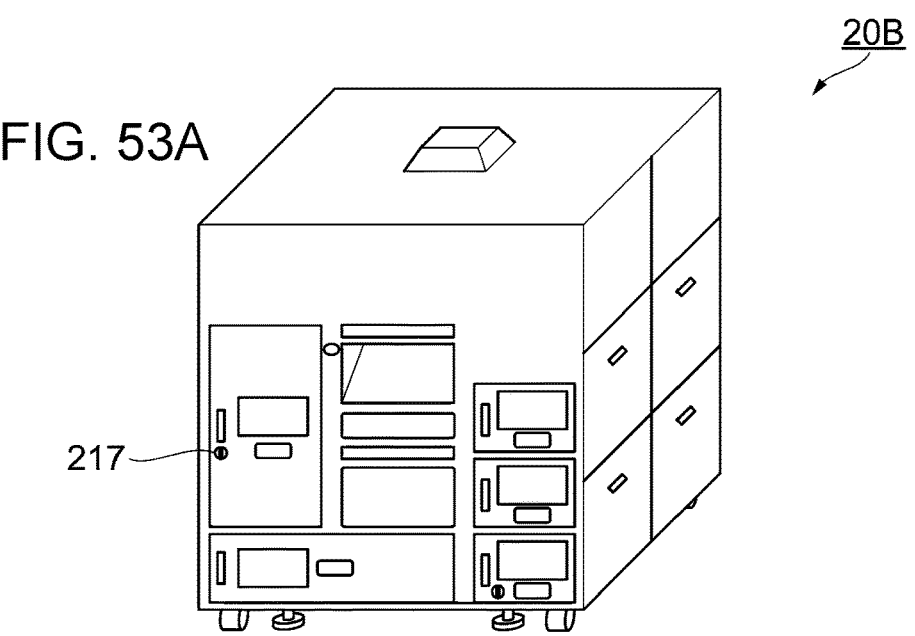
FIGS. 53A to 53D are views for explaining an example of a hexagonal structure of the printing-function-equipped locker used in the sixth exemplary embodiment.
Figure 53B:
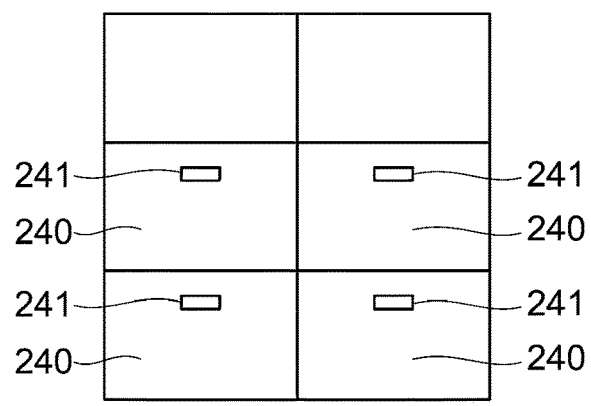
Figure 53C:
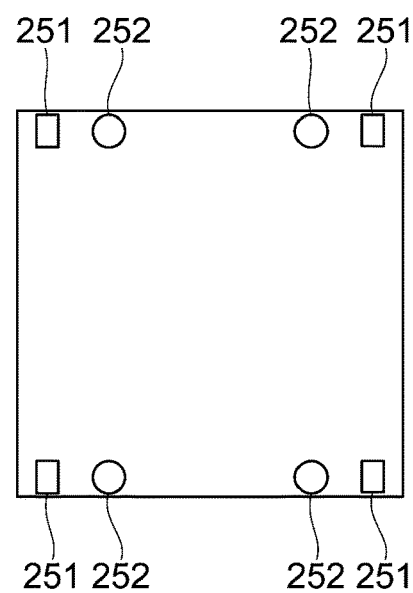
Figure 53D:
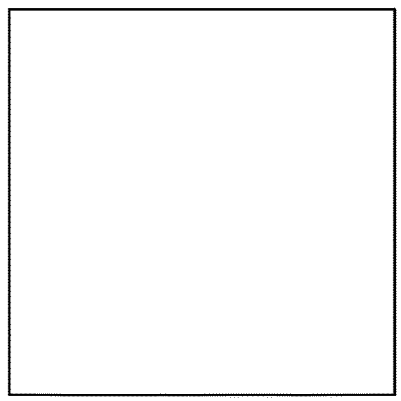

FIGS. 53A to 53D are views for explaining an example of a hexagonal structure of the printing-function-equipped locker 20B used in the sixth exemplary embodiment. FIG. 53A illustrates a front face, a flat face, and a right side face, FIG. 53B is a left side view, FIG. 53C is a bottom view, and FIG. 53D is a back view. FIG. 53A is cabinet projection drawn at an oblique angle of 45 degrees. In FIGS. 53A to 53D, parts corresponding to those in FIGS. 51A to 51D are given corresponding reference signs.

A difference of the printing-function-equipped locker 20B used in the present exemplary embodiment from the printing-function-equipped locker 20A used in the fifth exemplary embodiment is that some doors 210 are provided with a physical keyhole 217.

Note that all doors 210 may be provided with the keyhole 217.

Unlocking using a physical key has an advantage of improving safety against electronic hacking and leakage.

For example, a user can let another user use a physical key but a physical key cannot be shared at the same time by plural user although an electronic key or an encryption key can be easily shared by plural users.

Whether to use a door 210 provided with the keyhole 217 or a door 210 that is opened and closed by an electronic key as a place to which a printed material is to be output may be designated at a time of reservation.

Other Exemplary Embodiments (1) Although the exemplary embodiments of the present disclosure have been described, the technical scope of the present disclosure is not limited to the scope described in the above exemplary embodiments. It is clear from the claims that various changes or modifications of the above exemplary embodiments are also encompassed within the technical scope of the present disclosure.

(2) Although the front panel 220 (see FIG. 1) is disposed in a central column on the front face of the printing-function-equipped locker 20 (see FIG. 1) in the above exemplary embodiments, the position of the front panel 220 is not limited to this. For example, the front panel 220 may be deviated leftward or rightward on the front face of the printing-function-equipped locker 20. Furthermore, the front panel 220 itself may be removed from the printing-function-equipped locker 20. Even in a case where the front panel 220 is not provided, a communication module for communication with a terminal 10 (see FIG. 1) such as a smartphone which a user carries is provided on the body 201. Note that a printing-function-equipped locker 20 that is not provided with the front panel 220 communicates with the processor 200A (see FIG. 5) through the terminal 10 which a user carries.

(3) In the embodiments above, the term "processor 200A" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing method executed by a server apparatus that communicates with one or more storage apparatuses over a network, the one or more storage apparatuses having a printer, a plurality of storages for storing a printed material printed in accordance with a reservation, and a transport mechanism that transports a printed material to a corresponding storage, the information processing method comprising:
    storing information indicating whether air conditioning management for controlling at least one of temperature or humidity is available for the one or more storage apparatuses that store printed material;
    sending, to a terminal, information on the one or more storage apparatuses that are capable of printing and storing a printed material designated by the terminal as one or more candidates for a place to which the designated printed material is to be output;
    determining the one or more candidates for the place that is capable of storing the designated printed material in accordance with:
        (i) whether or not the air conditioning management is available at the place, and
        (ii) at least one of a size of the designated printed material, a number of sheets of the designated printed material, and a kind of the designated printed material;
    receiving, from the terminal, a selection of the one or more storage apparatuses and a scheduled pickup date and time for the designated printed material; and
    transmitting a data file to the one or more storage apparatuses selected from among the one or more candidates, the data file comprising information on the designated printed material and the scheduled pickup date and time.

2. The information processing method according to claim 1, wherein
    in a case where the plurality of storages for storing a printed material include a storage that is also used for storage of baggage, the server apparatus decides the one or more candidates offered to the terminal through cooperation with another server apparatus that manages storage of baggage.

3. The information processing method according to claim 2, wherein
    the server apparatus decides the one or more candidates offered to the terminal from among the storages excluding a storage allocated only for storage of baggage.

4. The information processing method according to claim 3, wherein
    in a case where the one or more storage apparatuses have a dedicated storage exclusive for a specific purpose, the server apparatus decides the one or more candidates offered to the terminal from among the storages excluding the dedicated storage.

5. The information processing method according to claim 1, wherein
    even in a case where there is no storage that satisfies a capacity alone, the server apparatus offers the terminal, as the one or more candidates, a storage apparatus that has a plurality of storages that satisfy the capacity in combination among the one or more storage apparatuses.

6. The information processing method according to claim 1, wherein
    in a case where there is no storage that satisfies a capacity alone, the server apparatus offers the terminal, as the one or more candidates, a combination of a plurality of storage apparatuses installed at places that are apart by a distance that satisfies a predetermined condition among the one or more storage apparatuses.

7. The information processing method according to claim 1, wherein
    the server apparatus decides the one or more candidates from among one or more storage apparatuses which a user operating the terminal is authorized to use among the one or more storage apparatuses.

8. The information processing method according to claim 1, further comprising storing a plurality of scheduled pickup dates and times for multiple print jobs associated with the one or more storage apparatuses that are capable of printing and storing the printed material.

9. A printing-function-equipped storage apparatus comprising:
    a printer;
    a plurality of storages for storing a printed material printed in accordance with a reservation;
    an air conditioner configured to control at temperature of air in at least one but not all of the plurality of storages that store printed material;

a transport mechanism that transports a printed material to a corresponding storage;
a locking mechanism that controls opening and closing of a door of a storage in accordance with a reservation; and
a processor that is configured to:
  set a start date and time for a print job associated with the reservation, based on a scheduled pickup date and time for the print job, so that the print job is completed in advance of the scheduled pickup date and time, and
  control the transport mechanism to transport a printed material for the print job printed by the printer to a storage that is capable of storing the printed material.

10. The printing-function-equipped storage apparatus according to claim 9, further comprising an operation panel,
wherein the processor is configured to unlock a corresponding storage upon receipt of an unlocking instruction from a mobile terminal even while the operation panel is being operated.

11. The printing-function-equipped storage apparatus according to claim 10, wherein
the processor is configured to send an instruction to unlock a target door in a case where communication is established with a mobile terminal and an unlocking instruction to unlock the target door is received from the mobile terminal.

12. The printing-function-equipped storage apparatus according to claim 9, wherein
the processor is configured to send an instruction to unlock a target door in a case where communication is established with a mobile terminal and an unlocking instruction to unlock the target door is received from the mobile terminal.

13. The printing-function-equipped storage apparatus according to claim 9, further comprising a moving mechanism that moves the storages in a space on an inner side of doors in a case where a structure in which the storages and the doors are separate is employed.

14. The printing-function-equipped storage apparatus according to claim 13, wherein
the processor is configured to move a storage used for storage of a printed material to a specific position used for pickup of a printed material by controlling the moving mechanism.

15. The printing-function-equipped storage apparatus according to claim 13, wherein
the processor is configured to move a position of a storage in which a printed material is being stored in accordance with a relationship between a scheduled pickup time at which the stored printed material is scheduled to be picked up and a current time.

16. The printing-function-equipped storage apparatus according to claim 9, further comprising fire extinguisher equipment.

17. The printing-function-equipped storage apparatus according to claim 9,
wherein the processor is further configured to revise the start date and time for the print job when a new reservation and a new print job are received by the processor.

18. A network print system comprising:
a printer, the printer comprising:
  a plurality of storages for storing a printed material printed in accordance with a reservation;
  an air conditioner configured to control temperature of air in at least one but not all of the plurality of storages that store printed material;
  a transport mechanism that transports a printed material to a corresponding storage;
  a locking mechanism that controls opening and closing of a door of a storage in accordance with a reservation; and
  a processor that is configured to:
    set a start date and time for a print job associated with the reservation, based on a scheduled pickup date and time for the print job, so that the print job is completed in advance of the scheduled pickup date and time, and
    control the transport mechanism to transport a printed material for the print job printed by the printer to a storage that is capable of storing the printed material, and
a server apparatus that communicates with the printer over a network and sends the scheduled pickup date and time for the print job to the printer.

19. A non-transitory computer readable medium storing a program causing a computer of a server apparatus that communicates with one or more storage apparatuses over a network to execute a process for information processing, the one or more storage apparatuses having a printer, a plurality of storages for storing a printed material printed in accordance with a reservation, and a transport mechanism that transports a printed material to a corresponding storage, the process comprising:
  storing information indicating whether air conditioning management for controlling at least one of temperature or humidity is available for the one or more storage apparatuses that store printed material;
  sending, to a terminal, information on the one or more storage apparatuses that are capable of printing and storing a printed material designated by the terminal as one or more candidates for a place to which the designated printed material is to be output;
  determining the one or more candidates for the place that is capable of storing the designated printed material in accordance with:
    (i) whether or not the air conditioning management is available at the place, and
    (ii) at least one of a size of the designated printed material, a number of sheets of the designated printed material, and a kind of the designated printed material;
  receiving, from the terminal, a selection of the one or more storage apparatuses and a scheduled pickup date and time for the designated printed material; and
  transmitting a data file to the one or more storage apparatuses selected from among the one or more candidates, the data file comprising information on the designated printed material and the scheduled pickup date and time.

20. A non-transitory computer readable medium storing a program causing a computer of a printing-function-equipped storage apparatus to execute a process for information processing, the printing-function-equipped storage apparatus having a printer, a plurality of storages for storing a printed material printed in accordance with a reservation, an air conditioner configured to control temperature of air in at least one but not all of the plurality of storages that store printed material, a transport mechanism that transports a printed material to a corresponding storage, and a locking mechanism that controls opening and closing of a door of a storage in accordance with a reservation, the process comprising:
- setting a start date and time for a print job associated with the reservation, based on a scheduled pickup date and time for the print job, so that the print job is completed in advance of the scheduled pickup date and time;
- control the air conditioner to operate and control temperature of air in at least one but not all of the plurality of storages that store printed material; and
- controlling the transport mechanism to transport a printed material printed for the print job by the printer to a storage that is capable of storing the printed material.

* * * * *